US011535274B2

(12) United States Patent
Dingli et al.

(10) Patent No.: US 11,535,274 B2
(45) Date of Patent: Dec. 27, 2022

(54) SELF-LEARNING VEHICLE PERFORMANCE OPTIMIZATION

(71) Applicant: Pony AI Inc., Grand Cayman (KY)

(72) Inventors: Robert Dingli, Cupertino, CA (US); Peter G. Diehl, Shanghai (CN); Sinan Xiao, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 74 days.

(21) Appl. No.: 16/831,364

(22) Filed: Mar. 26, 2020

(65) Prior Publication Data

US 2021/0300412 A1 Sep. 30, 2021

(51) Int. Cl.
*B60W 60/00* (2020.01)
*B60W 40/06* (2012.01)
*G05D 1/02* (2020.01)

(52) U.S. Cl.
CPC ........ *B60W 60/0011* (2020.02); *B60W 40/06* (2013.01); *B60W 60/00274* (2020.02); *G05D 1/0219* (2013.01)

(58) Field of Classification Search
CPC ....... B60W 60/0011; B60W 60/00274; B60W 40/06; G05D 1/0219
See application file for complete search history.

(56) References Cited

U.S. PATENT DOCUMENTS

| | | | |
|---|---|---|---|
| 9,076,330 B2 * | 7/2015 | Bouillet | G08G 1/123 |
| 9,090,246 B2 | 7/2015 | Cullen | |
| 9,261,376 B2 | 2/2016 | Cheng | |
| 2014/0207364 A1 * | 7/2014 | Eidehall | G05D 1/0212 |
| | | | 701/301 |
| 2017/0103654 A1 | 4/2017 | Gaebler | |
| 2018/0102001 A1 * | 4/2018 | Faust | G05D 1/0088 |
| 2018/0349713 A1 * | 12/2018 | Jiang | B60W 60/0011 |
| 2018/0374359 A1 * | 12/2018 | Li | G05D 1/0221 |
| 2019/0176333 A1 * | 6/2019 | Hager, IV | G05D 1/0219 |
| 2020/0130690 A1 * | 4/2020 | Chow | B60W 30/09 |
| 2020/0292346 A1 * | 9/2020 | Turner | G06Q 10/047 |
| 2021/0192234 A1 * | 6/2021 | Chen | B60W 30/09 |

OTHER PUBLICATIONS

English Translation of Publication No. DE 102016223609 A1 Title: Method for an at Least Partially Autonomous Driving Maneuver for a Vehicle as a Function of the Vehicle Tire Author: Fendt et al. Date: May 30, 2018 (Year: 2018).*

* cited by examiner

*Primary Examiner* — James J Lee
*Assistant Examiner* — Steven Vu Nguyen
(74) *Attorney, Agent, or Firm* — Sheppard Mullin

(57) ABSTRACT

Provided herein is a system of a vehicle that comprises one or more sensors, one or more processors, and memory storing instructions that, when executed by the one or more processors, causes the system to perform: selecting a trajectory along a route of the vehicle; predicting a trajectory of another object along the route; adjusting the selected trajectory based on a predicted change, in response to adjusting the selected trajectory, to the predicted trajectory of the another object, the predicted change to the predicted trajectory of the another object being stored in a model; determining an actual change, in response to adjusting the selected trajectory, to a trajectory of the another object, in response to an interaction between the vehicle and the another object; updating the model based on the determined actual change to the trajectory of the another object; and selecting a future trajectory based on the updated model.

19 Claims, 39 Drawing Sheets

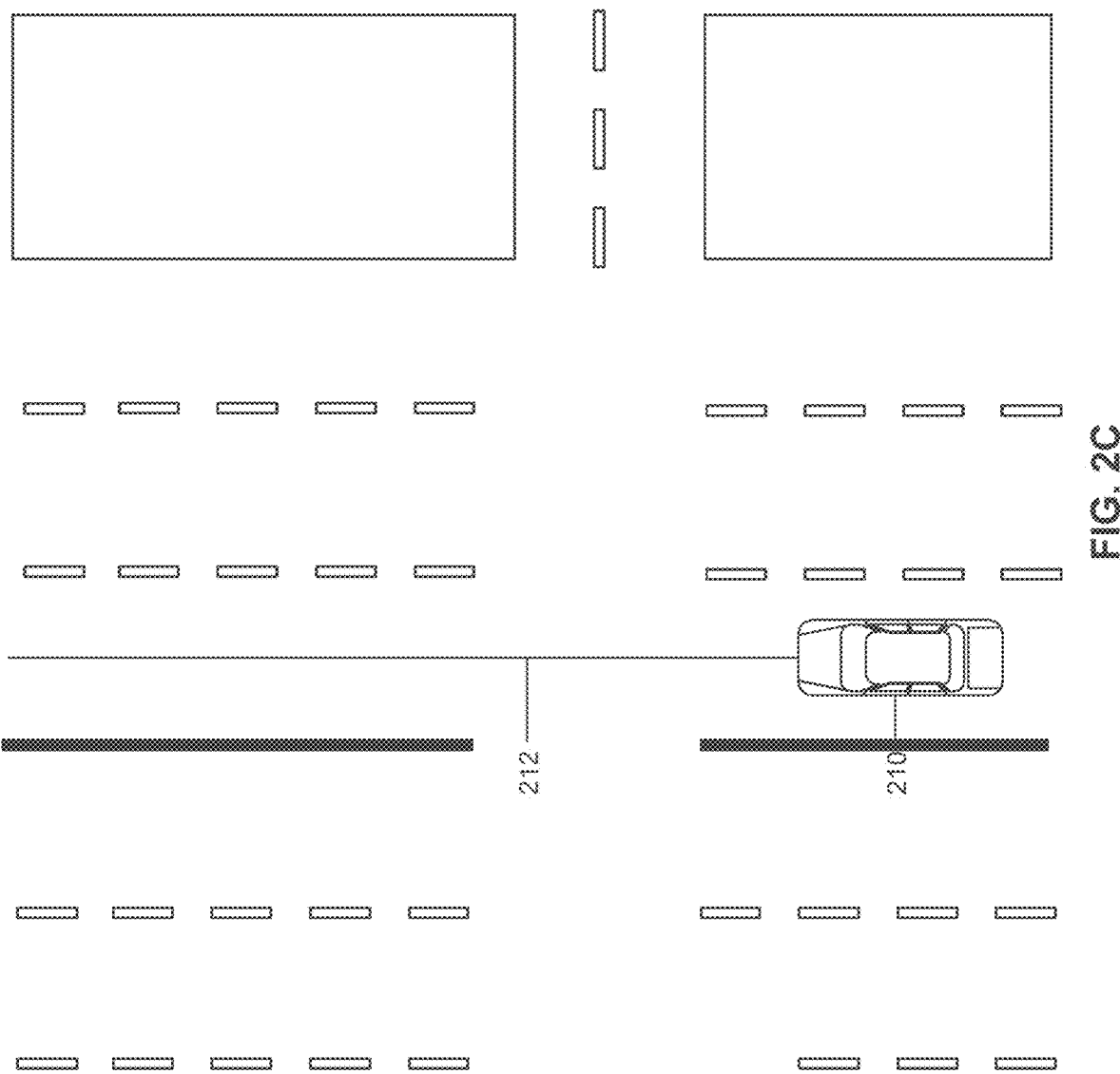

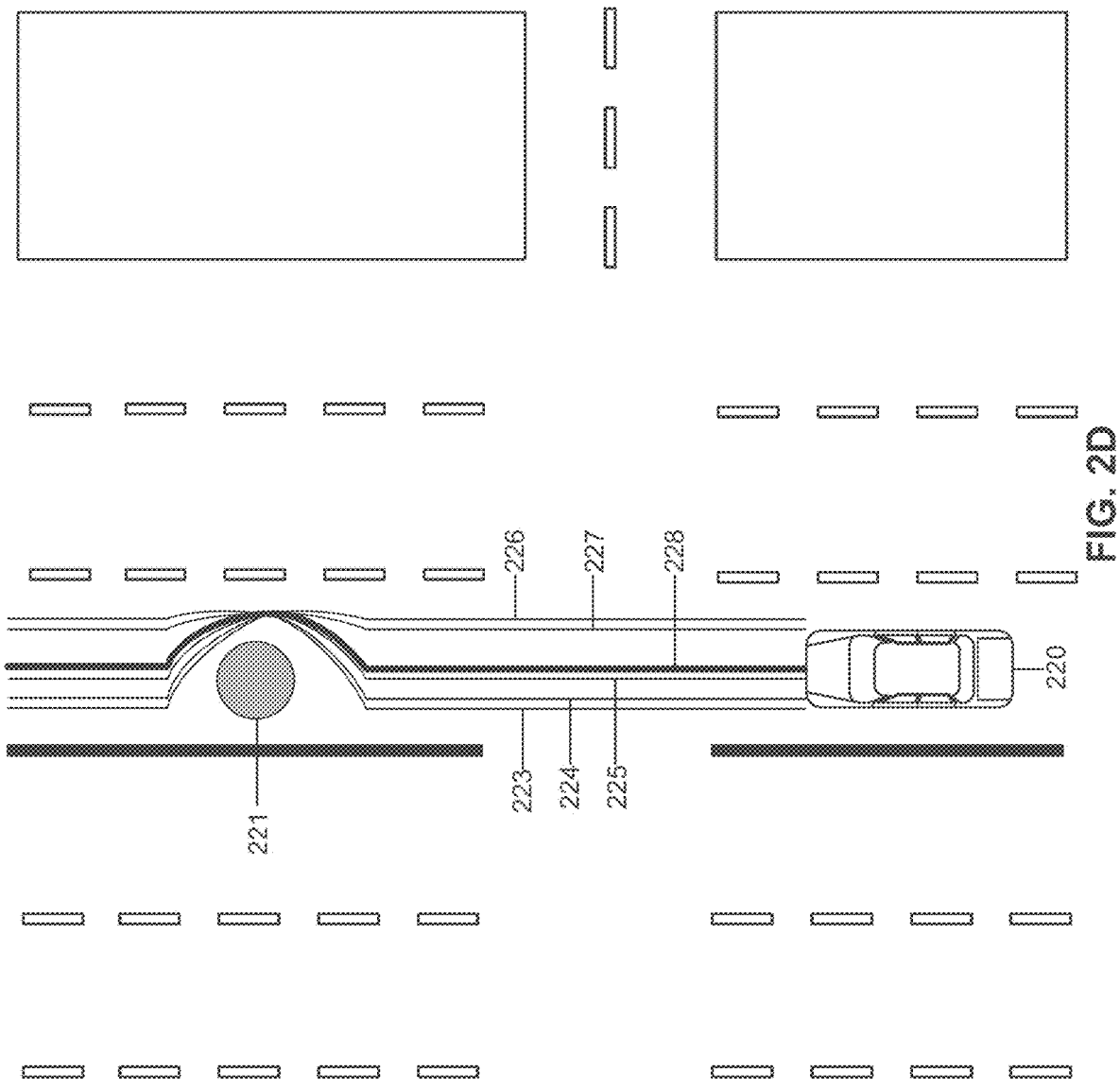

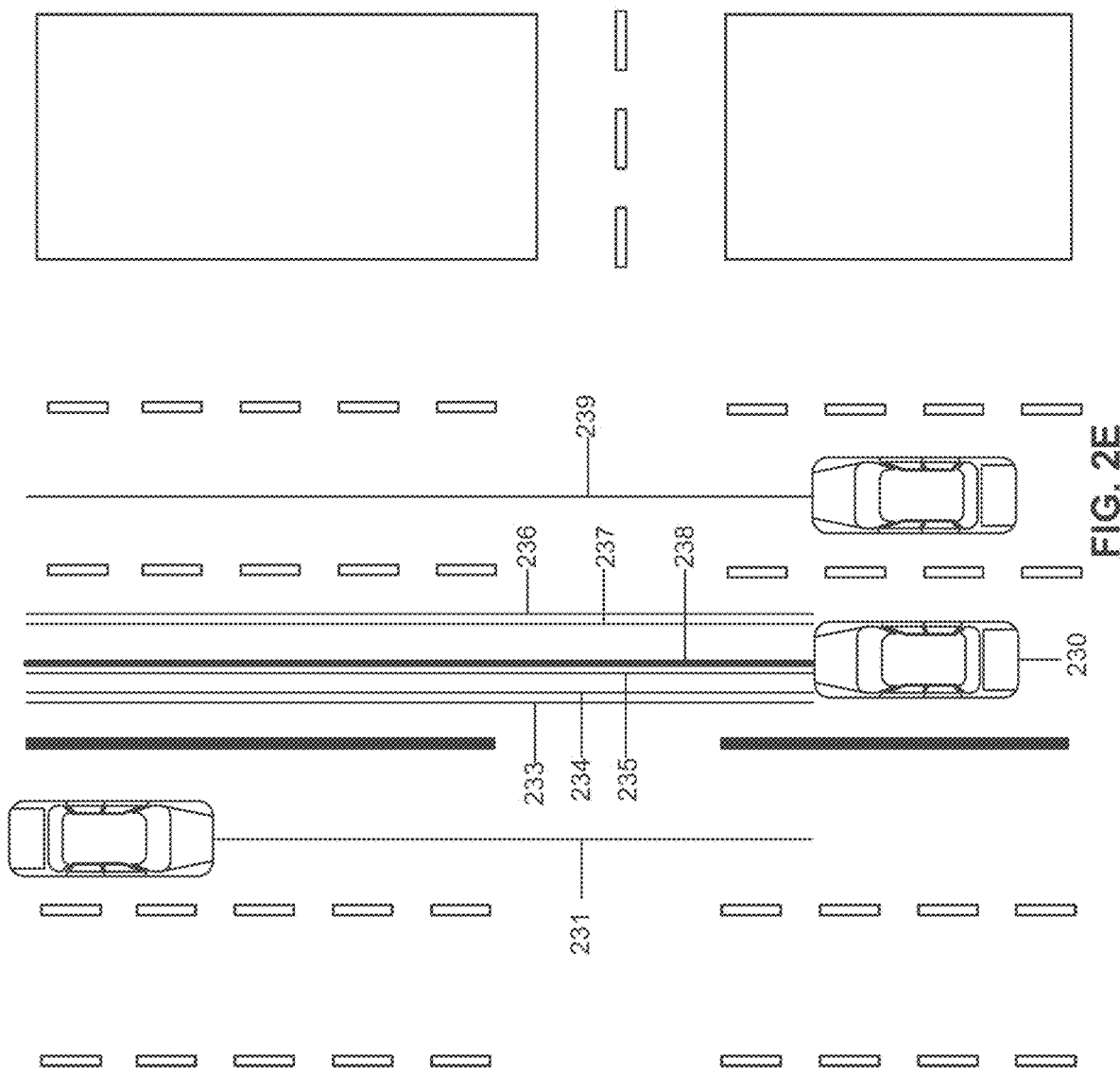

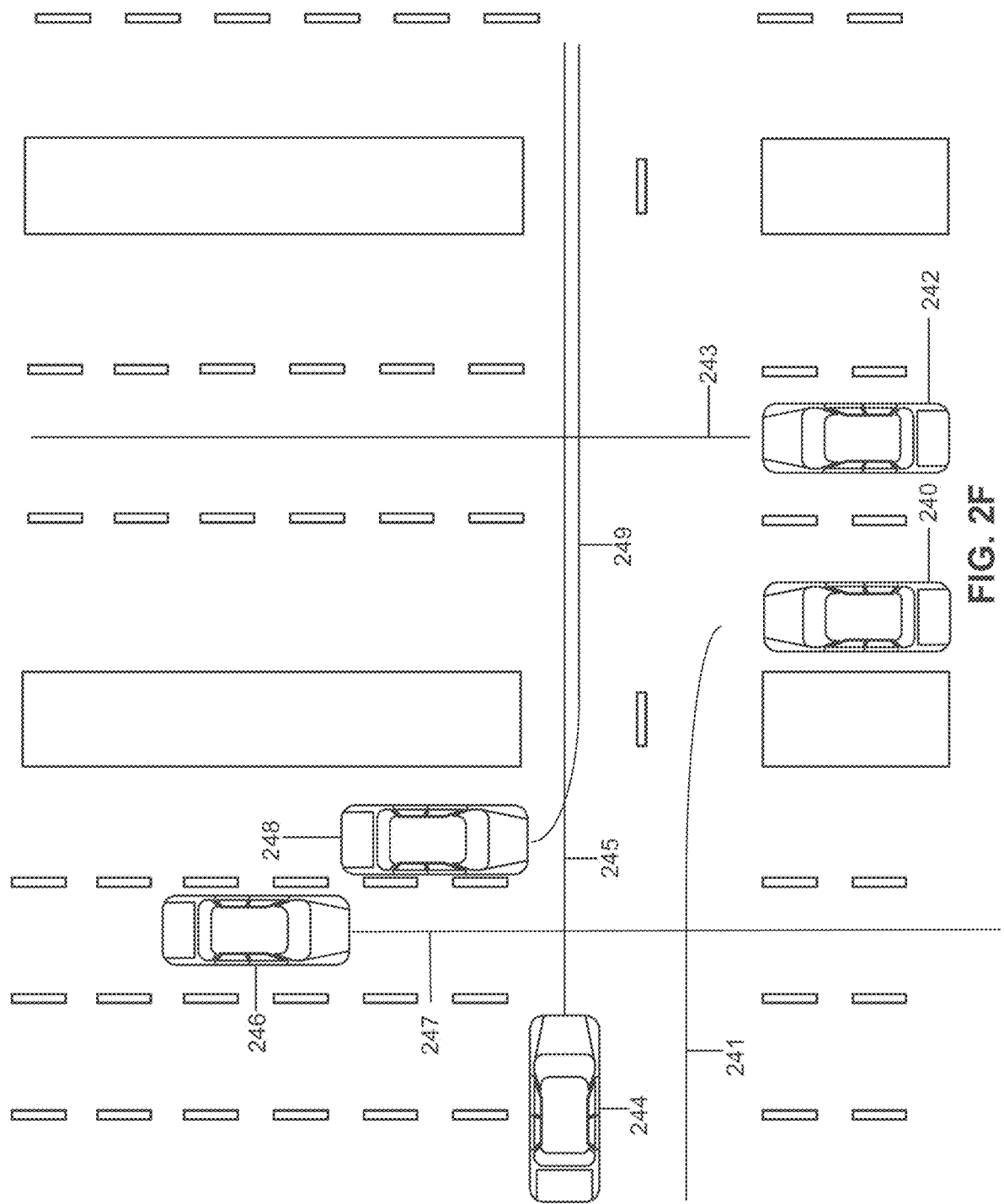

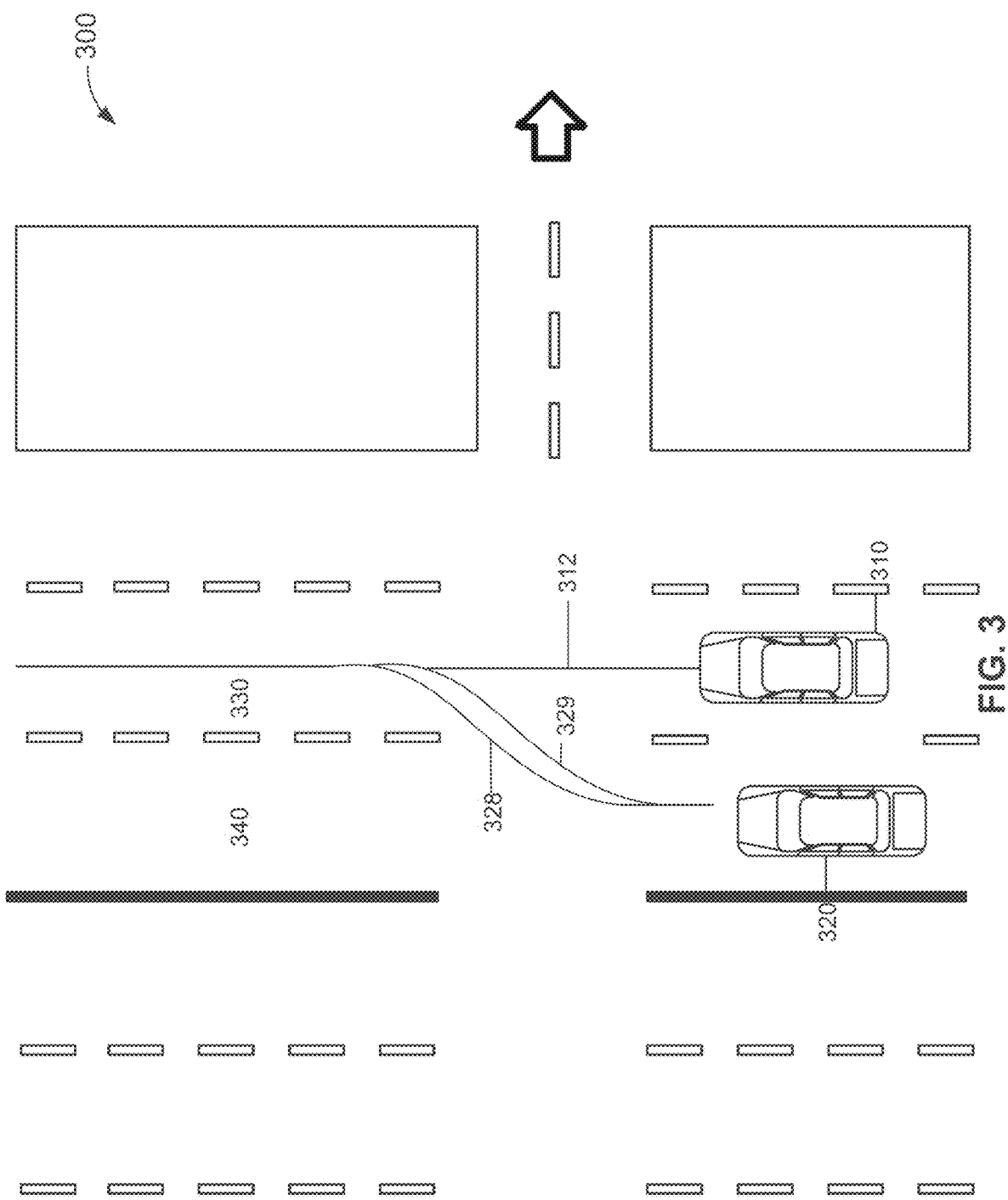

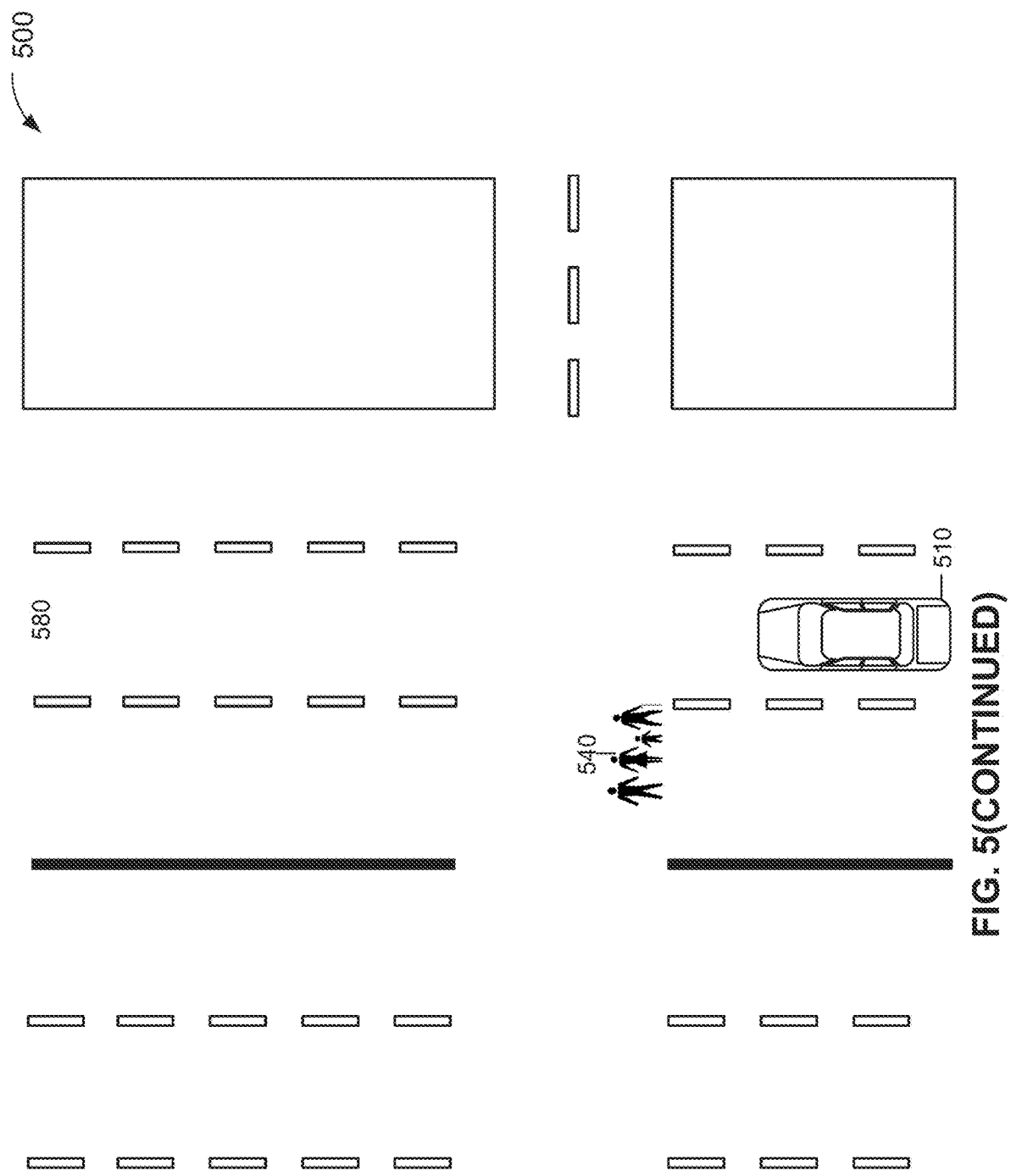

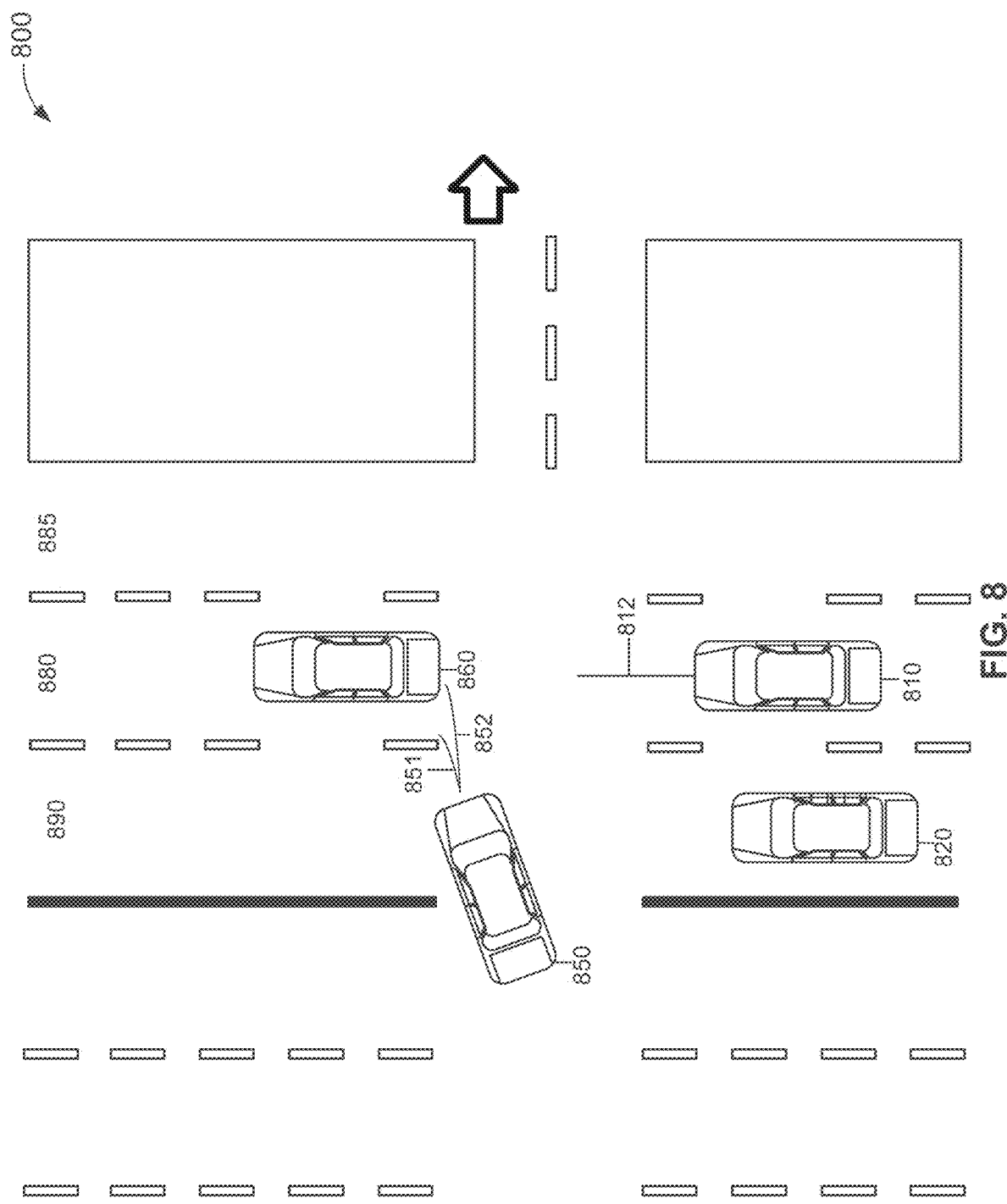

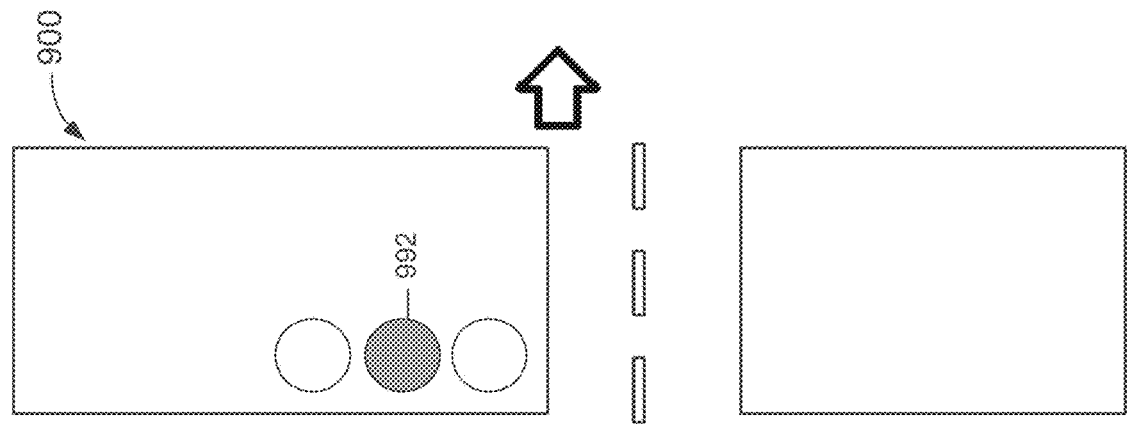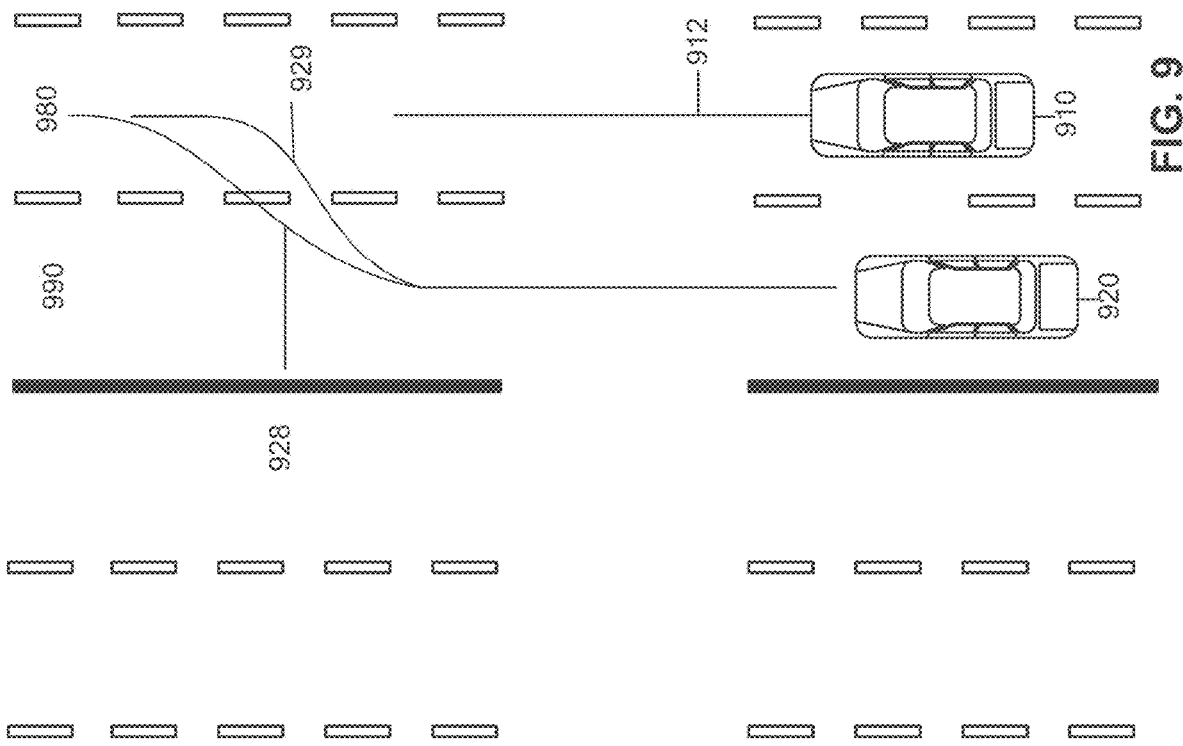
FIG. 9

1600

Select a trajectory from potential trajectories along a route to be travelled by the vehicle 1602

Predict a trajectory of at least another object along the route 1604

Adjust the selected trajectory based on a predicted change, in response to adjusting the selected trajectory, to the predicted trajectory of the another object; store the predicted change to the predicted trajectory of the another object in a model 1606

Determine an actual change, in response to adjusting the selected trajectory, to a trajectory of the another object 1608

Update the model based on the determined actual change to the trajectory of the another object 1610

Select a future trajectory of the vehicle based on the updated model 1612

FIG. 16

SELF-LEARNING VEHICLE PERFORMANCE OPTIMIZATION

TECHNICAL FIELD

The present disclosure relates generally to vehicles such as assisted-driving vehicles or autonomous vehicles (AVs), and in particular, some embodiments relate to real-time augmentation and adjusting of vehicle decision making, for example, based on current or recent experiences or interactions of the vehicles.

BACKGROUND

Vehicles, such as autonomous vehicles (AVs), include a hardware platform and software modules that perform sensing, localization, mapping, simultaneous localization and mapping (SLAM), path planning, motion planning, traffic-light state detection, and decision making when the vehicles encounter obstacles or objects such as other vehicles, pedestrians, or rocks. A vehicle may utilize on-board sensors such as camera, Lidar, radar, GPS, sonar, ultrasonic, IMU (inertial measurement unit), accelerometers, gyroscopes, magnetometers, and FIR (far infrared) sensors. Data from these sensors may provide information of its surroundings such as locations of lane dividers, arrows, other lane markings, traffic signs, and other vehicles. A vehicle may first determine or plan a feasible path from a starting point to a destination. The vehicle may, while driving along a path, utilize a decision making process to take into consideration the geometry of the vehicle and its surroundings, kinematic constraints, and other objects and obstacles that may affect the feasible paths. Some objects or obstacles may not behave as predicted, for example, under particular conditions or at particular locations. If objects or obstacles do not behave as predicted, the decision making process of the vehicle cannot be adjusted to account for updated predictions. Using a decision making process without accounting for updated predictions may result in ineffective or even dangerous decision making by a vehicle. These shortfalls are addressed by the present disclosures, which constantly adjust the decision making process using actual behavior of objects or obstacles.

SUMMARY

Described herein are systems and methods for adjusting a decision making process of a vehicle, for instance, during navigation of the vehicle. Various embodiments of the present disclosure provide a system comprising one or more sensors; one or more processors; and a memory storing instructions that, when executed by the one or more processors, causes the system to perform: selecting a trajectory from potential trajectories along a route to be travelled by the vehicle; predicting one or more trajectories of other objects along the route, such as a trajectory of another object; adjusting the selected trajectory based on a predicted change, in response to adjusting the selected trajectory, to a predicted trajectory of the another object. In some examples, the predicted change to the predicted trajectory of another object may be measured by what is predicted to happen in response to the selected trajectory interacting with the another object, or, how the selected trajectory may impact the predicted trajectory of the another object. Thus, in some examples, for the selected trajectory, the one or more processors may predict a hypothetical change to the predicted trajectory of at least the another object caused by the selected trajectory, and adjust the selected trajectory in an effort to counteract or minimize the predicted hypothetical change. The predicted change to the predicted trajectory of the another object, along with other details of the interaction between the vehicle and the another object, may be stored in a model. The instructions may further cause the system to perform: determining an actual change, in response to adjusting the selected trajectory, to a trajectory of the another object, based on a difference between the predicted trajectory of the another object and an actual trajectory of the another object in response to or following an interaction between the vehicle and the another object; updating the model based on the determined actual change to the trajectory of the another object; selecting a future trajectory based on the updated model, and performing a future adjustment of the future selected trajectory based on the updated model. For example, the vehicle learn from the interaction with the another object and may select a different trajectory in the future. The different selected trajectory in the future may have a smaller change or impact with a predicted trajectory of another object that the vehicle may interact with. Interacting may comprise, causing another object to swerve or change its trajectory without physically contacting the another object.

In some embodiments, the adjusting the selected trajectory comprises: adjusting the selected trajectory to an updated trajectory having a lowest predicted travel time and in which the predicted change to the trajectory of the another object is within a predetermined range.

In some embodiments, the updating the model comprises: determining whether the actual change to the trajectory of the another object is within the predetermined range; in response to determining that the actual change to the trajectory of the another object is within the predetermined range, determining a resulting change to the adjusted selected trajectory of the vehicle based on the actual change to the trajectory of the another object; and in response to determining that the actual change to the trajectory of the another object is outside the second predetermined range, adjusting the predicted change to the trajectory of the another object based on the actual change to the trajectory of the another object.

In some embodiments, the adjusting the predicted change to the another object comprises taking a weighted average of the predicted change to the another object and the actual change to the another object.

In some embodiments, the selecting a trajectory comprises selecting from the potential trajectories based on any of a road surface type, a road surface condition, a friction condition of the tire on the road surface, a curvature of the route or a portion of the route, a weather condition or predicted weather condition, a location, a time of day, a degree of lighting, a traffic condition or density, or a posted speed limit.

In some embodiments, the predicted change to the trajectory of the another object comprises a predicted change in a velocity or an acceleration of the another object.

In some embodiments, the adjusting the selected trajectory further comprises adjusting the selected trajectory based on a predicted change to a trajectory of a second object, in response to the predicted change to the trajectory of the another object.

In some embodiments, the trajectory comprises a starting pose, a velocity at different points along the route, an acceleration at different points along the route, an orientation at different points along the route, and a final pose of the vehicle.

In some embodiments, the adjusting the selected trajectory comprises adjusting the selected trajectory while maintaining a minimum distance, at a given time, between the adjusted selected trajectory and the trajectory of the another object.

In some embodiments, the trajectory comprises four knot points that define a cubic spline that specifies a steering angle of the vehicle.

Various embodiments of the present disclosure provide a method implemented by a computing system including one or more processors and storage media storing machine-readable instructions, wherein the method is performed using the one or more processors. The method comprises selecting a trajectory from potential trajectories along a route to be travelled by the vehicle; predicting one or more trajectories of other objects along the route such as a trajectory of another object; adjusting the selected trajectory based on a predicted change, in response to adjusting the selected trajectory, to the predicted trajectory of the another object. In some examples, the predicted change to the predicted trajectory of the another object may be measured by what is predicted to happen in response to the selected trajectory interacting with the another object, or, how the selected trajectory may impact the predicted trajectory of the another object. Thus, in some examples, for the selected trajectory, the one or more processors may predict a hypothetical change to the predicted trajectory of the another object caused by the selected trajectory, and adjust the selected trajectory in an effort to counteract or minimize the predicted hypothetical change. The predicted change to the predicted trajectory of the another object, along with other details of the interaction between the vehicle and the another object, may be stored in a model. The instructions may further cause the system to perform: determining an actual change, in response to adjusting the selected trajectory, to a trajectory of the another object, based on a difference between the predicted trajectory of the another object and an actual trajectory of the another object in response to, or following, an interaction between the vehicle and the another object. The instructions may further cause the system to perform: updating the model based on the determined actual change to the trajectory of the another object; and selecting a future trajectory based on the updated model. The instructions may further cause the system to perform a future adjustment of a future selected trajectory based on the updated model. For example, the vehicle learn from the interaction with the another object and may select a different trajectory in the future. The different selected trajectory in the future may have a smaller change or impact with a predicted trajectory of another object that the vehicle may interact with. Interacting may comprise, causing another object to swerve or change its trajectory without physically contacting the another object.

In some embodiments, the adjusting the selected trajectory comprises: adjusting the selected trajectory to an updated trajectory having a lowest predicted travel time and in which the predicted change to the selected trajectory of the another object is within a predetermined range.

In some embodiments, the updating the model comprises: determining whether the actual change to the trajectory of the another object is within the predetermined range; in response to determining that the actual change to the trajectory of the another object is within the predetermined range, determining a resulting change to the adjusted selected trajectory of the vehicle based on the actual change to the trajectory of the another object; and in response to determining that the actual change to the trajectory of the another object is outside the second predetermined range, adjusting the predicted change to the another object based on the actual change to the another object.

In some embodiments, the adjusting the predicted change to the another object comprises taking a weighted average of the predicted change to the another object and the actual change to the another object.

In some embodiments, the selecting a trajectory comprises selecting from the potential trajectories based on any of a road surface type, a road surface condition, a friction condition of the tire on the road surface, a curvature of the route or a portion of the route, a weather condition or predicted weather condition, a location, a time of day, a degree of lighting, a traffic condition or density, or a posted speed limit.

In some embodiments, the predicted change to the trajectory of the another object comprises a predicted change in a velocity or an acceleration of the another object.

In some embodiments, the adjusting the selected trajectory further comprises adjusting the selected trajectory based on a predicted change to a trajectory of a second object, in response to the predicted change to the predicted trajectory of the another object.

In some embodiments, the trajectory comprises a starting pose, a velocity at different points along the route, an acceleration at different points along the route, an orientation at different points along the route, and a final pose of the vehicle.

In some embodiments, the adjusting the selected trajectory comprises adjusting the selected trajectory while maintaining a minimum distance, at a given time, between the adjusted selected trajectory and the trajectory of the another object.

In some embodiments, the trajectory comprises four knot points that define a cubic spline that specifies a steering angle of the vehicle.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 2C-2H, 3-9, 10A, 10B, and 11-15 illustrate exemplary implementations of the system, according to an embodiment of the present disclosure.

FIG. 16 illustrates a flowchart of an example of a method according to some embodiments of the present disclosure.

DETAILED DESCRIPTION

Figure 1:
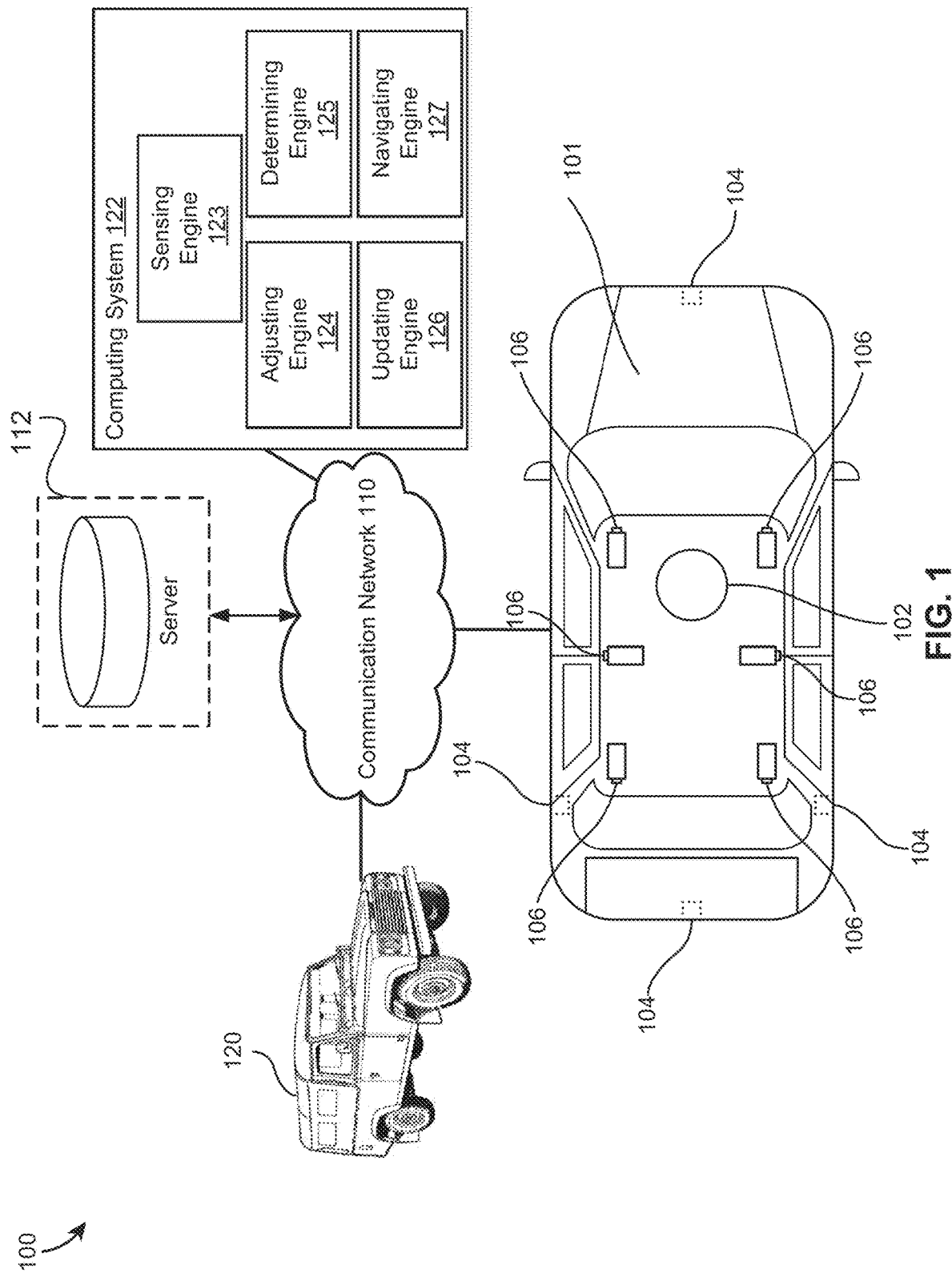
FIG. 1 illustrates an example environment of a system that selects a trajectory from potential trajectories along a route to be travelled by the vehicle, predicts one or more trajectories of other objects along the route, adjusts the selected trajectory based on a model which predicts impacts on the selected trajectory and the trajectories of other objects, determines an actual impact on the selected trajectory and on the trajectories of other objects, and feeds in the information of the actual impact into the model to update the predicted impacts for future adjustments of selected trajectories.

FIG. 1 illustrates an example environment 100 of a system that generates initial trajectories along a route to be travelled by the vehicle, acquires one or more trajectories of other vehicles along the route, adjusts the initial trajectories based on the one or more trajectories of other vehicles, and navigates the vehicle based on the adjusted initial trajectories, according to an embodiment of the present disclosure. In FIG. 1, a vehicle such as an autonomous vehicle 101 may include myriad sensors (LiDAR sensors 102, radar sensors 104, cameras 106, GPS, sonar, ultrasonic, IMU (inertial measurement unit), accelerometers, gyroscopes, magnetometers, and FIR (far infrared) sensors) to detect and identify objects in the surrounding. The sensor data may comprise pictorial or image data (e.g., pictures, videos), audio data, audiovisual data, atmospheric data (e.g., temperature, pressure, elevation, and/or the like) captured in either real-time or with a time delay. For example, the LiDAR sensors 102 can generate a three-dimensional map of the environment. The LiDAR sensors 102 can also detect objects in the environment. In another example, the radar systems 104 can determine distances and speeds of objects around the vehicle 101, and may be configured for adaptive cruise control and/or accident avoidance and blind spot detection. In another example, the cameras 106 can capture and process image data to detect and identify objects, such as road signs, as well as deciphering content of the objects, such as speed limit posted on the road signs. Such objects may include, but not limited to, pedestrians, road signs, traffic lights, and/or other vehicles, for example. In some embodiments, the cameras 106 can recognize, interpret, and analyze road signs (e.g., speed limit, school zone, construction zone, etc.) and traffic lights (e.g., red light, yellow light, green light, flashing red light, etc.). The vehicle 101 can also include myriad actuators to propel and navigate the vehicle 101 in the surrounding. Such actuators may include, for example, any suitable electro-mechanical devices or systems to control a throttle response, a braking action, a steering action, etc. In some embodiments, based on image data captured by the cameras 106, the vehicle 101 can adjust vehicle speed based on speed limit signs posted on roadways. For example, the vehicle 101 can maintain a constant, safe distance from a vehicle ahead (e.g., adaptive cruise control). In this example, the vehicle 101 maintains this safe distance by constantly adjusting its vehicle speed to that of the vehicle ahead.

In various embodiments, the vehicle 101 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the vehicle 101 can effectuate any control to itself that a human driver can on a conventional vehicle. For example, the vehicle 101 can accelerate, brake, turn left or right, or drive in a reverse direction just as a human driver can on the conventional vehicle. The vehicle 101 can also sense environmental conditions, gauge spatial relationships (e.g., distances between objects and itself), detect and analyze road signs just as the human driver. Moreover, the vehicle 101 can perform more complex operations, such as parallel parking, parking in a crowded parking lot, collision avoidance, etc., without any human input.

The vehicle 101 may be connected, via a communication network 110, to at least one computing system 122 that includes one or more processors and memory. The one or more processors may be configured to perform various operations by interpreting machine-readable instructions. In some embodiments, the example environment 100 may be implemented as a data platform. In some embodiments, the example environment 100 may be configured to interact with computing systems of the data platform. In various embodiments, one or more computing systems of the data platform may receive and process search queries to obtain sensor data, process the sensor data, determine an action, and/or perform the action such as a driving action.

In some embodiments, the computing system 122 may include sensing engine 123, adjusting engine 124, determining engine 125, updating engine 126, and navigating engine 127. The sensing engine 123 may be configured to control operations of or relating to the sensors such as the LiDAR sensors 102, radar systems 104 and cameras 106, and processing data acquired by the sensors. In general, the computing system 122 may be implemented, in whole or in part, with software that is capable of running on the computing system 122. In one example, the computing system 122 may be implemented as or within a software application running on one or more computing devices (e.g., user or client devices) and/or one or more servers (e.g., network servers or cloud servers, servers 112). In some instances, various aspects of the sensing engine 123, the adjusting engine 124, the determining engine 125, the updating engine 126, and the navigating engine 127 may be implemented in one or more computing systems and/or devices. In some instances, one or more of the sensing engine 123, the adjusting engine 124, the determining engine 125, the updating engine 126, and the navigating engine 127 may be combined or integrated into a single processor, and some or all functions performed by one or more of the sensing engine 123, the adjusting engine 124, the determining engine 125, the updating engine 126, and the navigating engine 127 may not be spatially separated, but instead may be performed by a common processor. The environment 100 may also include one or more servers 112 accessible to the computing system 122. The one or more servers 112 may store sensor data from the vehicle 101, one or more sensors of other vehicles such as another vehicle 120, which may be an AV, one or more satellite maps, and/or one or more road sensors such as sensors on traffic lights. In some embodiments, the one or more servers 112 may integrate data from different sensors. In other embodiments, the one or more servers 112 may keep the data from the different sensors separate. The one or more servers 112 may be accessible to the computing system 122 either directly or over the communication network 110. In some embodiments, the one or more servers 112 may store data that may be accessed by the sensing engine 123, the adjusting engine 124, the determining engine 125, the updating engine 126, and the navigating engine 127 to provide the various features described herein. In some embodiments, the one or more servers 112 may store data that may be accessed by the another vehicle 120. As an example, data from the sensing engine 123 may be stored in the one or more servers 112 and accessed by the another vehicle 120. The another vehicle 120 may also acquire data from the vehicle 101, either directly in an ad-hoc network, or through the one or more servers 112. In some instances, the one or more servers 112 may include federated data stores, databases, or any other type of data source from which data may be stored and retrieved, for example. In some implementations, the one or more servers 112 may include various types of data sets on which determinations of accuracy or consistency with other information can be made. In general, a user operating a computing device can interact with the computing system 122 over the communication network 110, for example, through one or more graphical user interfaces and/or application programming interfaces.

The sensing engine 123 may be configured to process data acquired from the sensors such as the LiDAR sensors 102, radar systems 104 and cameras 106, and detect a signal from a source (e.g., another vehicle such as the another vehicle 120, a pedestrian, or a road sign). In some embodiments, the signal may be a flashing light, a flashing row of lights, a blinking light, or a blinking row of lights on a side of the source facing the vehicle 101. The flashing or blinking light or the flashing or blinking row of lights may indicate that the source intends to overtake the vehicle 101 and to switch into a lane occupied by the vehicle 101, at a position in front of the vehicle 101. The sensing engine 123, in some embodiments, may be configured to determine a relative position of the source with respect to the vehicle 101. For example, the sensing engine 123 may be configured to determine whether the vehicle 101 is completely in front of or completely behind the source, with respect to a travelling or driving direction of the vehicle 101. If the source is not completely in front of or completely behind the vehicle 101 (for example, if a back portion of the vehicle 101 is aligned with a front portion of a source, and the vehicle 101 and the source), the sensing engine 123 may detect a lateral movement of the source even if the source does not signal. The lateral movement may be a movement from a lane occupied by the source towards a lane occupied by the vehicle 101, in a direction perpendicular to the driving direction of the vehicle 101. In some examples, the sensing engine 123 may detect whether a distance of a lateral movement, or how much the source has decreased its lateral distance from the vehicle 101, is above a threshold. In such a manner, the sensing engine 123 may be configured to detect whether a source (e.g., the another vehicle 120) is intending to overtake the vehicle 101 and to make a lane change, even when the source does not provide a signal, which may occur when the source has broken signals (e.g., lights not working). In some embodiments, the sensing engine 123 may only detect a lateral movement of a source if the source is not completely in front of or behind the vehicle 101, or if the source is within a field of view of the vehicle 101. In some embodiments, the sensing engine 123 may further be configured to detect pedestrians or people, for example, crossing a street. The sensing engine 123 may further be configured to recognize walking movements of pedestrians or people, and to recognize hand gestures or hand signals from pedestrians such as an upraised hand to indicate that the pedestrian is intending to cross a street. The sensing engine 123 may further be configured to detect and distinguish bicycles and motorcycles from other vehicles.

In response to the sensing engine 123 detecting and/or processing a signal, the adjusting engine 124 may select a trajectory from among potential trajectories along a route to be travelled by the vehicle 101, predict one or more trajectories of other objects while the vehicle 101 is travelling along the route, and adjust the selected trajectories based on predicted impacts to the selected trajectory and to the one or more trajectories of other objects. In some embodiments, a trajectory may represent a path or route travelled by the vehicle 101 from a start point to a destination. A trajectory may comprise a starting pose, a velocity at different points along the route, an acceleration at different points along the route, an orientation at different points along the route, and a final pose of the vehicle. The adjusting engine 124 may select a trajectory based on map data, taking into consideration a geometry of the vehicle 101 and its surroundings, kinematic constraints, and other objects such as other vehicles, pedestrians, and obstacles on the route. The adjusting engine 124 may select a trajectory based on any of a road surface type, a road surface condition, a type of an other object the vehicle is maneuvering around, a motion of that object, a tilt in the road, a friction condition of the tire on the road surface, a curvature of the route or a portion of the route, a weather condition or predicted weather condition, an environment condition or predicted environment condition, a location, a time of day, a degree of lighting, a traffic condition or density, and a posted speed limit. In some examples, the weather condition may comprise an amount of precipitation, an amount of humidity, and/or a temperature. The adjusting engine 124 may select a trajectory based on a predicted travel time, a predicted travel distance, or a predicted safety of a route. For example, the adjusting engine 124 may select a trajectory with a lowest predicted travel time from the start point to the destination, a lowest predicted travel distance from the start point to the destination, or a safest route from the start point to the destination.

The trajectories may be modelled, for example, by a separate processor, using straight line segments, circular arcs, radially warped line segments, and radially warped circular arcs, which may employ an approximated arc length parameterization. Each of the potential trajectories may be based on Bezier curves. The Bezier curves may be operating under waypoints and corridor constraints. In some examples, the trajectories may be modelled based on an assumption that wheels of the vehicle 101 roll without slipping. In some examples, a steering angle may be simplified as a single wheel directly at a midpoint between two front wheels. In some embodiments, each of the trajectories may comprise four knot points that define a cubic spline that specifies a steering angle of the vehicle.

The adjusting engine 124 may further predict one or more trajectories of other objects along the route. In some examples, the adjusting engine 124 may predict a trajectory of another vehicle by detecting one or more signals and/or commands from the another vehicle. In some examples, the one or more signals and/or commands may indicate that the another vehicle intends to change or merge into a lane, such as a lane currently occupied by the vehicle 101. In some examples, the one or more signals and/or commands may indicate that the another vehicle intends to allow the vehicle 101 to merge into the lane occupied by the another vehicle. The adjusting engine 124 may predict a trajectory of another vehicle based on historical data of minimum distances that vehicles maintain between other vehicles during certain maneuvers such as yielding or merging into a lane, based on a particular geometry of the another vehicle, based on a road surface type, a road surface conditions, a type of an other object the another vehicle is maneuvering around, a motion of that object, a tilt in the road, a friction condition of the tire on the road surface, a curvature of the route or a portion of the route, a weather condition or predicted weather condition, an environment condition or predicted environment condition, a location, a time of day, a degree of lighting, a traffic condition or density, and/or a posted speed limit. In some examples, the adjusting engine 124 may predict one or more trajectories of other objects such as pedestrians, animals, rocks, boulders, and other obstacles. In some examples, the adjusting engine 124 may predict one or more trajectories of other objects based on a current orientation, velocity, acceleration, and/or friction of the other objects. For example, if a tire has fallen from a truck, the adjusting engine 124 may predict a trajectory of the tire based on an angular orientation of the tire with respect to the road, a current linear and angular velocity and acceleration of the tire, and a coefficient of friction between the tire and the road. The one or more trajectories of other objects may represent a path or route travelled by the other objects from a start point. A trajectory may comprise a starting pose, a velocity at different points along the route, an acceleration at different points along the route, and an orientation at different points along the route.

The adjusting engine 124 may further determine adjustments to the selected trajectory if the vehicle 101 needs to maneuver around other objects on its way to the destination. In determining the adjustments, the adjusting engine 124 may predict one or more changes to the predicted trajectory of the another object such as another vehicle, and predict one or more changes to the selected trajectory of the vehicle 101, resulting from the adjustment. In some embodiments, the predicting one or more changes may be based on previous historical data points indicating actual changes to trajectories of one or more vehicles during a common type of vehicle maneuver. For example, the adjusting engine 124 may determine whether to merge into a different, second lane based on a predicted change of how a trajectory of another vehicle directly behind the vehicle 101 in the second lane may be affected if the vehicle 101 were to merge into the second lane. The predicted change may be determined by historical data points of how trajectories of other vehicles were affected by a vehicle merging into a different lane. The predicted change of a trajectory of another vehicle in the second lane may comprise a predicted change in velocity and/or acceleration of the another vehicle, a delay caused to the another vehicle, and/or a change in a measure of safety to the another vehicle, such as a distance between the another vehicle and the vehicle 101. In some examples, the adjusting engine 124 may determine whether to make a specific maneuver, such as merging into the second lane, based on a predicted impact of the maneuver to the vehicle 101, such as, a predicted change in velocity and/or acceleration of the vehicle 101, a time saved or delay caused to the vehicle 101, and/or a change in a measure of safety to the vehicle 101 resulting from the maneuver. In some examples, the adjusting engine 124 may consider and balance both the predicted impact to the vehicle 101 and the predicted change or impact to the another vehicle, in determining whether to make a particular maneuver. In some examples, the adjusting engine 124 may determine that a maneuver is acceptable if the predicted change or impact to the another vehicle is within a particular range. For example, during a maneuver of merging into the second lane by the vehicle 101, a particular acceptable range of a predicted change in a velocity of the another vehicle in the second lane may be between 0 and 5 miles per hour, as a result of the vehicle 101 merging into the second lane. If the predicted decrease in the velocity of the another vehicle is 4 miles per hour, the adjusting engine 124 may determine that the maneuver is acceptable. During such a maneuver, a particular acceptable range of a predicted change in a velocity of the vehicle 101 may be between 0 and 10 miles per hour. If the predicted decrease in the velocity of the vehicle 101 during the maneuver of changing lanes is 8 miles per hour, the adjusting engine 124 may determine that the maneuver is acceptable. Data of the predicted change or impact to the vehicle 101 and of the predicted change or impact to the another vehicle may be stored in a model, such as a learning model or a neural network. In some embodiments, the adjusting engine 124 may choose a vehicle action or maneuver from among acceptable maneuvers. For example, the adjusting engine 124 may choose a vehicle action or maneuver, from among the acceptable maneuvers, that minimizes a time of travel, maximizes a measure of safety to the vehicle 101, maximizes a measure of comfort for a passenger or safety driver of the vehicle 101, maximizes another performance metric of the vehicle 101, or minimizes a predicted change or impact to the vehicle 101 and/or to the another vehicle. In choosing a vehicle action or maneuver, the adjusting engine 124 may predict the change or the impact to the vehicle 101 and the another vehicle by weighting more heavily, or give precedence to, data points indicating more recent historical data, and data points based on a more similar time of day, traffic conditions, weather conditions, road type, and/or location. In some embodiments, the adjusting engine 124 may choose a vehicle action or maneuver based on a predicted change to a trajectory of a second object, in response to the predicted change to the selected trajectory of the vehicle 101 or the predicted change to the trajectory of the another vehicle. For example, the second object may be a large truck directly behind the another vehicle. The large truck may not be able to slow down as safely or effectively as a vehicle such as a car. Thus, the adjusting engine 124 may take into consideration a predicted change in velocity or acceleration of the large truck, and/or a predicted change in a measure of safety of the large truck having to slow down. The predicted change to the trajectory of the second object may be a second-level impact and may also be stored in the model. In some embodiments, the adjusting trajectory of the vehicle 101 may comprise maneuvers of the vehicle 101 such as slowing down, running over, straddling, circumventing and changing lanes or veering to a left, and circumventing and changing lanes or veering to a right. In some examples, straddling may refer to the vehicle 101 passing an obstacle with the obstacle between left and right side wheels of the vehicle 101 and under an underbody of the vehicle 101.

In some embodiments, the determining engine 125 may determine an actual change to the selected trajectory of the vehicle 101 and an actual change to the trajectory of the another object, such as the another vehicle in the second lane. In some examples, the determining engine 125 may determine that as a result of the vehicle 101 merging into the second lane, the actual decrease in the velocity of the another vehicle in the second lane is 5 miles per hour or 6 miles per hour. If the actual decrease in the velocity of the another vehicle differs from the predicted decrease by more than a threshold amount, or the actual decrease in the velocity falls outside of the threshold range, the updating engine 126 may update the model based on the determined actual change to the trajectory of the another object, in this case, the actual decrease in the velocity of the another vehicle in the second lane. In some examples, the determining engine 125 may determine that as a result of the vehicle 101 merging into the second lane, the actual decrease in the velocity of the vehicle 101 is 12 miles per hour, for example, due to the other vehicles also merging into the second lane, or due to an unforeseen slowdown in traffic ahead in the second lane.

If the actual decrease in the velocity of the vehicle 101 differs from the predicted decrease by more than a threshold amount, or the actual decrease in the velocity of the vehicle 101 falls outside of the threshold range, the updating engine 126 may update the model based on the determined actual change to the trajectory of the vehicle 101, in this case, the actual decrease in the velocity of the vehicle 101 as the vehicle 101 merges into the second lane. In some embodiments, in response to determining that the actual change to the selected trajectory of the vehicle 101 is outside a predetermined range, the updating engine 126 may adjust a prediction of a change to the selected trajectory of the vehicle 101, as stored in the model, based on the actual change to the selected trajectory of the vehicle 101. In some embodiments, in response to determining that the actual change to the trajectory of the another object is outside a second predetermined range, the updating engine 126 may adjust a prediction of a change to the predicted trajectory of the another object, as stored in the model, based on the actual change to the another object. In some embodiments, the adjusting the predicted change to the another object comprises taking a weighted average of the predicted change to the another object and the actual change to the another object. For example, the weight may be based on a degree of similarity between current conditions during which the actual change took place and previous conditions under which the historical data was recorded. For example, the conditions may comprise weather conditions, environment conditions, traffic conditions, lighting conditions, road type or quality, and/or location. In some examples, the updating engine 126 may adjust previous weights of historical data based on the actual change, in order to better fit the previous historical data to the actual change, which may encompass adjusting the previous weights so that the predicted change is closer to the actual change. In some embodiments, the updating engine 126 may distribute data of actual changes of the trajectory of the vehicle 101 and the trajectory of one or more other objects to a centralized server, and/or to other vehicles in a fleet or network.

In some embodiments, the navigating engine 127 may perform a future adjustment of a future selected trajectory based on, or using, the updated model. In such a manner, the model may be constantly learning, in real-time, using data of interactions between the vehicle 101 and one or more other objects during navigation actions or maneuvers.

Figure 2A:
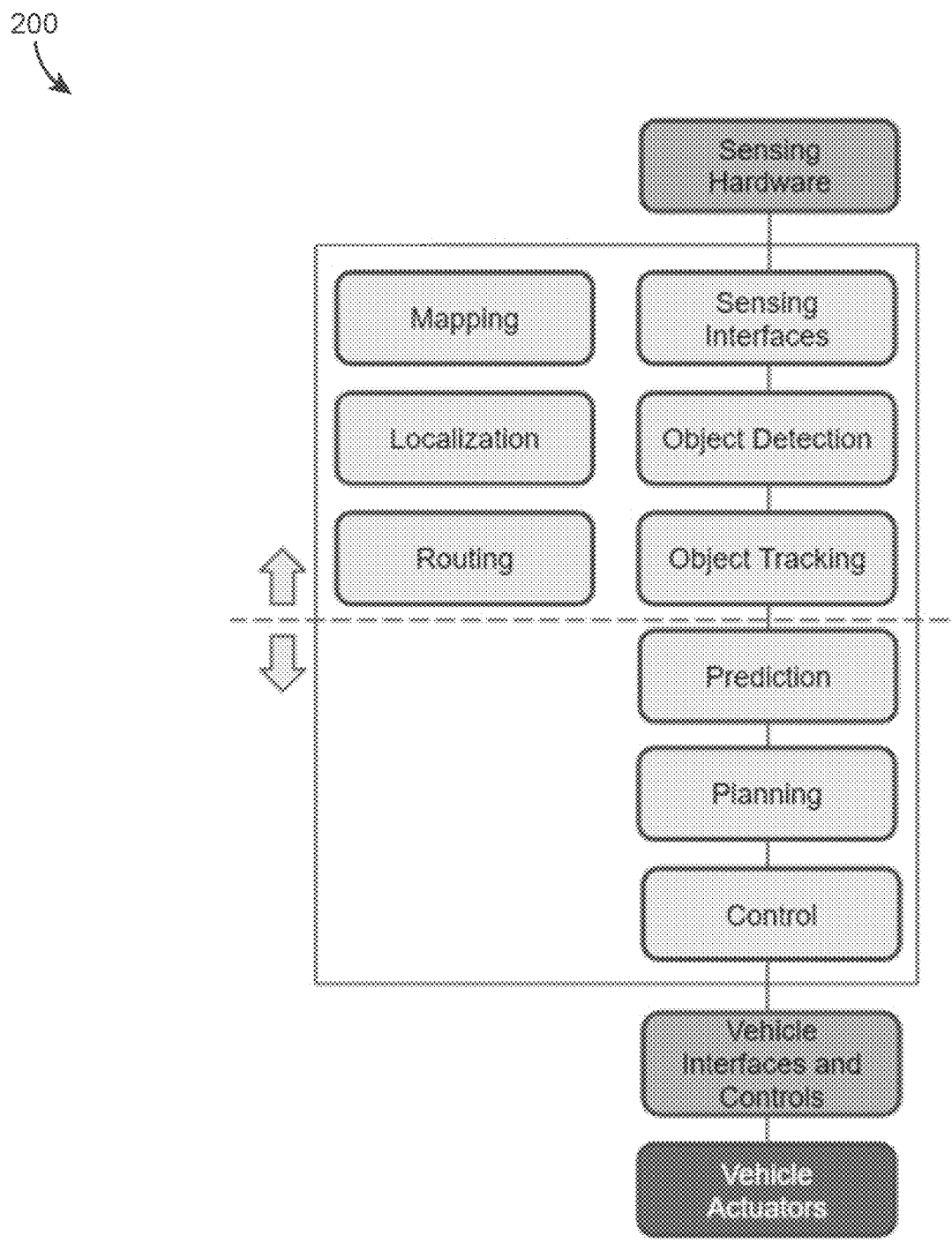
FIG. 2A illustrates a sensor and control setup of a vehicle of the system.

FIG. 2A illustrates a sensor and control setup of a vehicle, which may be implemented as the vehicle 101 as illustrated in FIG. 1. The schematic of the sensor and control setup may, for example, be implemented as a vehicle computation or control stack. In FIG. 2A, sensing hardware may be controlled and/or operated by the sensing engine 123. The sensing engine 123 may use the sensing hardware, which may include camera, LiDar, radar, ultrasonic, and/or IMU sensors as described above, to acquire signals, process the signals to convert raw sensor data into detected objects and tracked objects. The sensing engine 123 may further employ the sensing hardware in mapping, localization, which may include determining a position and pose of the vehicle 101, and routing. The aforementioned functions are past and present functions. Meanwhile, future functions of the vehicle computation or control stack may comprise prediction, which may entail predictions of object trajectories and trajectories of the vehicle 101, planning desired trajectories and updated trajectories of the vehicle 101, for example, due to changing or unforeseen circumstances, and surrounding environment or traffic conditions, control including longitudinal and lateral control signals, actuation which may include output of vehicle motion, and vehicle interfaces and controls which may include vehicle control commands Other offline or online commands may include generation of maps, object classification which may comprise machine learning, and validation and evaluation of performance of vehicle planning and control functions.

Figure 2B:
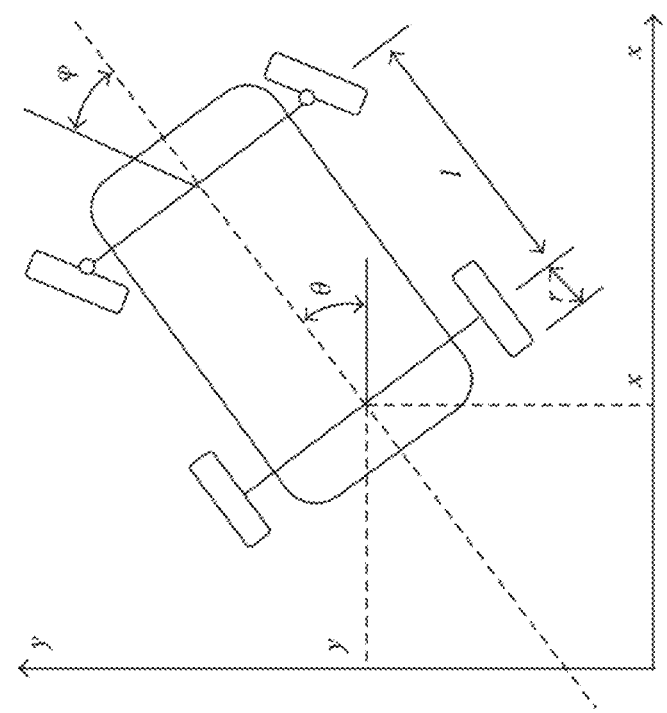
FIG. 2B illustrates a kinematic model 205 of the vehicle.

FIG. 2B illustrates a kinematic model 205 of a vehicle, which may be implemented as the vehicle 101 shown in FIG. 1. The kinematic model of FIG. 2B, for example, may be used to determine or model trajectories of the vehicle 101. In the kinematic model of the vehicle 101, assumptions may include that wheels of the vehicle 101 roll without slipping and a steering angle may be represented as a single wheel at a midpoint between two front wheels of the vehicle 101. In FIG. 2B, (x,y) are Cartesian coordinates of a middle point of a rear wheel axis, $\Theta$ is an angle of the vehicle body to the x-axis, $\varphi$ is a steering angle, l is a vehicle wheel base, and r is a wheel radius.

FIGS. 2C-2H, 3-9, 10A, 10B, and 11-15 illustrate exemplary implementations of the system, according to embodiments of the present disclosure. FIGS. 2C-2H, 3-9, 10A, 10B, and 11-15 illustrate specific embodiments of a vehicle refining its decision making and prediction process using real-time interactions with other objects such as other vehicles. In FIGS. 2C-2H, 3-9, 10A, 10B, and 11-15, any reference to a vehicle performing a determination or taking an action such as a navigation action or maneuver may be understood to mean that one or more processors of the vehicle may perform the determination and/or perform actuation to take the action or maneuver. In FIGS. 2C-2H, a vehicle (e.g., 210, 220, 230, 240, 260, 270) may select a trajectory and update or adjust the trajectory in various driving or road situations. In FIGS. 3-9, a vehicle (e.g., 310, 360, 410, 510, 610, 710, 810, or 910) may determine whether or not to perform an action of yielding. In FIGS. 10A, 10B, and 11-15, a vehicle (e.g., 1010, 1110, 1310, 1360, 1410, 1510) may determine whether or not to perform another action such as making a left turn, passing a vehicle, pulling over to a side of a road, making a right turn on a red light, passing a stopped bus, or whether to proceed or yield at an intersection or a stop sign. Additionally, a vehicle may take a driving action or make a maneuver based on a likelihood of avoiding a collision with one or more other vehicles or a pedestrian.

In FIG. 2C, a computing system (e.g., the computing system 122, or the adjusting engine 124) may select a trajectory 212 of a vehicle 210, which may be implemented as the vehicle 101. The trajectory 212 may be in a center between two lanes, or in a center between a lane and a yellow lane line, median strip, or center divider. During a turn, the trajectory 212 may comprise a semicircle extending from a center of a lane where the vehicle 210 is turning from, to a center of a lane where the vehicle 210 is turning to. In FIG. 2C, because no obstacles or other objects appear on the road in which the vehicle 210 is travelling, no adjustments to the trajectory 212 are necessary.

In FIG. 2D, a computing system (e.g., the computing system 122, or the engines/processors of the computing system 122) may sense, via the sensing engine 123, that a vehicle 220 is driving towards an obstacle 221, such as a pothole, bump, or rock on a road. The vehicle 220 may be implemented as the vehicle 101. The adjusting engine 124 may determine a driving action or maneuver of the vehicle 220 in order to pass or avoid the obstacle 221. The determined driving action or maneuver of the vehicle 220 may be based on a size and location of the obstacle 221. In some examples, the adjusting engine 124 may determine that the obstacle 221 is too large and/or too dangerous for the vehicle 220 to pass without swerving, or to straddle. For example, the adjusting engine 124 may predict that if the vehicle 221 attempts to directly drive over the obstacle 221 without swerving, one or more wheels of the vehicle 221 may hit the obstacle 221 and cause the previously stationary obstacle 221 to roll to another adjacent lane or to an opposite side of the road, thereby increasing a danger to another vehicle on the adjacent lane or the opposite side of the road. The adjusting engine 124 may predict a change in trajectory of the another vehicle on the adjacent lane or the opposite side of the road as a result of the obstacle 221 rolling. The adjusting engine 124 may further predict a change in trajectory of the vehicle 220 itself as a result of hitting the obstacle 221, such as a change in a velocity, acceleration, pose, orientation, and/or equilibrium of the vehicle 220. If the adjusting engine 124 predicts that the change in the trajectory of the vehicle 220 itself exceeds an allowable range, or that the change in the trajectory of the another vehicle exceeds an allowable range, the adjusting engine 124 may determine that the vehicle 220 should swerve to avoid the obstacle 221. The adjusting engine 124 may adjust its trajectory to avoid the obstacle 221. The adjusting engine 124 may select from potential trajectories 223, 224, 225, 226, 227, and 228. The potential trajectories 223, 224, 225, 226, 227, and 228 may be based on historical data of previous trajectories in similar conditions determined by size of obstacle, traffic density, road conditions, lighting conditions, and/or weather conditions. For example, the potential trajectories 223, 224, 225, 226, 227, and 228 may be determined based on a recent driving history of the vehicle 220. The potential trajectories 223, 224, 225, 226, 227, and 228 may be recent actual trajectories, for example, during a past year, month, or week, that have highest safety metrics. The adjusting engine 124 may select the trajectory 228, based on predicted impacts to the trajectory 228, to a trajectory of the obstacle 221, and to a trajectory of another nearby vehicle that may be affected by the obstacle 221. For example, the adjusting engine 124 may predict that the vehicle 220, while following the trajectory 228, will not hit the obstacle 221, and thus, the obstacle 221 will not change its trajectory and remain stationary. The adjusting engine 124 may cause the vehicle 220 to navigate or maneuver past the obstacle 221 along the trajectory 228. After following the trajectory 228, the determining engine 125 may determine an actual impact on the trajectory 228, the trajectory of the obstacle 221, and the trajectory of the nearby vehicle. Thus, if the determining engine 125 determines that the vehicle 220 actually hit the obstacle 221 while following the trajectory 228, the updating engine 126 may update or adjust the predicted impacts to the trajectory 228, to the trajectory of the obstacle 221, and to the trajectory of another nearby vehicle. The predicted impacts may be stored in a model. The updating or adjusting the predicted impacts may encompass updating the model. As a result, using the updated or adjusted predicted impacts of the updated or adjusted model, in subsequent situations, potential trajectories will place more distance between the vehicle 220 and the obstacle 221.

In FIG. 2E, a computing system (e.g., the computing system 122, or the engines/processors of the computing system 122) may sense, via the sensing engine 123, that a vehicle 230 is driving on a road with a second vehicle having a predicted trajectory 239 on an adjacent lane and a third vehicle having a predicted trajectory 231 in an opposite direction. The vehicle 230 may be implemented as the vehicle 101. The adjusting engine 124 may determine a driving action or maneuver of the vehicle 230, for example, select a trajectory, in order to keep sufficient distance between the trajectory of the vehicle 230, the predicted trajectory 231, and the predicted trajectory 239. The adjusting engine 124 may select from potential trajectories 233, 234, 235, 236, 237, and 238. The potential trajectories 233, 234, 235, 236, 237, and 238 may be based on historical data of previous trajectories in similar conditions determined by size of obstacle, traffic density, road conditions, lighting conditions, and/or weather conditions. For example, the potential trajectories 233, 234, 235, 236, 237, and 238 may be determined based on a recent driving history of the vehicle 230. The potential trajectories 233, 234, 235, 236, 237, and 238 may be recent actual trajectories, for example, during a past year, month, or week, that have highest safety metrics. The adjusting engine 124 may select the trajectory 238, based on a predicted distance between the predicted trajectory 238, the trajectory 231, and the predicted trajectory 239, as a result of the trajectories 231, predicted trajectory 238, and predicted trajectory 239 passing one another. For example, the adjusting engine 124 may select the trajectory 238 because the trajectory 238 maintains a safest overall distance between both the predicted trajectory 231 and the predicted trajectory 239, and balances risks caused by the predicted trajectory 231 and the predicted trajectory 239, without causing any of the vehicles having predicted trajectories 231 and 239, to slow down by more than an acceptable amount. For example, the adjusting engine 124 may predict that the vehicle 230, while following the trajectory 238, will maintain specific distances from the predicted trajectories 231 and 239, and the trajectory 238 will maintain a straight line. After following the trajectory 238, the determining engine 125 may determine an actual impact on the trajectory 238, the predicted trajectory 231, and the predicted trajectory 239, as a result of the trajectories passing one another. Thus, if the determining engine 125 determines that the vehicle 230 actually swerves while passing the predicted trajectories 231 and 239, or that one or more of the predicted trajectories 231 and 239 do not actually follow a straight line, or that one or more of the trajectories or predicted trajectories indicates a velocity decrease by more than an acceptable amount, the updating engine 126 may update or adjust the predicted impacts to the trajectory 238, to the predicted trajectory 231, and to the predicted trajectory 239 as a result of an interaction between the trajectory 238, to the predicted trajectory 231, and to the predicted trajectory 239. The predicted impacts may be stored in a model. The updating or adjusting the predicted impacts may encompass updating the model. As a result, using the updated or adjusted predicted impacts of the updated or adjusted model, potential trajectories will account for the swerving and non-linearity of the trajectory 238, the predicted trajectory 231, and/or the predicted trajectory 239. For instance, if the predicted trajectory 239 tends to move towards the trajectory 238, due to more space on that side of the road, the model may be updated to reflect the changes of the predicted trajectory 239. The model may be updated so that next time, a selected trajectory will not approach too closely to one of the predicted trajectories. As a result, using the updated or adjusted predicted impacts of the updated or adjusted model, potential trajectories in subsequent interactions will place more distance between the vehicle 230 and predicted trajectories.

In FIG. 2F, a computing system (e.g., the computing system 122, or the engines/processors of the computing system 122) of a vehicle 240, may sense, via the sensing engine 123, other vehicles 242, 244, 246, and 248 in an environment. The vehicle 240 may be implemented as the vehicle 101. The adjusting engine 124 may determine a driving action or maneuver of the vehicle 240 in order to account for the vehicles 242, 244, 246, and 248, while the vehicle 240 is attempting a left turn. The determined driving action or maneuver of the vehicle 240 may be based on a size and location of the vehicles 242, 244, 246, and 248. The adjusting engine 124 may predict trajectories 243, 245, 247, and 249 of the vehicles 242, 244, 246, and 248, respectively, and predict changes in the trajectories 243, 245, 247, and 249, as a result of the vehicle 240 following a selected trajectory 241. The adjusting engine 124 may further predict a change in the selected trajectory 241 of the vehicle 240 itself, resulting from interaction with the vehicles 242, 244, 246, and 248. If the adjusting engine 124 predicts that the change in the trajectory of the vehicle 240 itself exceeds an allowable range, or that the change from one or more of the predicted trajectories 243, 245, 247, and 249, exceeds an allowable range, the adjusting engine 124 may update the selected trajectory 241 or select another trajectory, so that the changes that fall outside respective allowable ranges are within the allowable ranges. For example, the adjusting engine 124 may predict that the vehicle 240, while following the trajectory 241, will maintain at least a predetermined distance from each of the predicted trajectories 243, 245, 247, and 249, without causing any of the vehicles 242, 244, 246, and 248 to slow down by more than an acceptable amount, or to deviate from each of the respective predicted trajectories 243, 245, 247, and 249. After following the trajectory 241, the determining engine 125 may determine an actual change or impact on the selected trajectory 241, and actual changes or impacts to the predicted trajectories 243, 245, 247, and 249. If the determining engine 125 determines that at least one of the actual trajectories of the vehicles 242, 244, 246, and/or 248 deviate from the predicted trajectories 243, 245, 247, and 249, respectively, or that at least one of the vehicles 242, 244, 246, and 248 decrease their respective velocities by more than an acceptable amount, the updating engine 126 may update or adjust the predicted trajectories 243, 245, 247, and 249, or a predicted impact on the predicted trajectories 243, 245, 247, and 249. The predicted trajectories 243, 245, 247, and 249 may be stored in a model. The updating or adjusting the predicted trajectories 243, 245, 247, and 249 or predicted impacts on the predicted trajectories 243, 245, 247, and 249 may encompass updating the model. For example, if the determining engine 125 determines that the trajectory 241 approaches too closely to one or the predicted trajectories, such as the predicted trajectory 243, so that the vehicle 242 must swerve, a result of this interaction may be stored in the model. The model may be updated so that next time, a selected trajectory will not approach too closely to one of the predicted trajectories. As a result, using the updated or adjusted predicted impacts of the updated or adjusted model, potential trajectories in subsequent interactions will place more distance between the vehicle 240 and predicted trajectories.

Figure 2G:
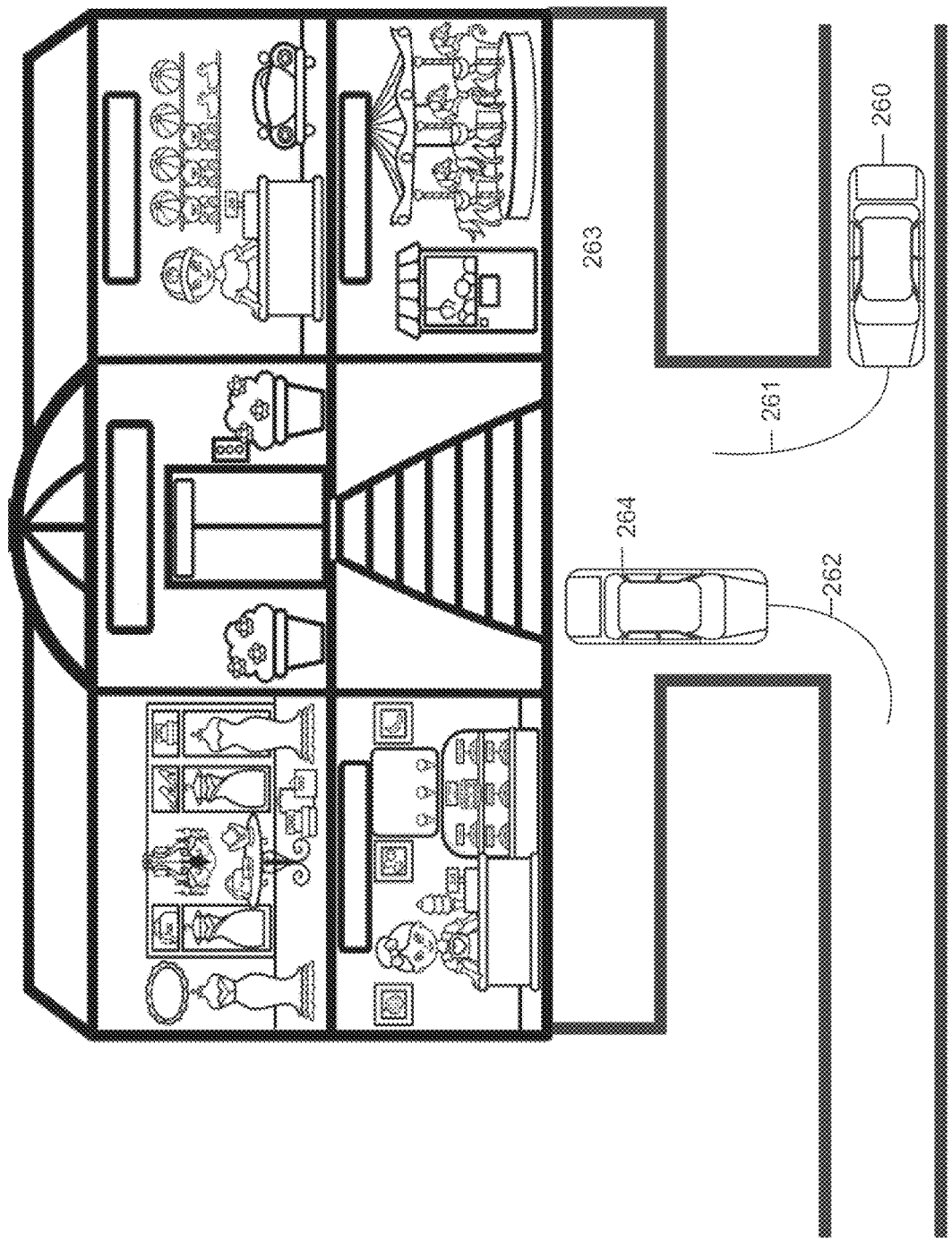
Figure 2H:
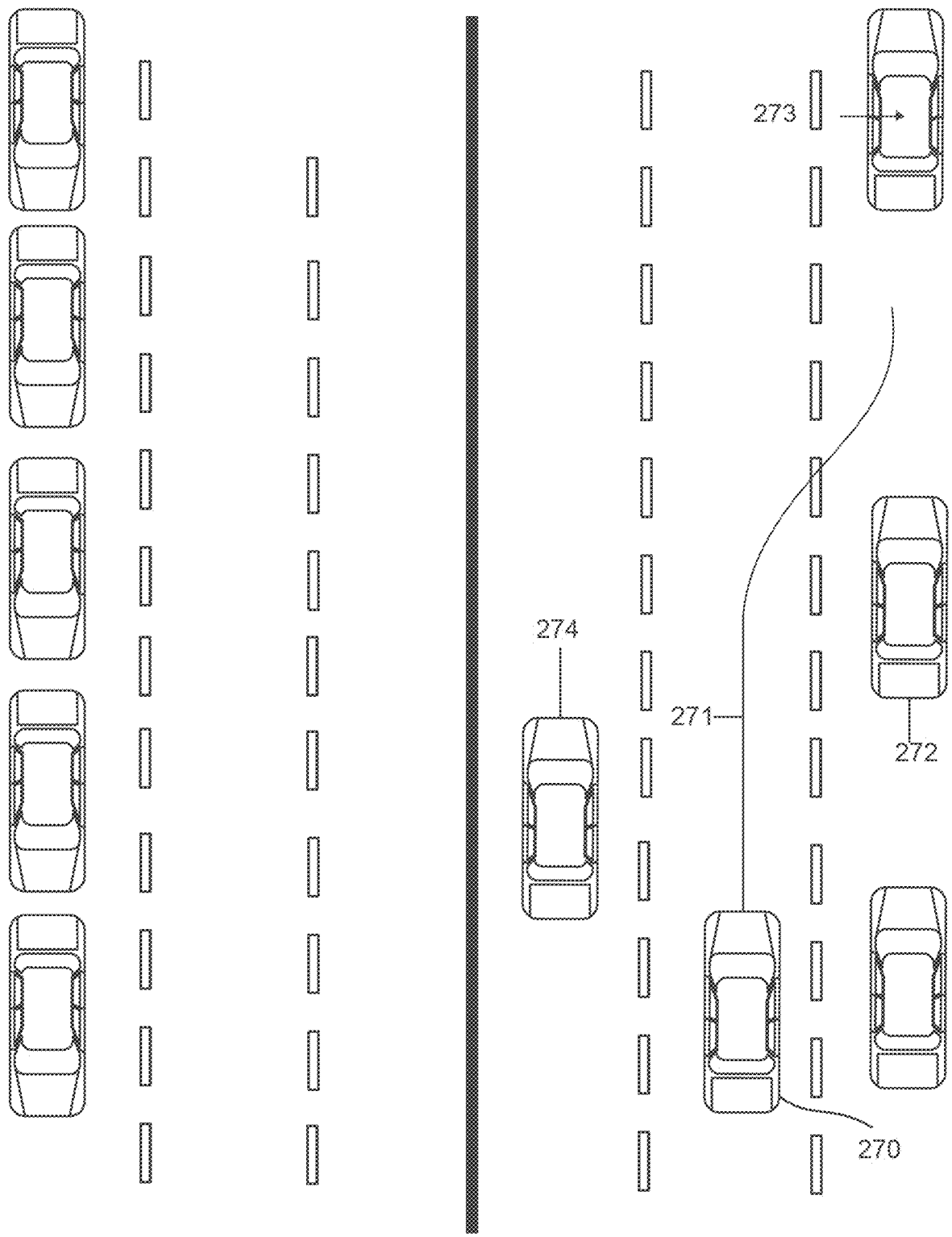

In FIG. 2G, a computing system (e.g., the computing system 122, or the engines/processors of the computing system 122) of a vehicle 260, may sense, via the sensing engine 123, other vehicles and surrounding conditions while the vehicle 260 is turning into a parking lot 263. In some embodiments, the vehicle 260 may be implemented as the vehicle 101. In some examples, an entrance to the parking lot 263 may not include clear lane dividers to separate vehicles entering the parking lot 263 and vehicles such as a vehicle 264 leaving the parking lot 263. In such examples, the computing system 122 (e.g., adjusting engine 124) may select a trajectory, such as a trajectory 261, for the vehicle 260 to follow as the vehicle 260 pulls into the parking lot 263. For example, the trajectory 261 may be one-quarter of the way from one side (e.g., a right side) of the entrance and three-quarters of the way from an opposing side (e.g., a left side) of the entrance, so that enough room may be left for the vehicle 264 that is also leaving the parking lot 263 at a same time from an opposite side, as represented by a predicted trajectory 262. The adjusting engine 124 may determine a driving action or maneuver of the vehicle 260 in order to account for the vehicle 264. The determined driving action or maneuver of the vehicle 260 may be based on a size and location of the vehicle 264. The adjusting engine 124 may predict the trajectory 262, and predict a change in the trajectory 262, as a result of the vehicle 260 following the selected trajectory 261. The adjusting engine 124 may further predict a change in the selected trajectory 261 of the vehicle 260 itself, resulting from interaction with the vehicle 264. If the adjusting engine 124 predicts that the change in the trajectory of the vehicle 260 itself exceeds an allowable range, or that the change from the predicted trajectory 262 exceeds an allowable range, the adjusting engine 124 may update the selected trajectory 261 or select another trajectory, so that the changes that fall outside respective allowable ranges are within the allowable ranges. For example, the adjusting engine 124 may predict that the vehicle 260, while following the trajectory 261, will maintain at least a predetermined distance from the predicted trajectory 262, without causing the vehicle 264 to slow down by more than an acceptable amount, or to deviate from the predicted trajectory 262. After following the trajectory 261, the determining engine 125 may determine an actual change or impact to the trajectory 261, and an actual change or impact to the predicted trajectory 262 of the vehicle 264. If the determining engine 125 determines that the actual trajectory of the vehicle 264 deviates from the predicted trajectory 262, or that the vehicle 264 decreases its velocity by more than an acceptable amount, the updating engine 126 may update or adjust the predicted trajectory 262, or a predicted impact on the predicted trajectory 262 as a result of the vehicle 260 following the trajectory 261. The predicted trajectory 262 may be stored in a model. The updating or adjusting the predicted trajectory 262 and predicted impacts on the predicted trajectory 262 may encompass updating the model. For example, if the determining engine 125 determines that the trajectory 261 approaches too closely to the predicted trajectory 262, such that the vehicle 264 actually swerves to avoid the vehicle 260, a result of this interaction may be stored in the model. The model may be updated so that next time, a selected trajectory of the vehicle 260 will not approach too closely to a predicted trajectory. As a result, using the updated or adjusted predicted impacts of the updated or adjusted model, potential trajectories in subsequent interactions will place more distance between the vehicle 260 and predicted trajectories.

In FIG. 2G, a computing system (e.g., the computing system 122, or the engines/processors of the computing system 122) of a vehicle 270, may sense, via the sensing engine 123, other vehicles and surrounding conditions while the vehicle 270 is pulling into a parking spot between vehicles 272 and 273, while maintaining at least a predetermined distance from a vehicle 274 which may currently be driving and also trying to pull into the same parking spot. The vehicle 270 may be implemented as the vehicle 101. The adjusting engine 124 may determine whether or not to "compete with" another vehicle such as the vehicle 274 for a common parking spot, based on relative positions of the vehicle 270 and 274 and a predicted trajectory of the vehicle 274, including a velocity, acceleration, and pose of the vehicle 274. If the adjusting engine 124 determines to try to obtain the parking spot, the adjusting engine 124 may select a trajectory 271. If the vehicle 270 is either unsuccessful in obtaining the parking spot, or a distance between the vehicle 271 and the vehicle 274 becomes lower than a threshold distance while both the vehicle 271 and the vehicle 274 are trying to obtain the parking spot, the determining engine 125 may store data of and a result of an interaction between the vehicle 271 and the vehicle 274 in a model, so that the vehicle 270 can refine its decision making process in a similar future situation when the vehicle 270 is attempting to pull into a parking spot.

Figure 3:
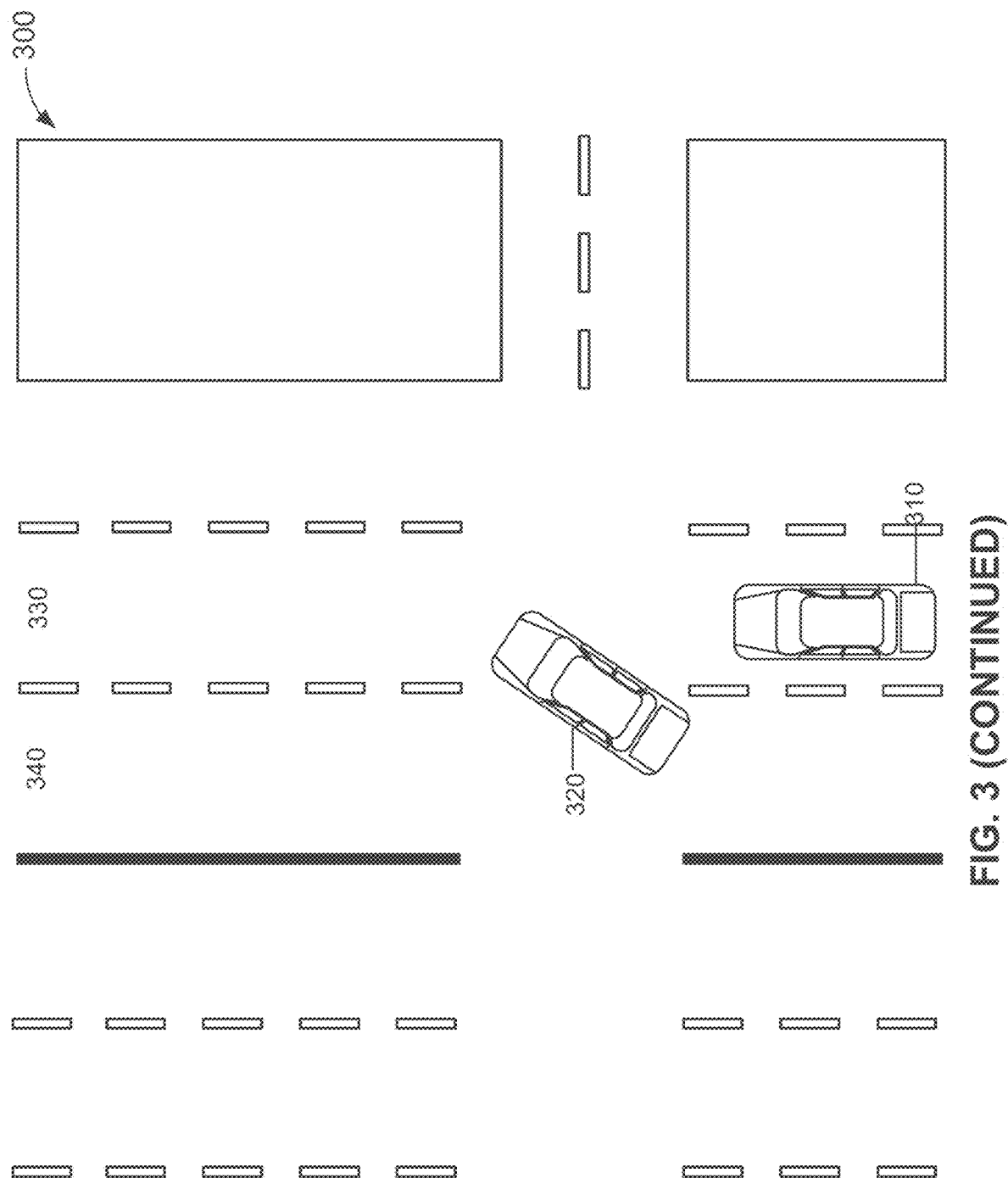

In the implementation 300 of FIG. 3, a vehicle 310, which may be implemented as the vehicle 101, may be driving in a lane 330 according to a selected trajectory 312. Another vehicle 320, which may be an AV, may be driving in a lane 340 to a left side of the vehicle 310. The another vehicle 320 may signal to the vehicle 310 that the another vehicle 320 intends to pass or overtake the vehicle 310 and merge into the lane 330. The vehicle 310 may detect and recognize, via one or more processors such as the sensing engine 123, and/or other processors, that the another vehicle 320 intends to merge into the lane 330. The vehicle 310 may, using the adjusting engine 124, determine whether or not to allow the another vehicle 320 to merge into the lane 330. The determination may comprise predicting a trajectory 328 of the another vehicle 320 and a predicted change in the selected trajectory 312 of the vehicle 310, as a result of the vehicle 310 allowing the another vehicle 320 to merge into the lane 330. For example, if a predicted change in the selected trajectory 312 exceeds an allowable amount, the vehicle 310 may not allow the another vehicle 320 to merge into the lane 330. For instance, a predicted change in the selected trajectory 312 may comprise a predicted decrease in velocity of the vehicle 310. If the vehicle 310 allows the another vehicle 320 to merge into the lane 330, one or more processors, such as the determining engine 125, of the vehicle 310 may determine an actual change in the selected trajectory 312 resulting from the merging of the another vehicle 320, and determine an actual trajectory of the another vehicle 320 during merging. If the actual change in the selected trajectory 312 deviates from the predicted change in the selected trajectory 312 by more than a threshold amount, if the actual change in the selected trajectory 312 exceeds the allowable amount, or if the actual trajectory of the another vehicle 320 during merging deviates from the predicted trajectory 328, one or more processors, such as the updating engine 126, may update or adjust the predicted trajectory 328, or a predicted impact on the selected trajectory 312, as a result of the vehicle 310 following the trajectory 312. The predicted trajectory 328, and the predicted impact on the selected trajectory 312, may be stored in a model. The updating or adjusting the predicted trajectory 328 and predicted impact on the selected trajectory 312 may encompass updating the model. For example, if the determining engine 125 determines that the another vehicle 320 follows an actual trajectory 329, such that the vehicle 310 must slow down by more than the allowable amount to keep a predetermined distance with the another vehicle 320, a result of this interaction may be stored in the model. The model may be updated so that next time, the vehicle 310 may be less likely to allow the another vehicle to merge into the lane 330. Likewise, as the vehicle 310 transmits updates to the model to other vehicles in a fleet or network, the other vehicles may also adjust their behaviors so they are less likely to try to merge in such situations.

Figure 4:
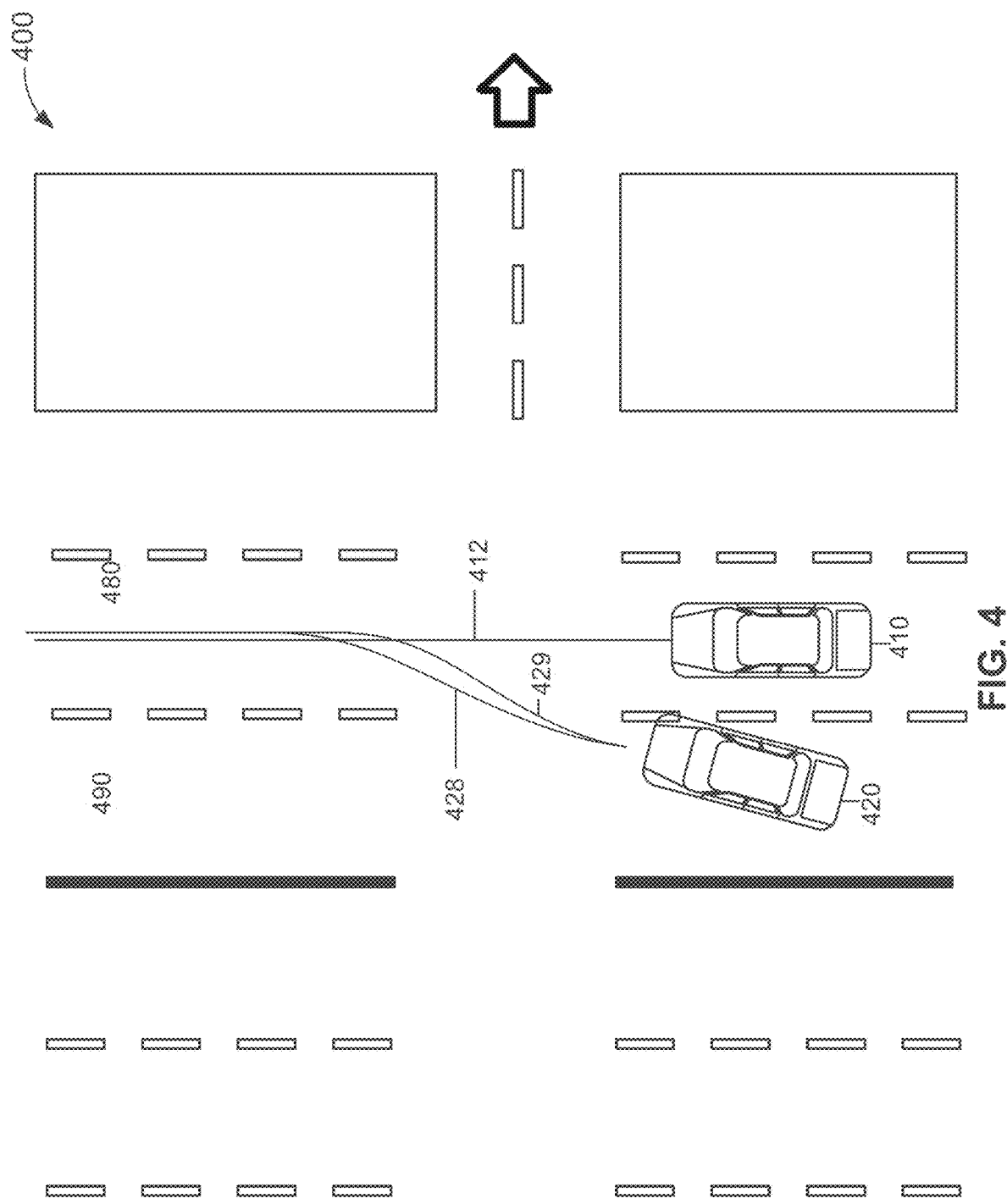
Figure 4:
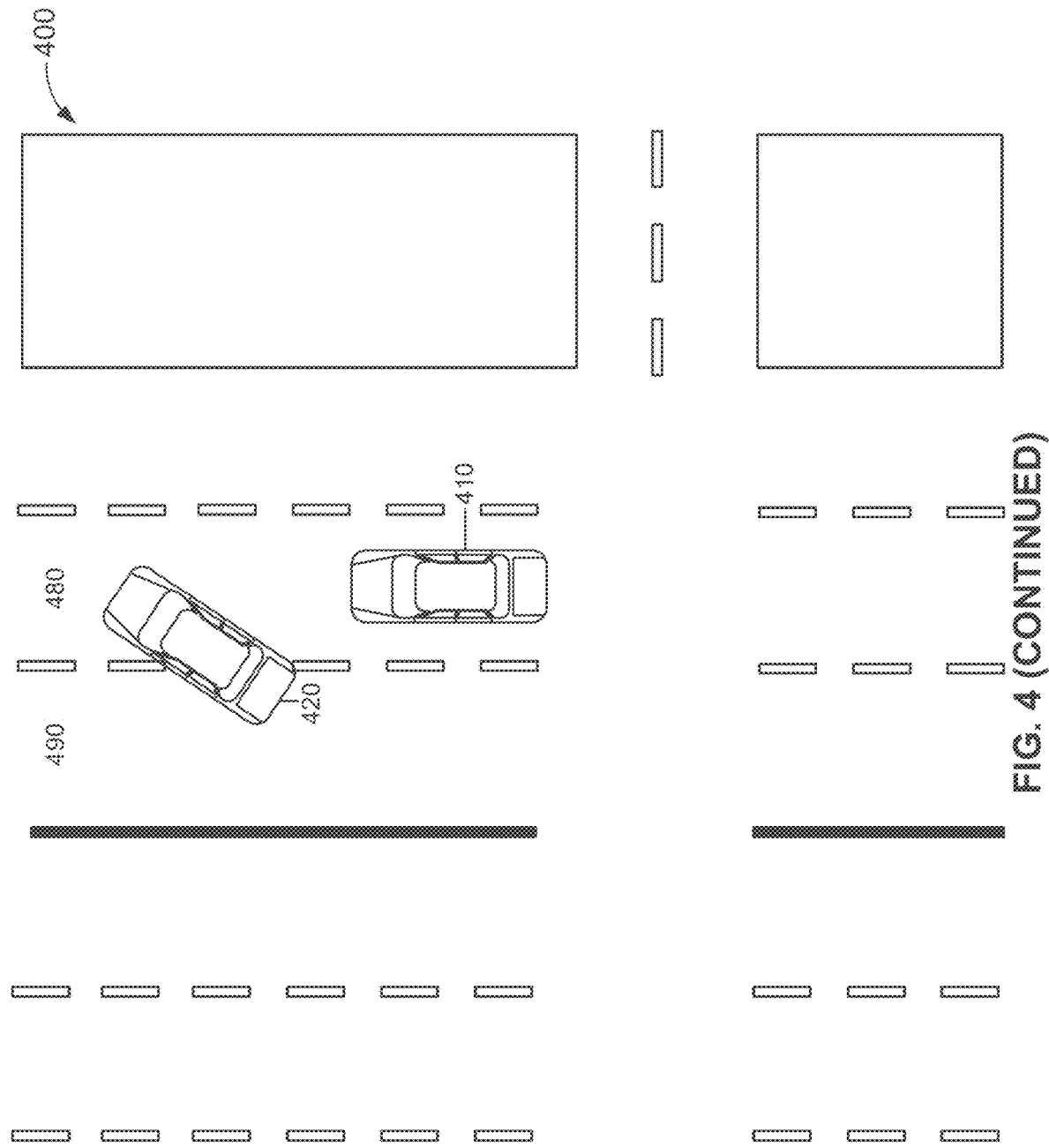

In the implementation 400 of FIG. 4, a vehicle 410, which may be implemented as vehicle 101, may be driving in a lane 480, according to a selected trajectory 412. Another vehicle 420, which may be an AV, may be driving in a lane 490 to a left side of the vehicle 410. The another vehicle 420 may urgently be attempting to merge into the lane 480 without properly signaling to the vehicle 410, that the another vehicle 420 intends to pass or overtake the vehicle 410 and merge into the lane 480. The vehicle 410 may detect and recognize, via one or more processors such as the sensing engine 123, and/or other processors, that the another vehicle 420 intends to merge into the lane 480. The vehicle 410 may, using the adjusting engine 124, determine whether or not to allow the another vehicle 420 to merge into the lane 480 by slowing down, or to speed up in order to move in front of the another vehicle 420. The determination may comprise predicting a trajectory 428 of the another vehicle 420 and a predicted change in the selected trajectory 412 of the vehicle 410, as a result of the vehicle 410 allowing the another vehicle 420 to merge into the lane 480, or as a result of speeding up. For example, if a predicted change in the selected trajectory 412 exceeds an allowable amount, as a result of allowing the another vehicle 420 to merge into the lane 480, the vehicle 410 may not allow the another vehicle 420 to merge into the lane 480. For instance, a predicted change in the selected trajectory 412 may comprise a predicted decrease in velocity of the vehicle 410. If the vehicle 410 allows the another vehicle 420 to merge into the lane 480, one or more processors, such as the determining engine 125, of the vehicle 410 may determine an actual change in the selected trajectory 412 resulting from the merging of the another vehicle 420, and determine an actual trajectory of the another vehicle 420 during merging. If the actual change in the selected trajectory 412 deviates from the predicted change in the selected trajectory 412 by more than a threshold amount, if the actual change in the selected trajectory 412 exceeds the allowable amount, or if the actual trajectory of the another vehicle 420 during merging deviates from the predicted trajectory 428, one or more processors, such as the updating engine 126, may update or adjust the predicted trajectory 428, or a predicted impact on the selected trajectory 412, as a result of the vehicle 410 following the trajectory 412. The predicted trajectory 428, and the predicted impact on the selected trajectory 412, may be stored in a model. The updating or adjusting the predicted trajectory 428 and predicted impact on the selected trajectory 412 may encompass updating the model. For example, if the determining engine 125 determines that the another vehicle 420 follows an actual trajectory 429, such that the vehicle 310 must slow down by more than the allowable amount to keep a predetermined distance with the another vehicle 420, a result of this interaction may be stored in the model. The model may be updated so that next time, the vehicle 410 may be less likely to allow the another vehicle to merge into the lane 430 so that the vehicle 410 instead will speed up to pull in front of another vehicle attempting to merge into a lane without signaling. Likewise, as the vehicle 410 transmits updates to the model to other vehicles in a fleet or network, the other vehicles may also adjust their behaviors so they are less likely to try to merge in such situations.

Figure 5:
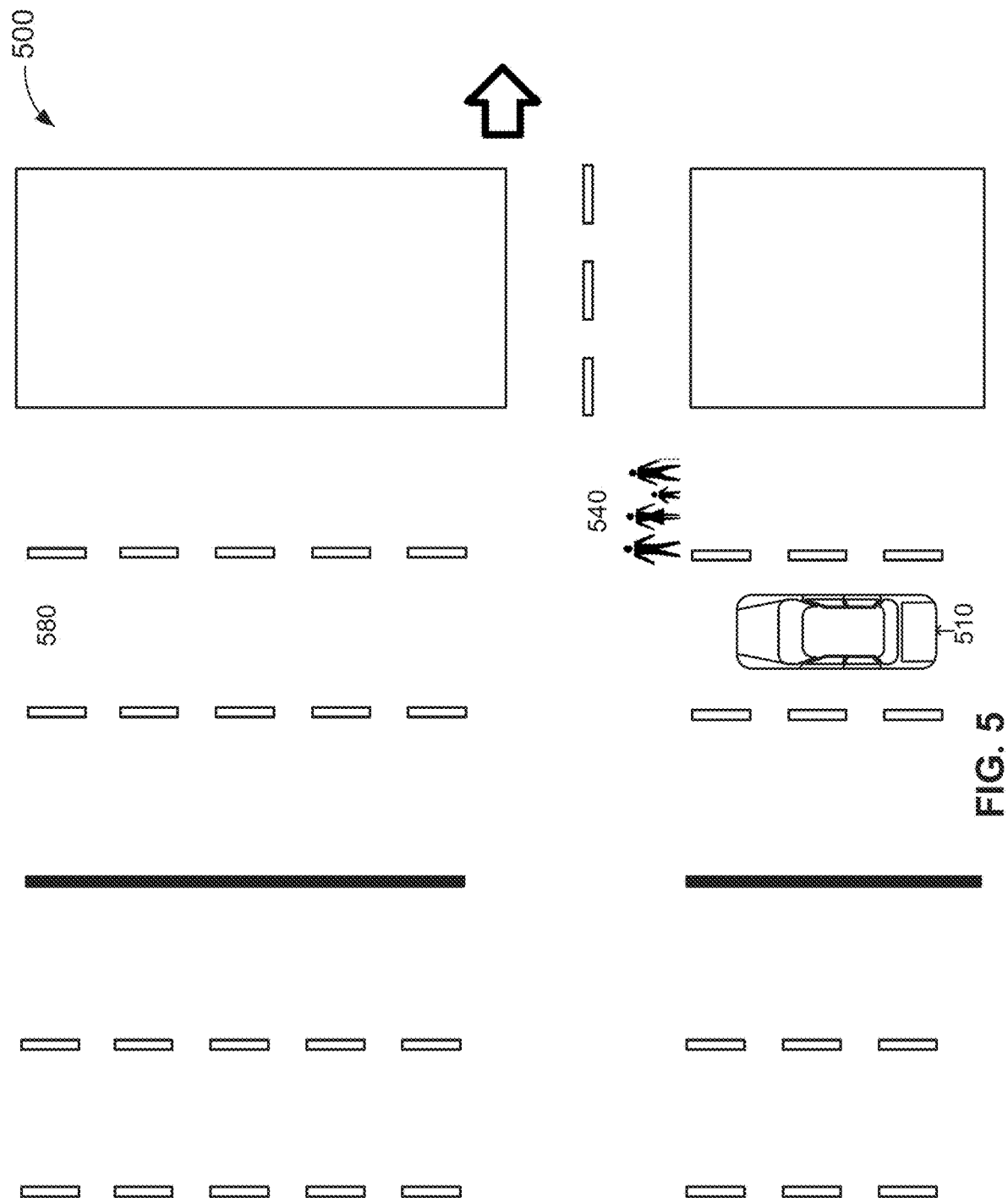

In the implementation 500 of FIG. 5, a vehicle 510, which may be implemented as vehicle 101, may be driving in a lane 580. The vehicle 510 may detect and recognize, via one or more processors such as the sensing engine 123, and/or other processors, one or more pedestrians 540 that intend to cross a street. The vehicle 510 may, using the adjusting engine 124, predict a delay time as a result of yielding to the pedestrians 540. After the pedestrians 540 have finished crossing the street, the vehicle 510 may, using the determining engine 125, determine an actual delay time as a result of yielding to the pedestrians 540. If the actual delay time deviates from the predicted delay time by more than a threshold amount, the updating engine 126 may update the predicted delay time to account for the deviation, and incorporate the updated predicted delay time in future measurements.

Figure 6:
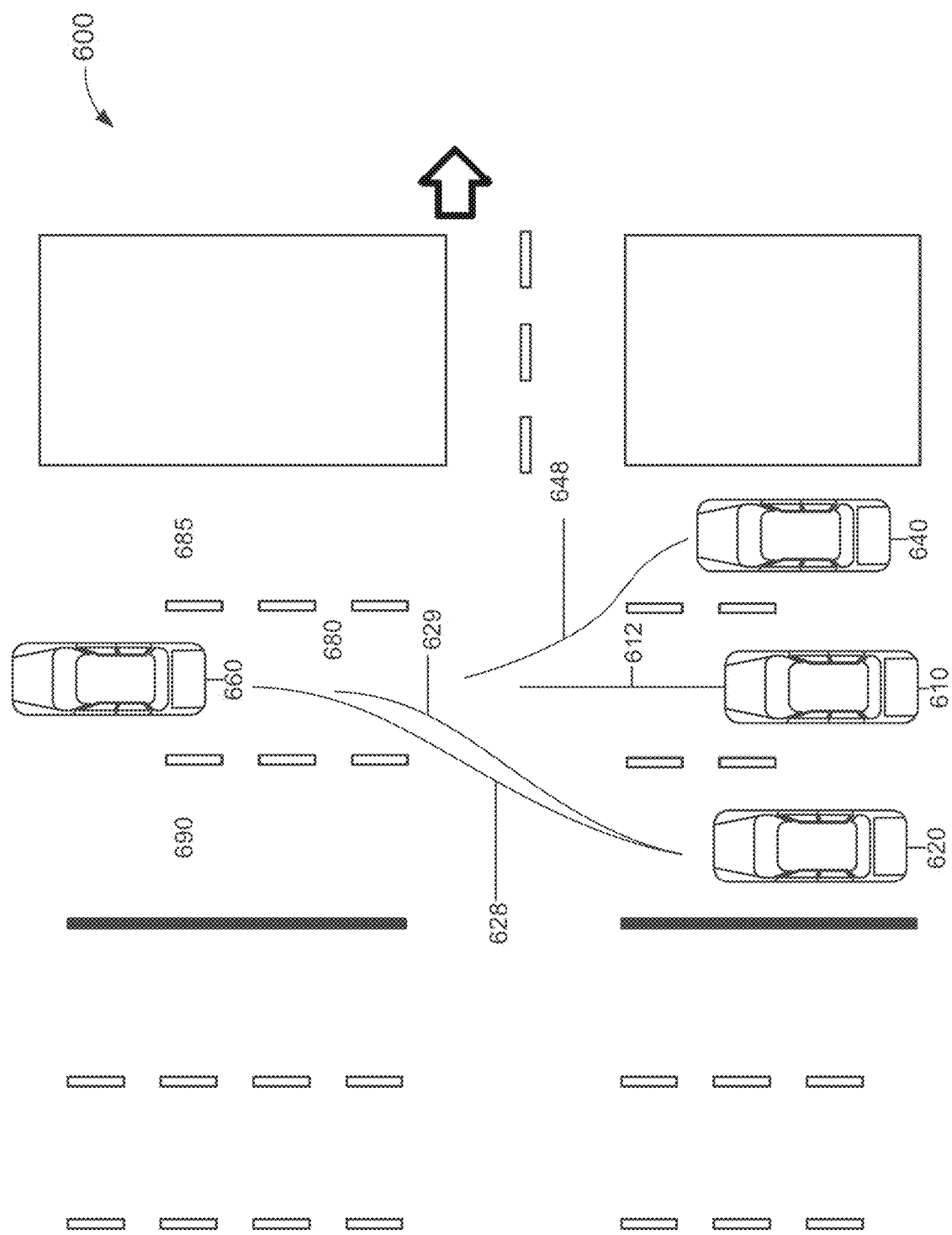
Figure 6:
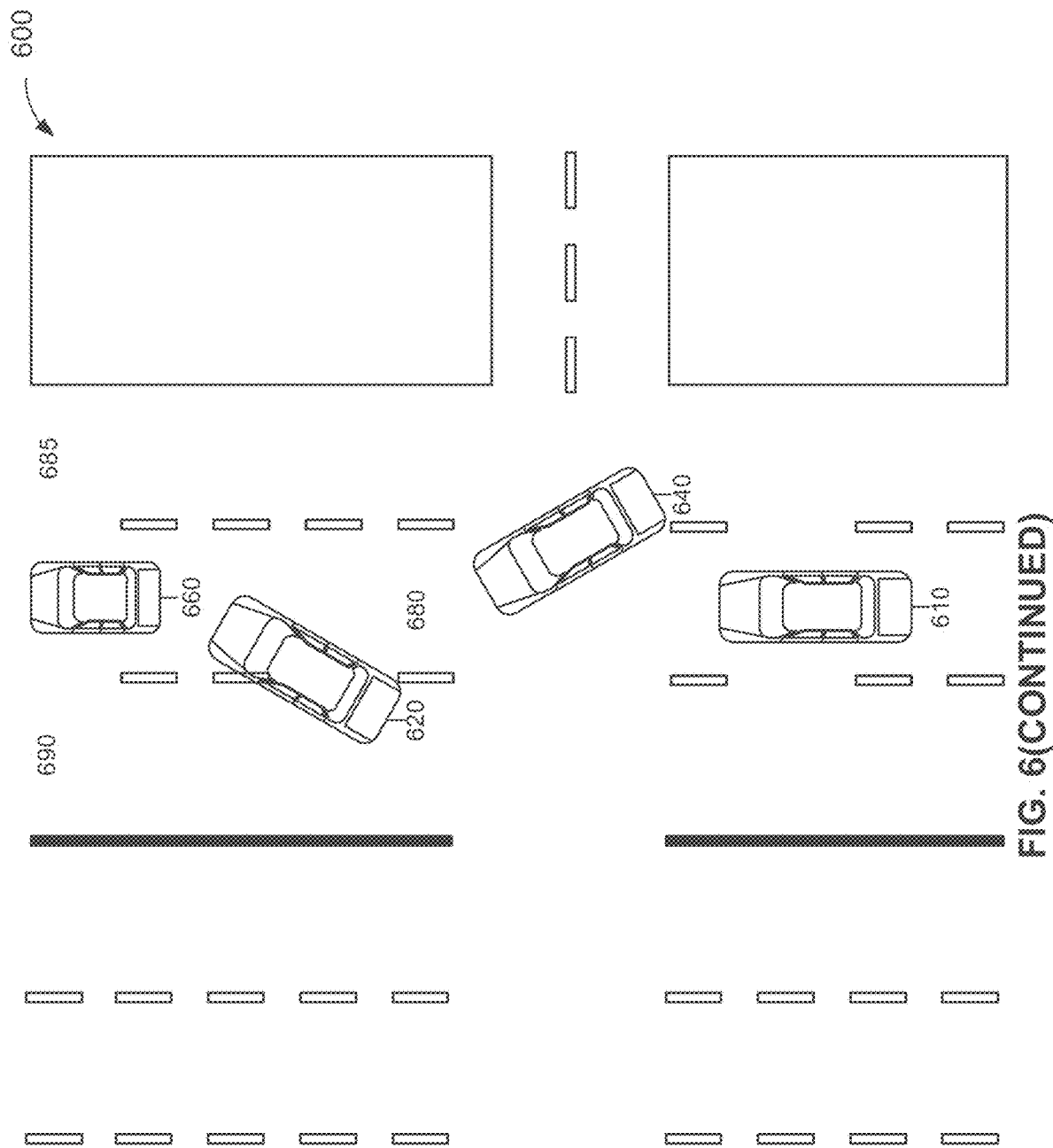

In the implementation 600 of FIG. 6, a vehicle 610, which may be implemented as vehicle 101, may be driving in a lane 680, according to a selected trajectory 612. A second vehicle 620, which may be an AV, may be driving in a lane 690 to a left side of the vehicle 410. A third vehicle 640, which may be an AV, may be driving in a lane 685 to a right side of the vehicle 610. Both the second vehicle 620 and the third vehicle 640 may be attempting to merge into the lane 680 behind a fourth vehicle 660. The vehicle 610 may detect and recognize, via one or more processors such as the sensing engine 123, and/or other processors, that the second vehicle 620 and the third vehicle 630 both intend to merge into the lane 680. The vehicle 610 may, using the adjusting engine 124, determine whether or not to allow the second vehicle 620 and the third vehicle 630 to merge into the lane 680 by slowing down, or to speed up in order to move in front of either the second vehicle 620 or the third vehicle 630. The determination may comprise predicting a trajectory 628 of the second vehicle 620, a trajectory 648 of the third vehicle 640, and a predicted change in the selected trajectory 612 of the vehicle 610, as a result of the vehicle 610 allowing one or both of the second vehicle 620 and the third vehicle 640 to merge into the lane 680, or as a result of speeding up. For example, if a predicted change in the selected trajectory 612 exceeds an allowable amount, as a result of allowing the second vehicle 620 and/or the third vehicle 640 to merge into the lane 680, the vehicle 610 may not allow the second vehicle 620 and/or the third vehicle 640 to merge into the lane 680. For instance, a predicted change in the selected trajectory 612 may comprise a predicted decrease in velocity of the vehicle 610. If the vehicle 610 allows the second vehicle 620 and/or the third vehicle 640 to merge into the lane 680, one or more processors, such as the determining engine 125, of the vehicle 610 may determine an actual change in the selected trajectory 612 resulting from the merging of the second vehicle 620 and/or the third vehicle 640, and determine an actual trajectory of the second vehicle 620 and/or the third vehicle 640 during merging. If the actual change in the selected trajectory 612 deviates from the predicted change in the selected trajectory 612 by more than a threshold amount, if the actual change in the selected trajectory 612 exceeds the allowable amount, or if the actual trajectory of the second vehicle 620 and/or the third vehicle 640 during merging deviates from the respective predicted trajectories 628 and 648, one or more processors, such as the updating engine 126, may update or adjust the respective predicted trajectories 628 and 648, or a predicted impact on the selected trajectory 612, as a result of the vehicle 610 following the trajectory 612. The predicted trajectory 628, and the predicted impact on the selected trajectory 612, may be stored in a model. The updating or adjusting the predicted trajectory 628 and predicted impact on the selected trajectory 612 may encompass updating the model. For example, if the determining engine 125 determines that the second vehicle 620 follows an actual trajectory 629, such that the vehicle 610 must slow down by more than the allowable amount to keep a predetermined distance with the second vehicle 620, a result of this interaction may be stored in the model. The model may be updated so that next time, the vehicle 610 may be less likely to allow at least one of the second vehicle 620 and the third vehicle 640 to merge into the lane 680 so that the vehicle 610 instead will speed up to pull in front of at least one vehicle attempting to merge into a lane. Likewise, as the vehicle 610 transmits updates to the model to other vehicles in a fleet or network, the other vehicles may also adjust their behaviors so they are less likely to try to merge in such situations.

Figure 7:
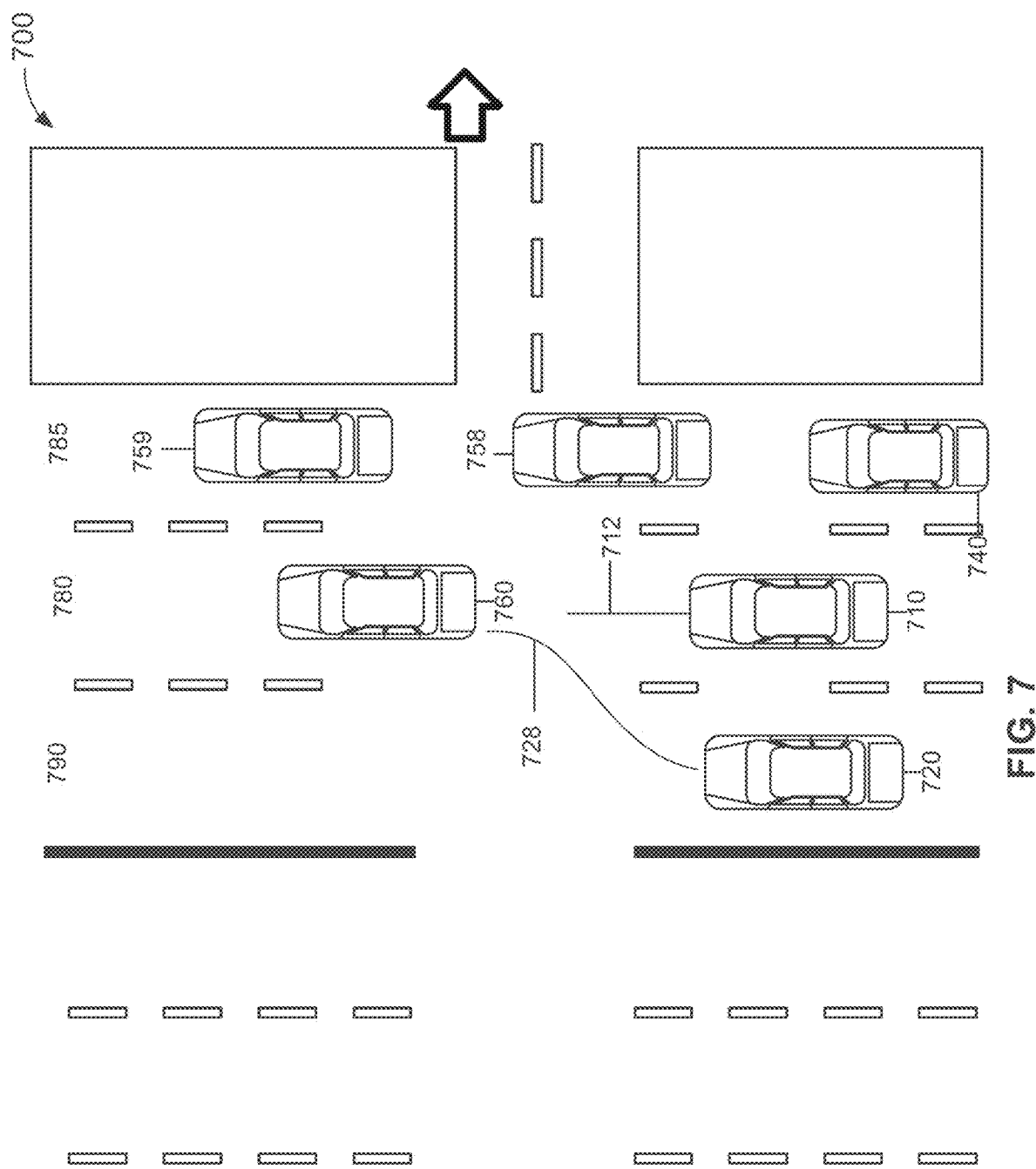
Figure 7:
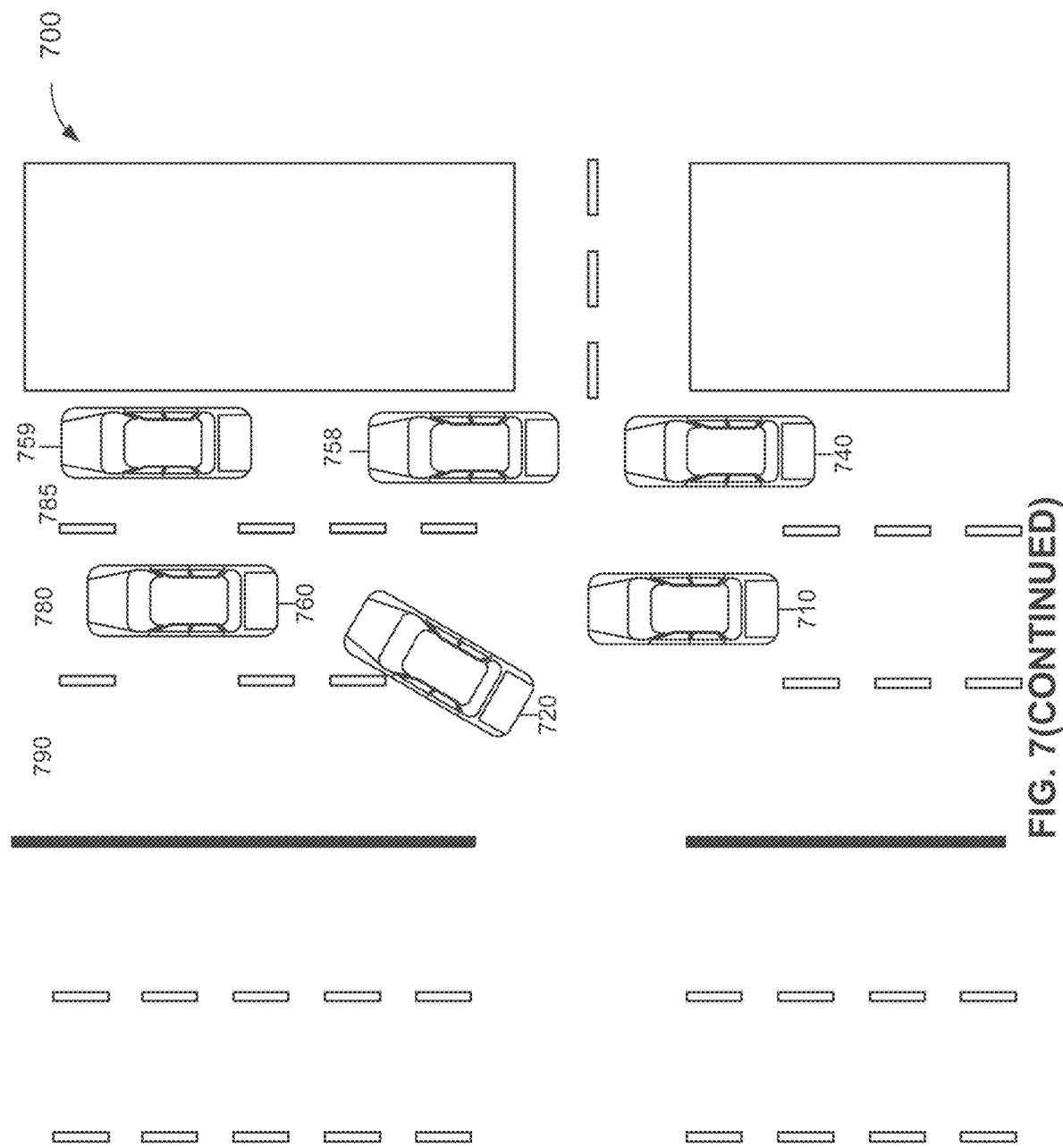

In the implementation 700 of FIG. 7, a vehicle 710, which may be implemented as vehicle 101, may be driving in a lane 780. A second vehicle 720, which may be an AV, may be driving in a lane 790 to a left side of the vehicle 710. The second vehicle 720 may intend to pass or overtake the vehicle 710 and merge into the lane 780. A third vehicle 740, which may be an AV, may be driving in a lane 785 to a right side of the vehicle 710 and also signal an intent to pass or overtake the vehicle 710 and merge into the lane 780. The vehicle 710 may detect and recognize, via one or more processors of the computing system 122, such as the sensing engine 123, that the second vehicle 720 and the third vehicle 740 intend to merge into the lane 780. In some embodiments, the vehicle 710, using one or more processors such as the adjusting engine 124, may determine to yield to only the second vehicle 720 and not yield the third vehicle 730 based on determining that a distance in front of the vehicle 710 and between the vehicle 710 and a next closest vehicle (e.g., a fourth vehicle 760, which may be an AV) may not be large enough to accommodate both the second vehicle 720 and the third vehicle 740, and determining that the distance between the vehicle 710 and the fourth vehicle 760 may only be large enough to accommodate one vehicle. To determine which of the second vehicle 720 and the third vehicle 740 to allow to merge into the lane 780, the vehicle 710 may choose whichever vehicle is in front, whichever vehicle has a larger distance from a next closest vehicle, and/or whichever vehicle more urgently requires a merge into the lane 780, among other factors. Here, the adjusting engine 124 or other processor of the computing system 122 may determine that the second vehicle 720 is in front of the third vehicle 740, so that the second vehicle 720 may have a smaller distance to travel in order to overtake the vehicle 710. The adjusting engine 124 or other processor may further determine that directly in front of the third vehicle 740 are two other vehicles 758 and 759, whereas no other vehicles are directly in front of the second vehicle 720. Based at least in part on these factors, the adjusting engine 124 or other processor may choose the second vehicle 720 to allow to merge into the lane 780. However, if the second vehicle 720 indicates that the second vehicle 720 no longer intends to merge into the lane 780, the vehicle 710 may then determine whether to allow the third vehicle 740 to merge into the lane 780.

The adjusting engine 124 may further predict a trajectory 728 of the second vehicle 720. and a predicted change in the selected trajectory 712 of the vehicle 710, as a result of the vehicle 710 allowing the second vehicle 720 to merge into the lane 780. For example, if a predicted change in the selected trajectory 712 exceeds an allowable amount, the vehicle 710 may not allow the second vehicle 720 to merge into the lane 780. For instance, a predicted change in the selected trajectory 712 may comprise a predicted decrease in velocity of the vehicle 710. If the vehicle 710 allows the second vehicle 720 to merge into the lane 780, one or more processors, such as the determining engine 125, of the vehicle 710 may analyze a result of such an action of yielding by the vehicle 710. The determining engine 125 may determine an actual change in the selected trajectory 712 resulting from the merging of the second vehicle 720, and determine an actual trajectory of the second vehicle 720 during merging. If the actual change in the selected trajectory 712 deviates from the predicted change in the selected trajectory 712 by more than a threshold amount, if the actual change in the selected trajectory 712 exceeds the allowable amount, or if the actual trajectory of the second vehicle 720 during merging deviates from the predicted trajectory 728, one or more processors, such as the updating engine 126, may update or adjust the predicted trajectory 728, or a predicted impact on the selected trajectory 712, as a result of the vehicle 710 following the selected trajectory 712. The predicted trajectory 728, and the predicted impact on the selected trajectory 712, may be stored in a model. The updating or adjusting the predicted trajectory 728 and predicted impact on the selected trajectory 712 may encompass updating the model. For example, if the determining engine 125 determines that the second vehicle 720 follows an actual trajectory 729, such that the vehicle 710 must slow down by more than the allowable amount to keep a predetermined distance with the second vehicle 720, a result of this interaction may be stored in the model. The model may be updated so that next time, the vehicle 710 may be less likely to allow another vehicle to merge into the lane 780. Likewise, as the vehicle 710 transmits updates to the model to other vehicles in a fleet or network, the other vehicles may also adjust their behaviors so they are less likely to try to merge in such situations.

Figure 8:
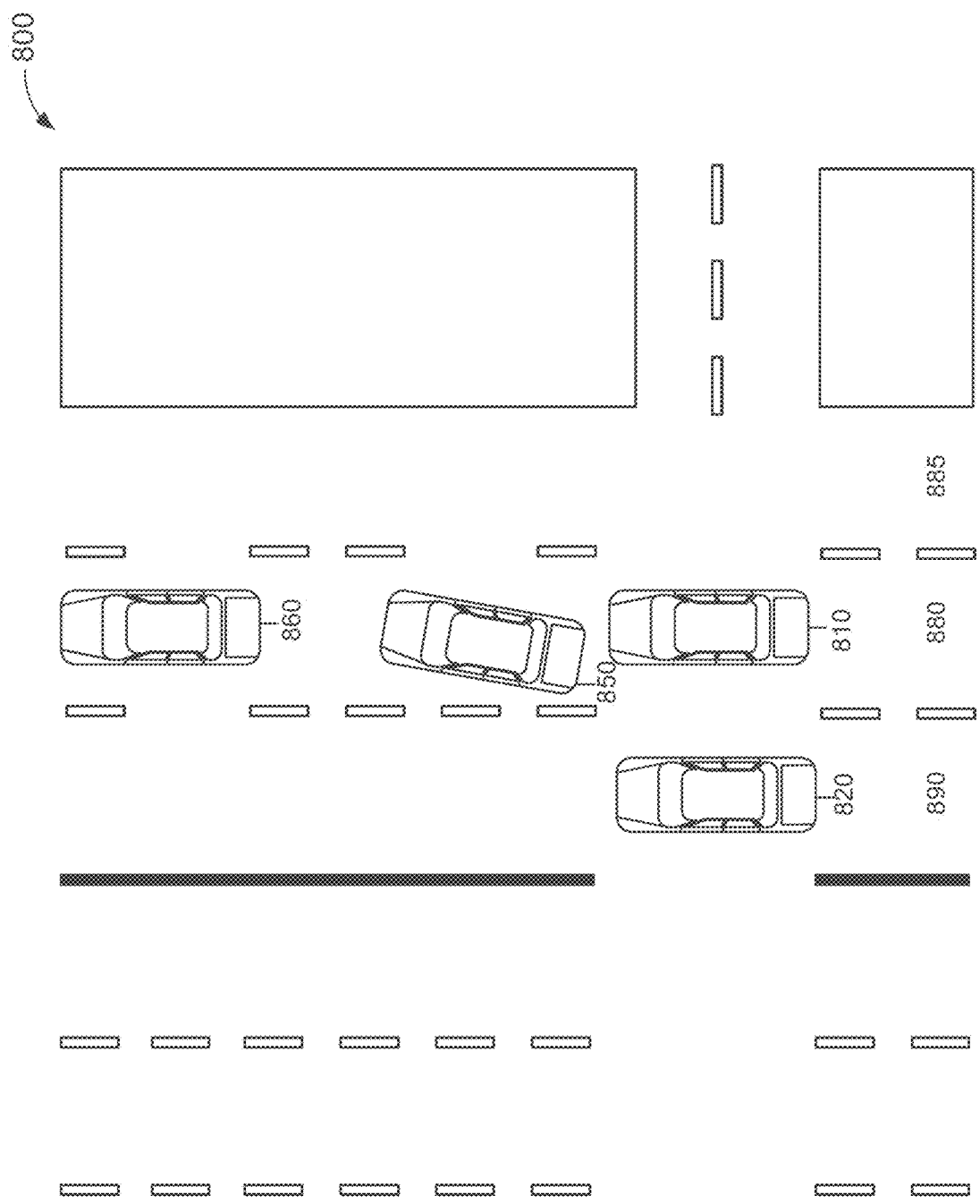

In the implementation 800 of FIG. 8, a vehicle 810, which may be implemented as the vehicle 101, may be driving in a lane 880. A second vehicle 820, which may be an AV, may be driving in a lane 890 to a left side of the vehicle 810 and intending to merge into the lane 880. A third vehicle 850, which may be an AV, may be turning into either the lane 885 or the lane 880. The vehicle 810 may detect and recognize, via one or more processors of the computing system 122 such as the sensing engine 123, that the second vehicle 820 and the third vehicle 850 intend to merge into the lane 880. In some embodiments, the vehicle 810 may determine to yield to only the third vehicle 850 and not yield the second vehicle 820 based on determining that a distance in front of the vehicle 810 and between the vehicle 810 and a next closest vehicle (e.g., a fourth vehicle 860, which may be an AV) may not be large enough to accommodate both the second vehicle 820 and the third vehicle 850, and determining that the distance between the vehicle 810 and the fourth vehicle 860 may only be large enough to accommodate one vehicle. Additionally or alternatively, the vehicle 810 may determine that allowing the second vehicle 820 to merge at a same time as the third vehicle 850 is turning at an intersection is unsafe and not allow the second vehicle 820 to merge. To determine which of the second vehicle 820 and the third vehicle 850 to allow to merge into the lane 880, the vehicle 810 may choose whichever vehicle is in front, and/or whichever vehicle more urgently requires a merge into the lane 880, among other factors. Here, one of the processors of the computing system 122 may determine that the third vehicle 850 is in front of the second vehicle 820, and that not allowing the third vehicle 850 to merge into the lane 880 may result in the third vehicle 850 being stuck at an intersection and potentially blocking traffic on multiple roads, so that the third vehicle 850 requires merging more urgently. Based at least in part on these factors, the one of the processors of the computing system 122 may choose the third vehicle 850 to allow to merge into the lane 880. However, if the third vehicle 850 successfully merges into the lane 880, or the lane 885, if a processor of the computing system 122 of the vehicle 810 determines that adequate space exists in front of the vehicle 810 to allow the second vehicle 820 to merge, and conditions are otherwise safe for merging, a processor of the computing system 122 may determine to also yield to the second vehicle 820.

During the determination of whether to yield to the third vehicle 850, the adjusting engine 124 may predict a trajectory 851 of the third vehicle 850, assuming that the third vehicle 850 is merging into the lane 880, and a predicted change in a selected trajectory 812 of the vehicle 810, as a result of the vehicle 810 allowing the third vehicle 850 to merge into the lane 880. For example, if a predicted change in the selected trajectory 812 exceeds an allowable amount, the vehicle 810 may not allow the third vehicle 850 to merge into the lane 880. For instance, a predicted change in the selected trajectory 812 may comprise a predicted decrease in velocity of the vehicle 810. If the vehicle 810 allows the third vehicle 850 to merge into the lane 880, one or more processors, such as the determining engine 125, of the vehicle 810 may analyze a result of such an action of yielding by the vehicle 810. The determining engine 125 may determine an actual change in the selected trajectory 812 resulting from the merging of the third vehicle 850, and determine an actual trajectory of the third vehicle 850 during merging. If the actual change in the selected trajectory 812 deviates from the predicted change in the selected trajectory 812 by more than a threshold amount, if the actual change in the selected trajectory 812 exceeds the allowable amount, or if the actual trajectory of the third vehicle 850 during merging deviates from the predicted trajectory 851, one or more processors, such as the updating engine 126, may update or adjust the predicted trajectory 851, or a predicted impact on the selected trajectory 812, as a result of the vehicle 810 following the selected trajectory 812. The predicted trajectory 851, and the predicted impact on the selected trajectory 812, may be stored in a model. The updating or adjusting the predicted trajectory 851 and predicted impact on the selected trajectory 812 may encompass updating the model. For example, if the determining engine 125 determines that the third vehicle 850 follows an actual trajectory 852, such that the vehicle 810 must slow down by more than the allowable amount to keep a predetermined distance with the third vehicle 850, a result of this interaction may be stored in the model. The model may be updated so that next time, the vehicle 810 may be less likely to allow another vehicle to merge into the lane 880. Likewise, as the vehicle 810 transmits updates to the model to other vehicles in a fleet or network, the other vehicles may also adjust their behaviors so they are less likely to try to merge in such situations.

Figure 9:
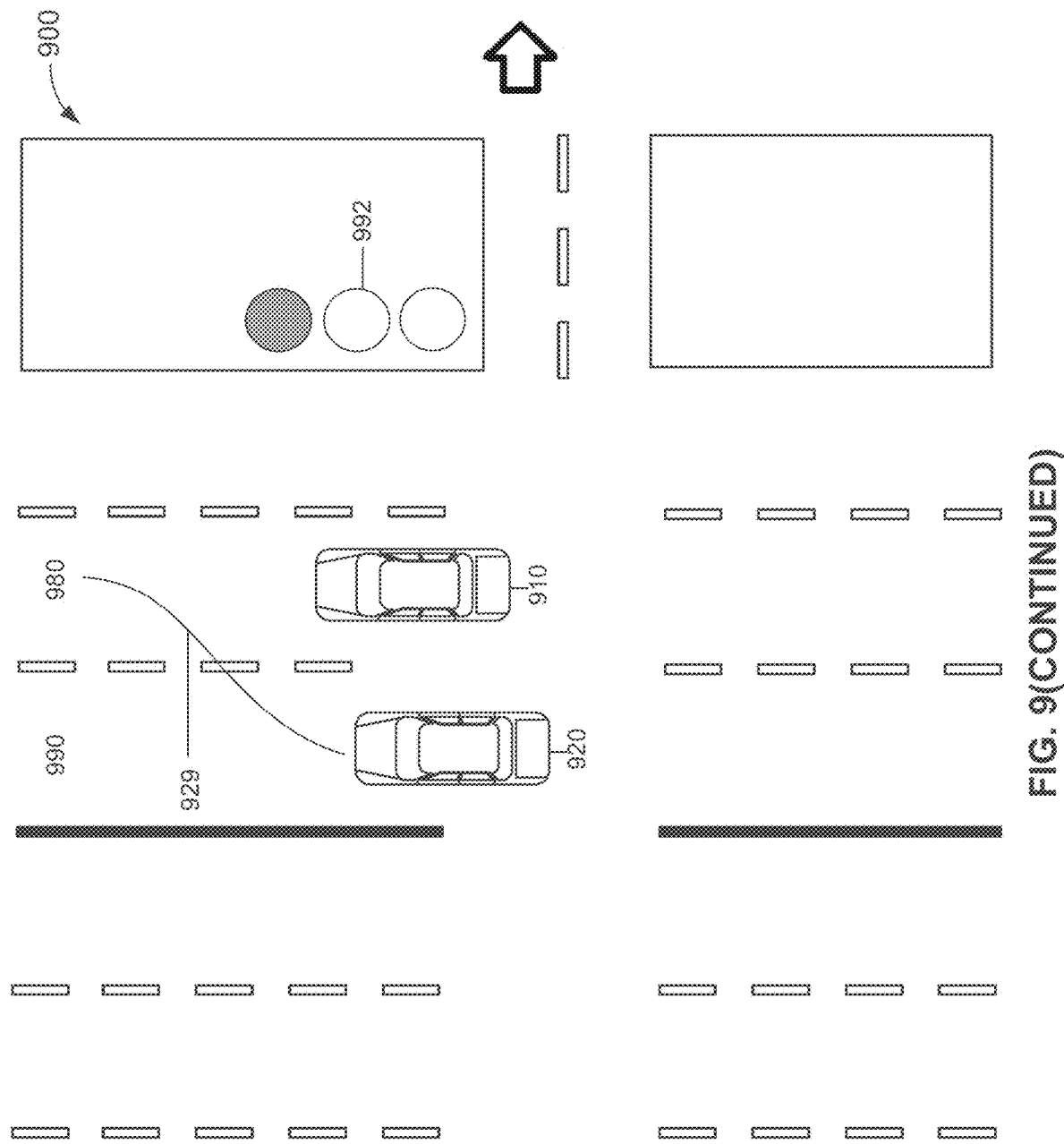
Figure 9:
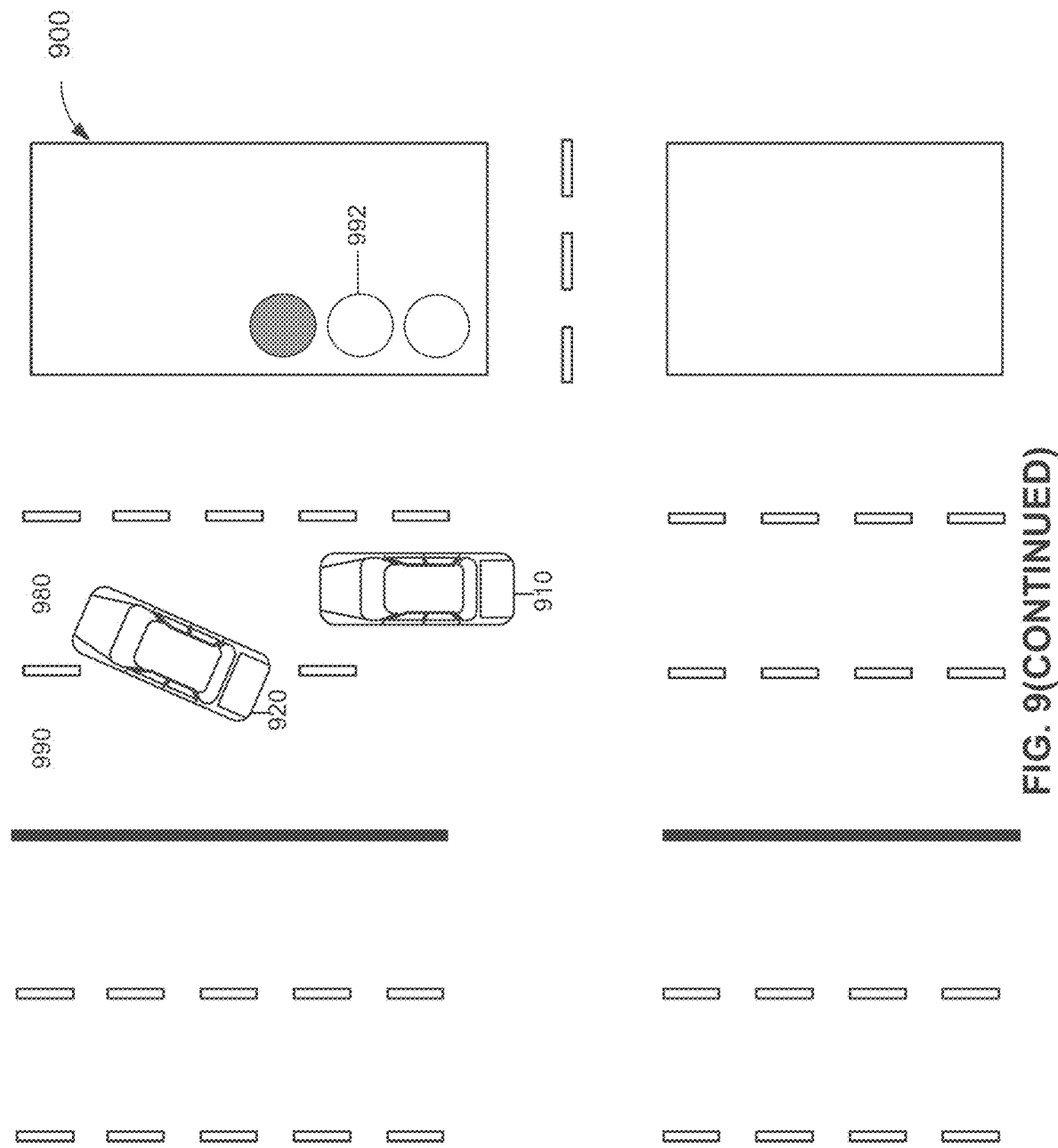

In the implementation 900 of FIG. 9, a vehicle 910, which may be implemented as vehicle 101, may be driving in a lane 980 according to a selected trajectory 912. Another vehicle 920, which may be an AV, may be driving in a lane 920 to a left side of the vehicle 910. The vehicle 910 may detect and recognize, via one or more processors such as the sensing engine 123, and/or other processors, that the another vehicle 920 intends to merge into the lane 980. The vehicle 910 may determine whether and/or when to yield in order to allow the second vehicle 920 to merge into the lane 980. In some examples, the vehicle 910 may determine whether to allow the second vehicle 920 to merge into the lane 980 based on another signal such as a traffic light signal 992. For example, if allowing the second vehicle 920 to merge into the lane 980 would be predicted to result in the vehicle 910 being caught or stuck at a red light, either immediately in front of the vehicle 910, or farther in the route (e.g., if the traffic light signal 992 is blocks or miles away), the vehicle 910 may not yield to the second vehicle 920. For example, the vehicle 910 may be approaching an intersection while the traffic light 992 is yellow. The vehicle 910 may first pass the intersection with the traffic light signal 992 before the traffic light signal 992 turns red, and then allow the second vehicle 920 to merge.

The determination of whether and when to allow the another vehicle 920 to merge into the lane 980 may comprise predicting a trajectory 928 of the another vehicle 920 and a predicted change in the selected trajectory 912 of the vehicle 910, as a result of the vehicle 910 allowing the another vehicle 920 to merge into the lane 980. For example, if a predicted change in the selected trajectory 912 exceeds an allowable amount, such as, if the vehicle 910 is predicted to be stuck at the traffic light signal 992, a time delay as a result of the vehicle 910 allowing the another vehicle 920 to merge into the lane 980 may exceed an allowable amount. In such a scenario, the vehicle 910 may not allow the another vehicle 920 to merge into the lane 980, before the vehicle 910 passes the traffic light signal 992. If the vehicle 910 allows the another vehicle 920 to merge into the lane 980, one or more processors, such as the determining engine 125, of the vehicle 910 may determine an actual change in the selected trajectory 912 resulting from the merging of the another vehicle 920, and determine an actual trajectory of the another vehicle 920 during merging. If the actual change in the selected trajectory 912 deviates from the predicted change in the selected trajectory 912 by more than a threshold amount, if the actual change in the selected trajectory 912 exceeds the allowable amount, or if the actual trajectory of the another vehicle 920 during merging deviates from the predicted trajectory 928, one or more processors, such as the updating engine 126, may update or adjust the predicted trajectory 928, or a predicted impact on the selected trajectory 912, as a result of the vehicle 910 following the trajectory 912. The predicted trajectory 928, and the predicted impact on the selected trajectory 912, may be stored in a model. The updating or adjusting the predicted trajectory 928 and predicted impact on the selected trajectory 912 may encompass updating the model. For example, if the determining engine 125 determines that the another vehicle 920 follows an actual trajectory 929, such that the vehicle 910 must slow down by more than the allowable amount to keep a predetermined distance with the another vehicle 920, a result of this interaction may be stored in the model. The model may be updated so that next time, the vehicle 910 may be less likely to allow the another vehicle to merge into the lane 980. Additionally, if the model is transmitted to other vehicles in the fleet or network, the other vehicles may be less likely to try to merge or change lanes while approaching a traffic light or a traffic light that is turning yellow.

Figure 10A:
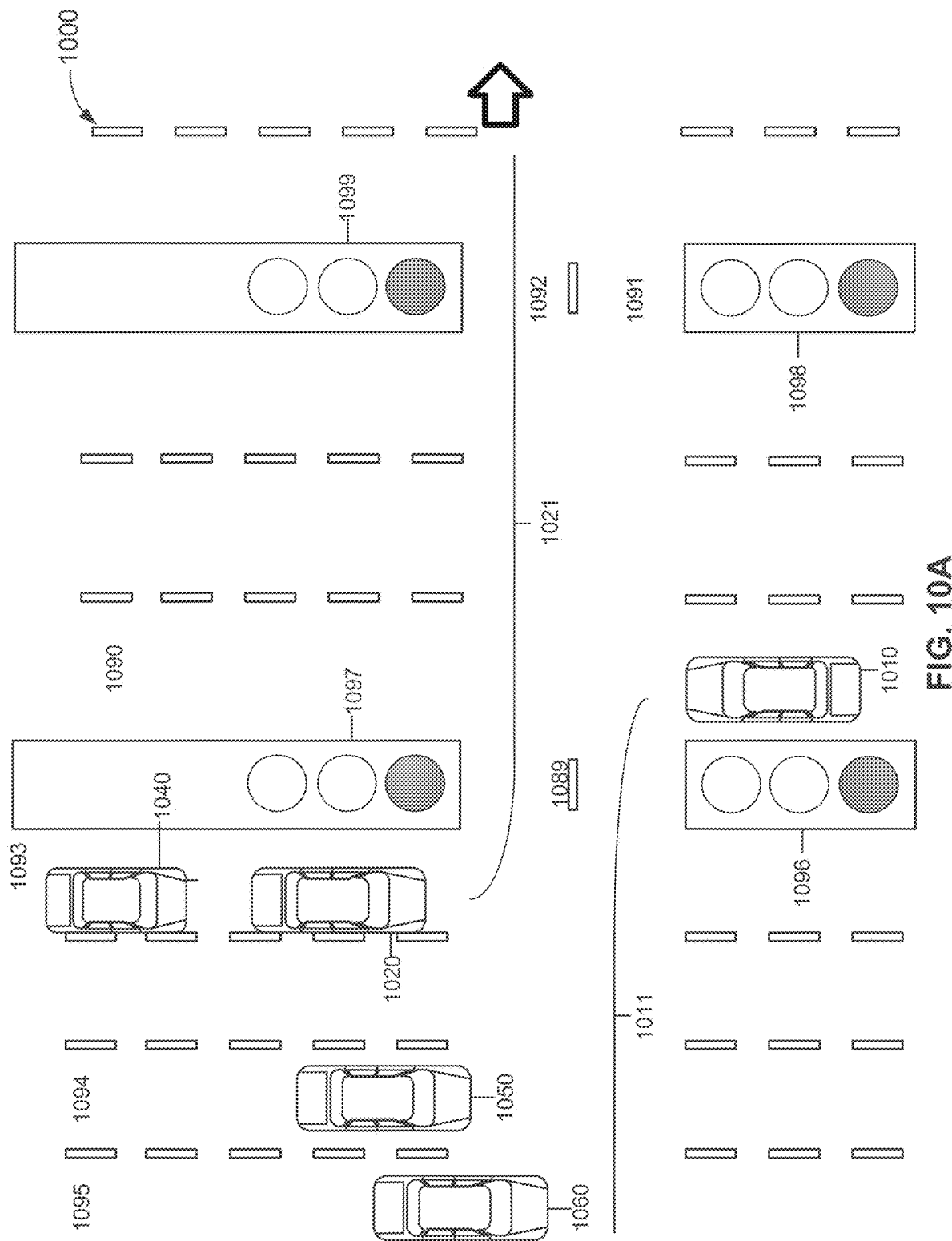
Figure 10A:
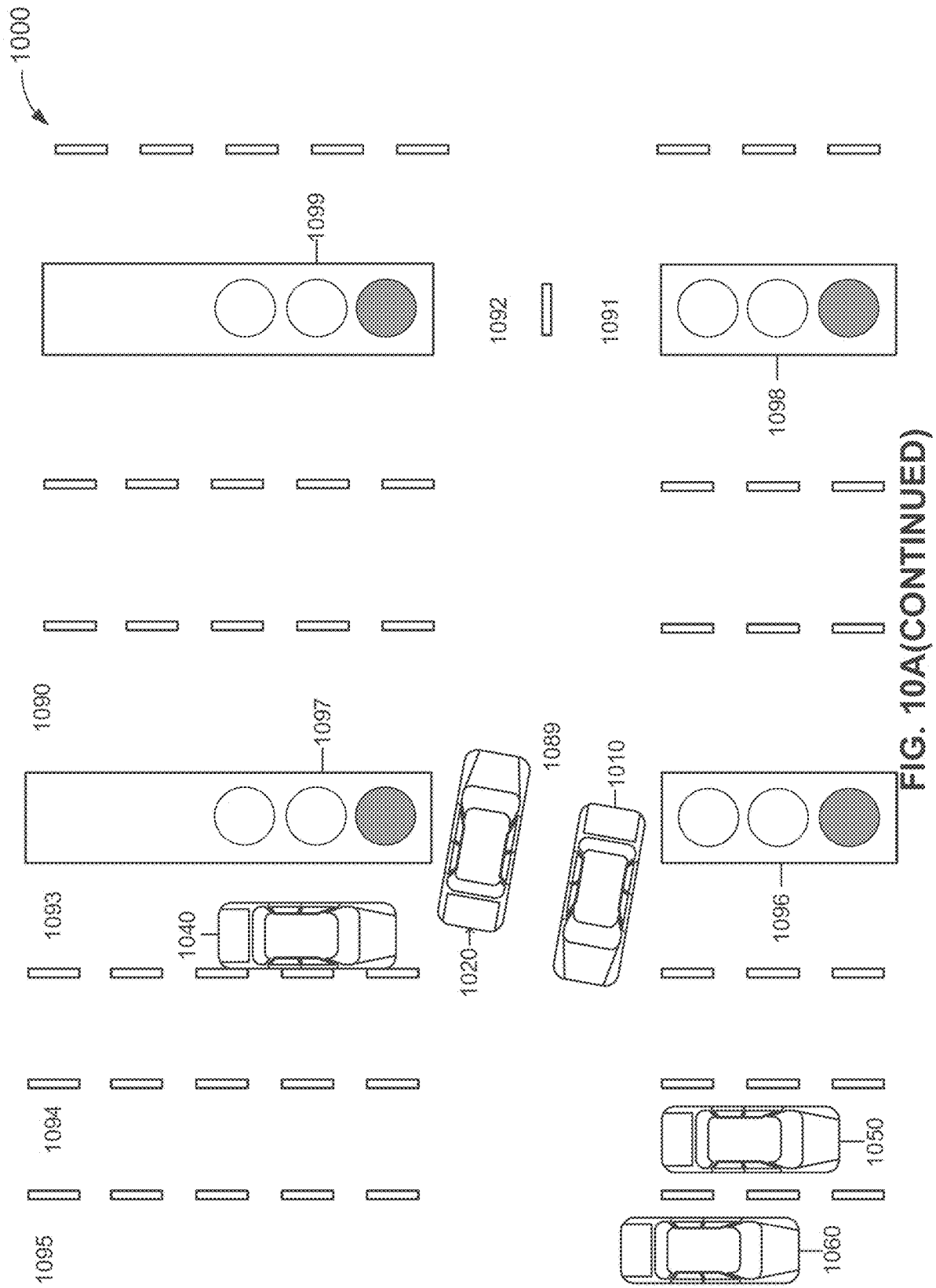

In the implementation 1000 of FIG. 10A, a vehicle 1010 may determine whether and when to make a 90 degree left turn, for example, at an intersection 1089. The vehicle 1010, which may be implemented as vehicle 101, may be driving in a lane 1090. A second vehicle 1020 and a third vehicle 1040, which may each be an AV, may be driving in a lane 1093 and travelling in an opposite direction with respect to the vehicle 1010. The second vehicle 1020 may be intending to turn left, for example, into a lane 1092. A fourth vehicle 1050 may be travelling in a lane 1094 and a fifth vehicle 1060 may be travelling in a lane 1095, in a same direction as the second vehicle 1020 before the second vehicle and the third vehicle 1040. When the vehicle 1010 approaches an intersection 1089, the vehicle 1010 may detect and recognize one or more traffic lights 1096, 1097, 1098, and 1099, via one or more processors of the computing system 122 such as the sensing engine 123. In some embodiments, the traffic lights 1096 and 1098 may comprise arrows indicating whether a vehicle is protected in making a turn. The vehicle 1010 may determine whether or not, and/or when, to make a 90-degree turn at an intersection 1089 at least based on a signal of the one or more traffic lights 1096, 1097, 1098, and 1099, for example, whether the traffic light 1096 has a current state indicated by a green arrow that permits the protected left turn, or indicated by a solid green light that permits an unprotected left turn. If the traffic light 1096 is indicated by the solid green light, one or more processors of the vehicle 1010 such as the sensing engine 123 may determine whether and when to make a left turn based on respective distances from the intersection 1089 of one or more of the second, third, fourth, and fifth vehicles 1020, 1040, 1050, and 1060, respective velocities of the second, third, fourth, and fifth vehicles 1020, 1040, 1050, and 1060, and predicted trajectories, such as a predicted trajectory 1021 of the second vehicle 1020.

Figure 10B:
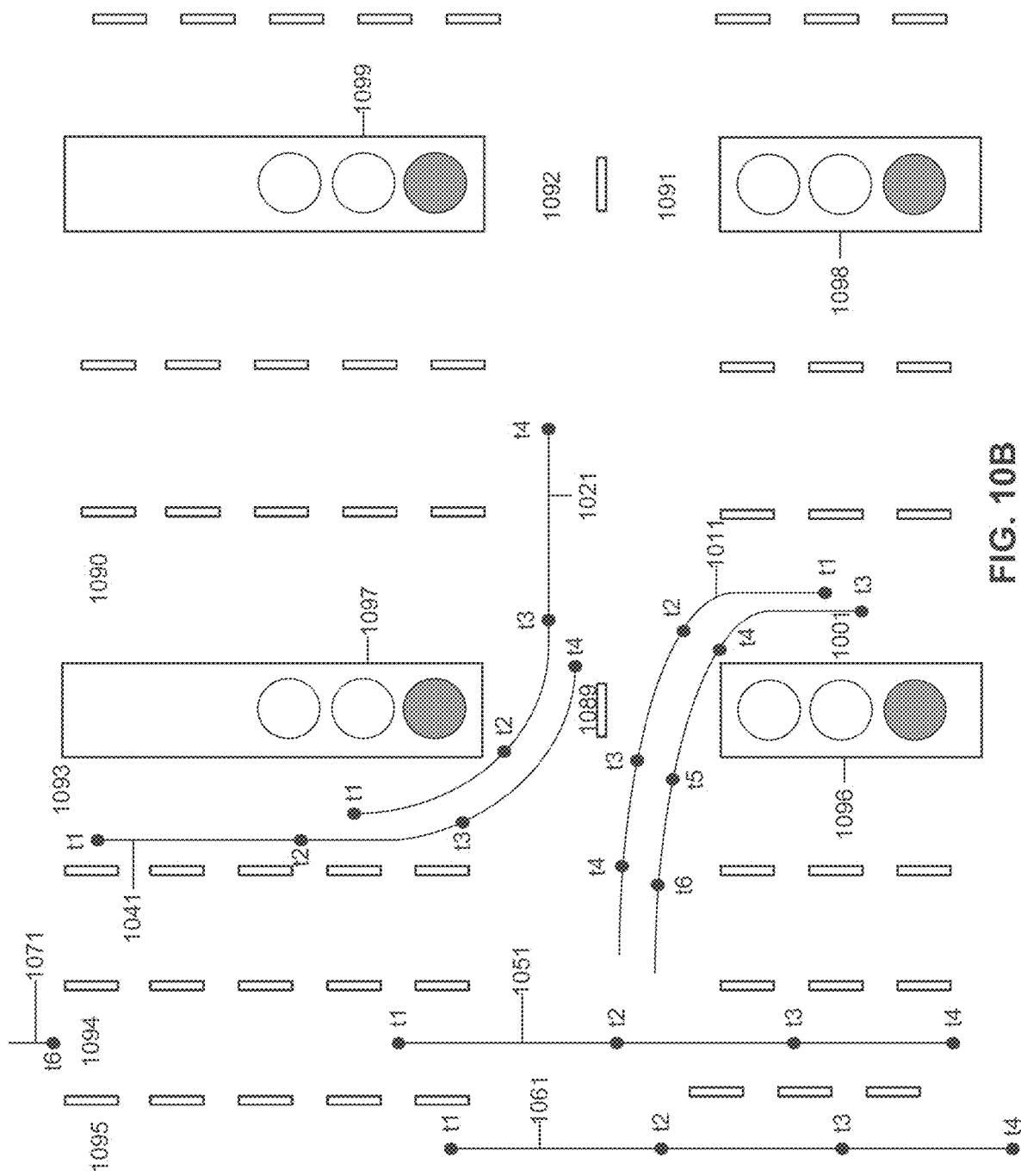

As shown in FIG. 10B, one or more processors of the vehicle 1010, such as the adjusting engine 124, may predict trajectories of each of the trajectories or paths of one or more of the second vehicle 1020, the third vehicle 1040, the fourth vehicle 1050, and the fifth vehicle 1060, based at least in part on the respective speeds or velocities of the second vehicle 1020, the third vehicle 1040, the fourth vehicle 1050, the fifth vehicle 1060, and any pedestrians passing through the intersection 1089. One or more processors of the vehicle 1010 may further predict trajectories or paths of one or more of the second vehicle 1020 and the third vehicle 1040 based in part on a turning angle or radius of the one or more of the second vehicle 1020 and the third vehicle 1040. One or more processors of the vehicle 1010 may further predict trajectories or paths of one or more of the second vehicle 1020 and the third vehicle 1040, if the second vehicle 1020 and/or the third vehicle 1040 does not actually make a left turn even though the second vehicle 1020 and/or the third vehicle 1040 are signaling their intents to make a left turn. For example, the second vehicle 1020 and/or the third vehicle 1040 may change intended paths from a left turn to going straight. One or more processors of the vehicle 1010 may further predict a trajectory or path of the vehicle 1010 based on a velocity of the vehicle 1010 and a turning angle or turning radius of the vehicle 1010. One or more processors of the vehicle 1010 may further determine that it is safe for the vehicle 1010 to make a 90-degree left turn in response to the predicted trajectories or paths of the vehicle 1010 being separated from the trajectories or paths of one or more of the second vehicle 1020, the third vehicle 1040, the fourth vehicle 1050, and the fifth vehicle 1060 by at least a threshold distance at any time period, or at all instances of the time period, during which any portion of the vehicle 1010 is predicted to cross or traverse the lanes 1093, 1094, and 1095, and otherwise determine that it is not safe for the vehicle 1010 to make the 90-degree left turn if the predicted trajectories or paths of the vehicle 1010 are not separated from the trajectories or paths of one or more of the second vehicle 1020, the third vehicle 1040, the fourth vehicle 1050, and the fifth vehicle 1060 by at least a threshold distance during a period at which any portion of the vehicle 1010 is predicted to cross or traverse the lanes 1093, 1094, and 1095. One or more processors of the vehicle 1010 may further determine that it is safe for the vehicle 1010 to make a 90-degree left turn if, or in response to, the predicted trajectories or paths of the vehicle 1010 being separated from the trajectories or paths of the one or more pedestrians by more than a second threshold distance at any time during which any portion of the vehicle crosses or traverses the intersection 1089. In response to the one or more processors of the vehicle 1010 determining that it is safe for the vehicle 1010 to make a 90-degree left turn, one or more processors may direct, instruct, or control the vehicle 1010 to initiate the 90-degree left turn.

If the vehicle 1010 initiates a 90-degree left turn, one or more processors of the vehicle 1010 may take precautions to further reduce or eliminate a possibility of a collision. For example, the vehicle 1010 may be controlled to stop, or speed up to avoid a collision, if a distance between the vehicle 1010 and any of the second vehicle 1020, the third vehicle 1040, the fourth vehicle 1050, and the fifth vehicle 1060 is less than a threshold distance at any time during which any portion of the vehicle 1010 crosses or traverses the lanes 1093, 1094, and 1095. As another example, once a vehicle 1010 initiates a 90-degree left turn, the vehicle 1010 may be controlled to stop before a front of the vehicle 1010 traverses into the lane 1093, if the second vehicle 1020 is approaching the intersection 1089 and within a threshold distance of the vehicle 1010, even if the second vehicle 1020 is signaling an intent to turn. In such a manner, the vehicle 1010 may ensure that the second vehicle 1020 actually makes a 90-degree left turn at the intersection 1089, and would avoid a collision in case the second vehicle 1020 changes course right before the intersection 1089 and actually drives straight into and past the intersection 1089. In some examples, the vehicle 1010 may perform an action based on a likelihood of avoiding a collision with the second vehicle 1020, such as, performing an action most likely to avoiding the collision.

In FIG. 10B, one or more processors of the vehicle 1010 may predict one or more paths or trajectories 1021, 1041, 1051, and 1061, of the second vehicle 1020, the third vehicle 1040, the fourth vehicle 1050, and the fifth vehicle 1060, respectively. Each of the one or more paths or trajectories 1021, 1041, 1051, and 1061 may comprise predicted positions of each of the respective vehicles at discrete times t1, t2, t3, and t4. The one or more processors of the vehicle 1010 may further select a path or trajectory 1011 of the vehicle 1010 itself. The one or more processors of the vehicle 1010 may determine whether the path 1011 is separated by at least a threshold distance from each of the paths 1021, 1041, 1051, and 1061, at each of the times t1, t2, t3, and t4. In response to a positive determination that the path 1011 is separated by at least a threshold distance from each of the paths 1021, 1041, 1051, and 1061, at each of the times t1, t2, t3, and t4, the one or more processors may determine that it is safe for the vehicle 1010 to make a left turn beginning at time t1, and initiate the left turn. In response to a negative determination, for example, that the path 1011 is not separated by at least a threshold distance from each of the paths 1021, 1041, 1051, and 1061, at each of the times t1, t2, t3, and t4, the one or more processors may further predict another path or trajectory 1001 of the vehicle 1010 at a different start time t3, and determine whether the path or trajectory 1001 is separated by at least a threshold distance from each of the paths 1021, 1041, 1051, 1061, and 1071 of other vehicles at each of the times t3, t4, t5, and t6, similar to the process above with the path 1011. In some embodiments, the one or more processors of the vehicle 1010 may also determine whether the path 1011 is separated by at least a second threshold distance from predicted paths of other pedestrians at each discrete time (e.g., t1, t2, t3, t4, t5, t6). By selecting a trajectory or path 1011 that is separated from other predicted trajectories by more than a threshold distance at all times, the one or more processors of the vehicle 1010 such as the adjusting engine 124 may predict that by turning left, none of the predicted trajectories would change by more than an allowable amount and the selected trajectory 1011 would not change by more than a permitted amount. For instance, a predicted change in the predicted trajectory 1021, 1041, 1051, 1061, or 1071 may comprise a predicted decrease in a velocity of the corresponding vehicles 1020, 1040, 1050, 1060, and 1070 (not shown). Thus, the adjusting engine 124 may predict that the vehicle 1010 turning left would not cause any of the other vehicles to swerve or to slow down by more than an allowable amount, or cause the vehicle 1010 itself to swerve or slow down by more than the permitted amount. If the vehicle makes a left turn, one or more processors, such as the determining engine 125, of the vehicle 1010 may determine an actual trajectory of the vehicle 1010, and determine actual trajectories of the vehicles 1020, 1040, 1050, 1060, and 1070 resulting from the left turn by the vehicle 1010. The determining engine 125 may determine whether any of the actual trajectories differ at all, or by more than the allowable or permitted amount, from respective selected or predicted trajectories 1011, 1021, 1041, 1051, 1061, and 1071, at any time point. In response to a positive determination, the determining engine 125 may update or adjust any of the predicted trajectories 1021, 1031, 1041, 1061, and/or 1071, or adjusts weights of selected trajectories so that the vehicle 1010 would be more likely to select a different trajectory next time.

The predicted trajectories 1021, 1031, 1041, 1061, and/or 1071, and how predicted trajectories may be impacted, for example, by another vehicle action such as a vehicle making a left turn, may be stored in a model. The updating or adjusting the predicted trajectories 1021, 1031, 1041, 1061, and/or 1071 may encompass updating the model. For example, the determining engine 125 may determine that the vehicles 1050 and 1060 approaching through the intersection 1089 actually slow down more than was predicted, or, that the vehicles 1050 and 1060 actually speed up when a vehicle such as the vehicle 1010 from an opposite side of traffic is making a left turn. The updating engine 126 may store data of the interaction into the model to update the model to provide improved predictions of vehicle trajectories next time in a similar situation. As the information may be sent to other vehicles in the fleet or network, the other vehicles may also be better equipped to interact with other traffic during a similar situation.

Figure 11:
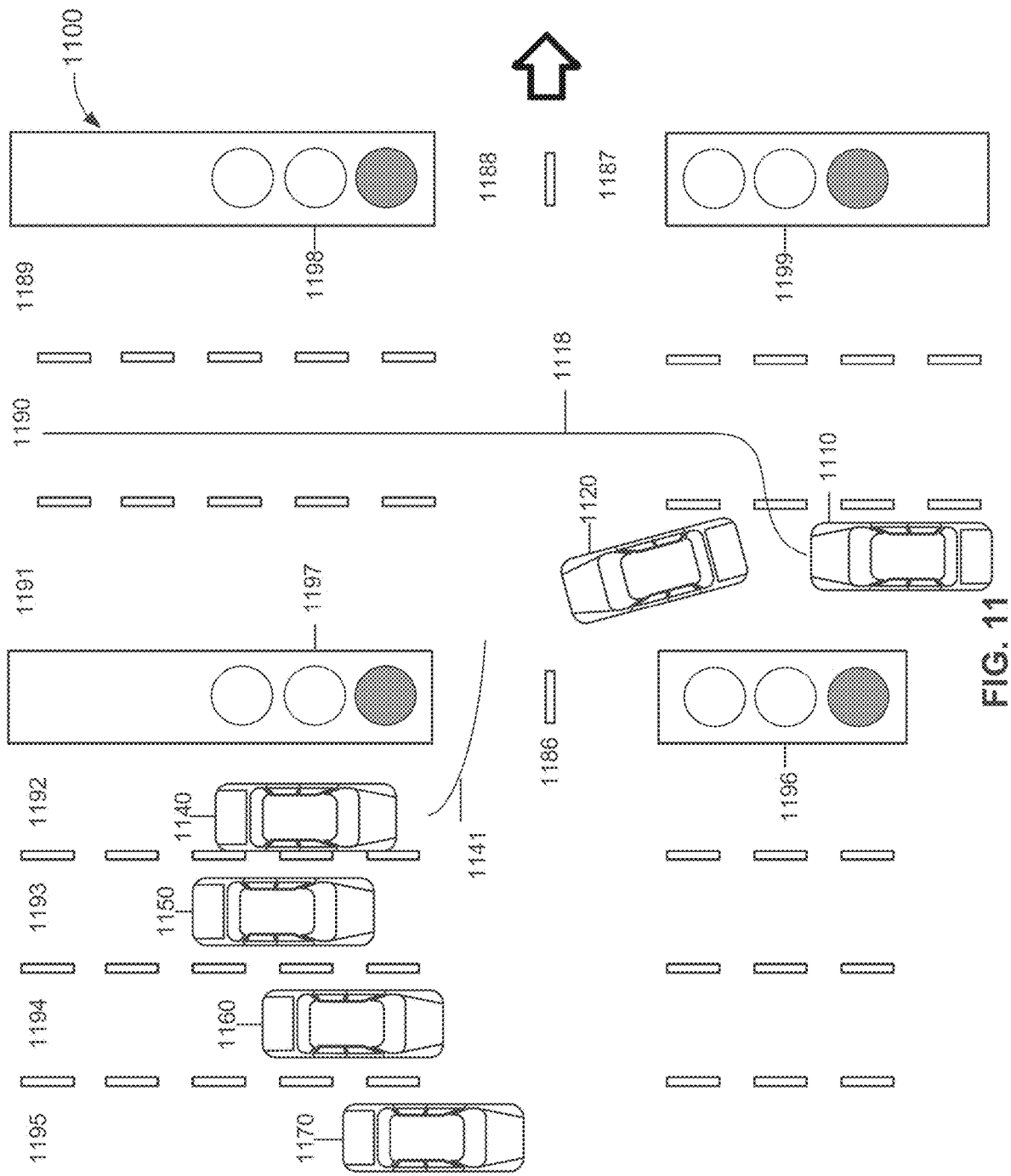
Figure 11:
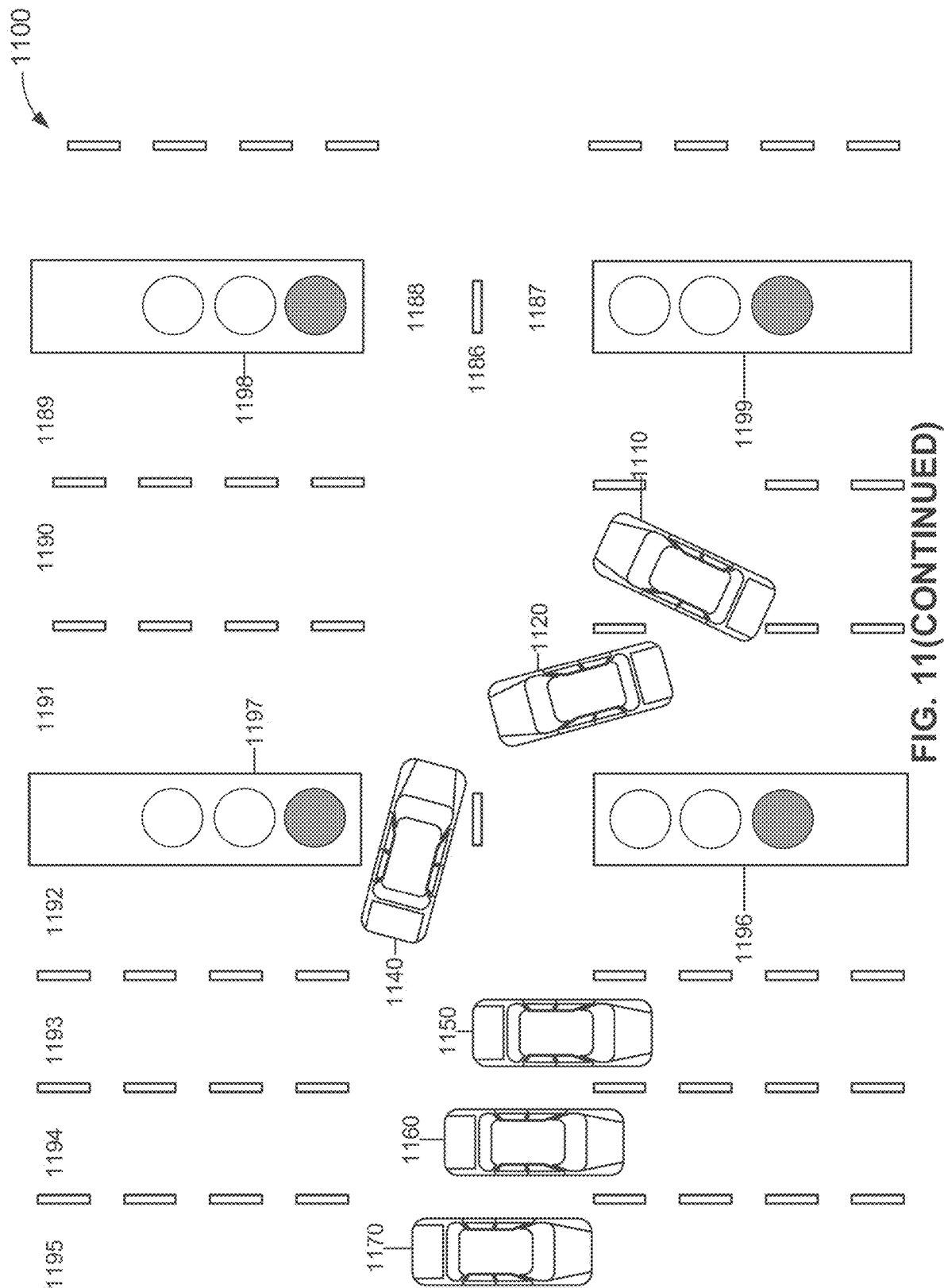

In the implementation 1100 of FIG. 11, a vehicle 1110 may, using one or more processors of the vehicle 1110, determine whether or not to pass in front of a stopped vehicle, such as a vehicle yielding to opposing traffic and waiting to make a left turn. The vehicle 1110, which may be implemented as vehicle 101, may be driving in a lane 1191, behind a second vehicle 1120 that is momentarily stopped while trying to make a left turn onto a lane 1187 at an intersection 1186. In some embodiments, the vehicle 1110 may determine whether or not to change lanes in order to pass a stationary vehicle such as the second vehicle 1120 based on a status of one or more upcoming traffic lights such as traffic lights 1196-1199, such as, whether the traffic lights 1196-1199 are currently green, and how much longer they will remain green or red for. In some embodiments, the vehicle 1110 may determine whether or not to change lanes in order to pass a stationary vehicle such as the second vehicle 1120 based on whether or not any pedestrians are crossing the intersection 1186. For example, if pedestrians are crossing the intersection 1186, or are waiting to cross the intersection 1186, the vehicle 1110 may determine not to change lanes and stay behind the second vehicle 1120. In some embodiments, the vehicle 1110 may determine whether or not to change lanes in order to pass a stationary vehicle such as the second vehicle 1120 based on a prediction, calculation, or determination of whether such action would be safe or how safe such an action would be. In some examples, the prediction, calculation, or determination of how safe such an action would be may depend on a number of vehicles in the lane 1190 and lane 1189, a distance and/or velocity of nearest vehicles to the vehicle 1110 in the lane 1190 and the lane 1189. In some embodiments, the vehicle 1110 may determine whether or not to change lanes in order to pass a stationary vehicle such as the second vehicle 1120 based on any one or both of an urgency that the vehicle 1110 may have in reaching a destination, a predicted waiting time, and a resulting delay of the predicted waiting time if the vehicle 1110 were to wait without changing to the lane 1190. The vehicle 1110 may predict the waiting time based on a density of traffic in lanes 1192, 1193, 1194, and 1195 on an opposing side of traffic, distances between one or more vehicles on the opposing side of traffic, and/or velocities of one or more vehicles such as a third vehicle 1140, a fourth vehicle 1150, a fifth vehicle 1160, and a sixth vehicle 1170. In some examples, the vehicle 1110 may determine or predict a resulting delay that would occur if the vehicle 1110 were to wait for the predicted waiting time, based on traffic light patterns and a distribution of traffic. For example, the vehicle 1110 may determine or predict whether the vehicle 1110 would get stuck in one or more red lights as a result of waiting for the predicted waiting time. In some embodiments, the vehicle 1110 may predict the waiting time based on predicted trajectories or paths of one or more of the second vehicle 1120, the third vehicle 1140, with a predicted trajectory 1141, the fourth vehicle 1150, the fifth vehicle 1160, and the sixth vehicle 1170. The predicted trajectories or paths may be based at least in part on the respective speeds or velocities of the third vehicle 1140, the fourth vehicle 1150, the fifth vehicle 1160, and the sixth vehicle 1170. One or more processors of the vehicle 1110 may further predict trajectories or paths of one or more of the second vehicle 1120, the third vehicle 1140, the fourth vehicle 1150, the fifth vehicle 1160, and the sixth vehicle 1170, based in part on a predicted turning angle or radius of the one or more of the second vehicle 1120, and the third vehicle 1140 when it turns into lane 1188. One or more processors of the vehicle 1110 may further predict trajectories or paths of the third vehicle 1140 having the predicted trajectory 1141, if the third vehicle 1140 does not actually make a 90 degree left turn even though the third vehicle 1140 is signaling its intent to make a left turn. The vehicle 1110 may predict the waiting time by determining a predicted time that it would be safe for the second vehicle 1120 to make a left turn 90-degree left turn. The predicted time may be a time in which the predicted trajectories or paths of the second vehicle 1120 are separated from the predicted trajectories or paths of one or more of the third vehicle 1140, the fourth vehicle 1150, the fifth vehicle 1160, and the sixth vehicle 1170, by at least a threshold distance at any time during which any portion of the second vehicle 1120 crosses or traverses the lanes 1192, 1193, 1194, and 1195. In some embodiments, the vehicle 1110 may determine whether or not, and when, to change lanes in order to pass a stationary vehicle such as the second vehicle 1120, based on whether any vehicles on an opposing side of traffic, such as the third vehicle 1140, are signaling to make a left turn onto the lane 1188. In some examples, the vehicle 1110 may wait until the third vehicle 1140 has completed its left turn, or has completely crossed or traversed the lane 1190 before the vehicle 1110 makes its 90 degree left turn. In some embodiments, the vehicle 1110 may determine whether or not to change lanes in order to pass a stationary vehicle such as the second vehicle 1120 based on any one or any combination of the aforementioned factors. The vehicle 1110 may determine a proper time to change lanes to the lane 1190, when a predicted following distance between the vehicle 1110 and any other vehicle in the lane 1190, and a predicted distance between the vehicle 1110 and the third vehicle 1140, is at least a minimum distance, and a predicted lateral distance between the vehicle 1110 and any other vehicle in the lane 1189 or any adjacent lane is at least a threshold distance. Thus, the vehicle 1110 may determine a proper time to change lanes to the lane 1190 when such action would not be predicted to cause other vehicles to swerve or change their respective predicted trajectories. For example, a change in a predicted trajectory may comprise a decrease in a velocity of the respective vehicle. Once the vehicle 1110 determines to change into the lane 1190, the vehicle 1110 may select a trajectory 1118 to change into the lane 1190. The trajectory 1118 may be selected based on trajectories and/or positions of other vehicles.

At a time or directly after the vehicle 1110 determines to change into the lane 1190, one or more processors, such as the determining engine 125, of the vehicle 1110 may determine whether actual trajectories of any other vehicles approach to within the minimum distance or to the threshold distance of the vehicle 1110, whether any other vehicles such as the third vehicle 1140 or any vehicles in the lane 1190 are forced to swerve or to slow down in response to the vehicle 1110 changing into the lane 1190, or whether the vehicle 1110 itself is caused to swerve or slow down. The determining engine 125 may further determine whether the third vehicle 1140 deviates from its predicted trajectory 1141. The determining engine 125 may further determine if the actual trajectory of the vehicle 1110 deviates from the selected trajectory 1112. Results of the lane change maneuver by the vehicle 1110 may be stored, for example, in a model in the updating engine 126. The predicted trajectory 1141, actual trajectory of the third vehicle 1040, and any interactions between the vehicle 1110 and nearby vehicles such as vehicles on the lane 1190, vehicles adjacent to the lane 1190, and/or with the vehicle 1140, may be stored in the model. The stored information may include whether a trajectory, for example, a velocity, of another vehicle was actually affected by the lane change maneuver of the vehicle 1110, and by how much the trajectory was affected. For example, if the determining engine 125 determines that the third vehicle 1140 actually speeds up while approaching the intersection 1186, more than predicted by the predicted trajectory 1141, the predicted trajectory 1141 may be updated in the model to provide more accurate future predictions. As another example, the determining engine 125 may determine that vehicles originally driving in adjacent lanes to the second vehicle 1120, such as in the lane 1190, may slow down as a result of seeing a stopped vehicle, regardless of whether a vehicle such as the vehicle 1110 makes a lane change into the lane 1190. Such information may also be updated in the model. As the information may be sent to other vehicles in the fleet or network, the other vehicles may also be better equipped to interact with other traffic during a similar situation.

Figure 12:
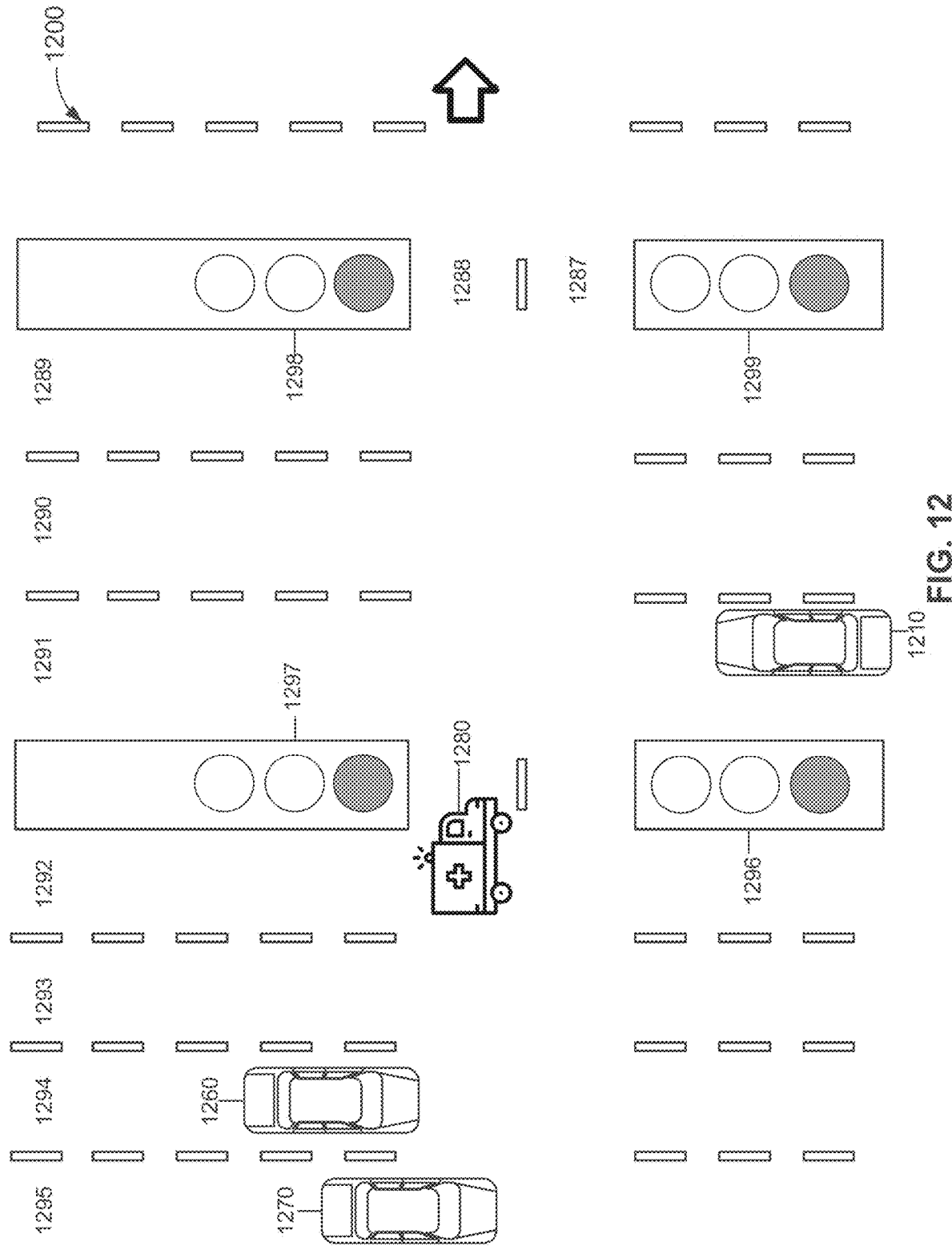
Figure 12:
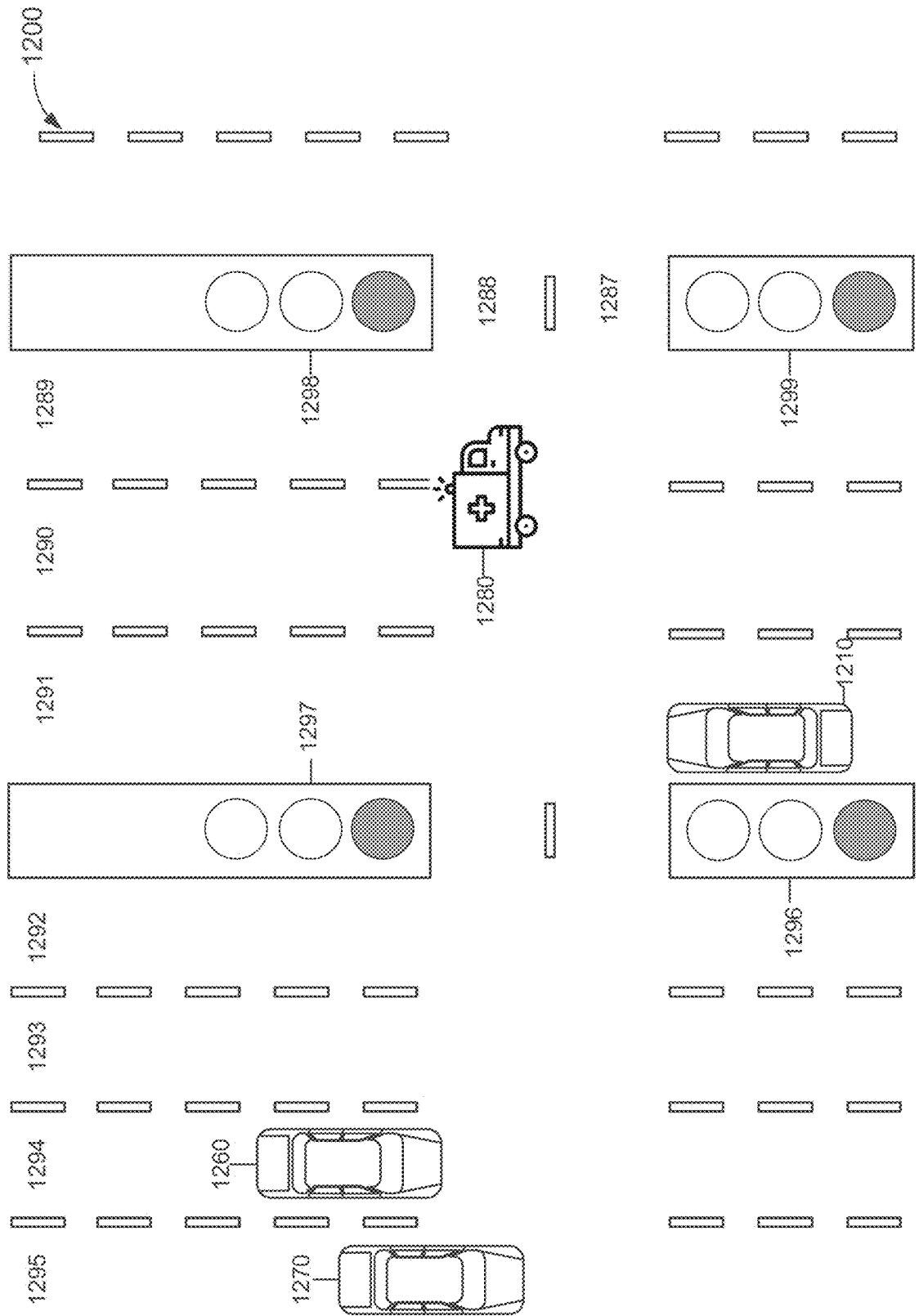

In the implementation 1200 of FIG. 12, a vehicle 1210 may determine to pull over to a side of a road in response to detecting an emergency vehicle within a threshold distance of the vehicle 1210. The vehicle 1210, which may be implemented as vehicle 101, may be driving in a lane 1291 and arriving at an intersection with traffic lights 1296-1299.

Lanes 1290 and 1289 may be to a right of the lane 1291. Lanes 1292-1295 may be on an opposing side on the lanes 1289-1291, where the vehicle 1210 is driving. Vehicle 1260 may be driving on the lane 1294 and vehicle 1270 may be driving on the lane 1295. An emergency vehicle 1280 such as an ambulance or police car may be driving in a lane 1288.

One or more processors of the vehicle 1210 such as the sensing engine 123 may detect the emergency vehicle 1230 by detecting a velocity of the emergency vehicle 1280. For example, the sensing engine 123 may detect that the emergency vehicle 1280 is driving at a faster velocity than surrounding traffic, driving at a velocity exceeding that of surrounding traffic by more than a threshold velocity, flashing lights on the emergency vehicle 1280, and/or emanating one or more sirens or other noises from the emergency vehicle 1280. For example, the vehicle 1210 may pull over to a side of the road if the emergency vehicle is traveling at a speed exceeding a speed of other traffic by more than a threshold amount, such as 20 miles per hour. In response to detecting the emergency vehicle 1280, one or more processors of the vehicle 1210 may determine an action for the vehicle 1210 to take, such as pulling over to a side of the road on the lane 1291, until the emergency vehicle 1280 passes. The one or more processors of the vehicle 1210, including, for example, the adjusting engine 124, may determine a location at which the vehicle 1210 may be pulled over, such that the determined location maintains a minimum following distance, such as a distance between a front of a vehicle and a rear of another vehicle, and a minimum lateral distance with another vehicle to a side. The one or more processors of the vehicle 1210 may predict a trajectory of the emergency vehicle 1280 and trajectories of other vehicles responding to the emergency vehicle 1280, such as the vehicles 1260 and 1270, such as how and where the other vehicles pull over to a side of the road.

At a time or directly after the vehicle 1210 determines to pull over to a side of the road, one or more processors, such as the determining engine 125, of the vehicle 1210 may determine results such as whether actual trajectories of any other vehicles approach to within minimum following distance or the minimum lateral distance of the vehicle 1210, and whether any actual trajectories of other vehicles, including the vehicles 1260 and 1270, and the emergency vehicle 1280, deviate from their predicted trajectories. The results of the pulling over maneuver by the vehicle 1210 may be stored, for example, in a model in the updating engine 126. The predicted trajectories of other vehicles, and any interactions between the vehicle 1210, other vehicles and the emergency vehicle 1280 may be stored in the model. The stored information may include whether a trajectory, for example, a velocity, of another vehicle was actually affected by the pulling over maneuver of the vehicle 1210, and by how much the trajectory was affected. Such information may also be updated in the model so the vehicle 1210 may make better predictions and decisions in similar situations. As the information may be sent to other vehicles in the fleet or network, such as the emergency vehicle 1280, the other vehicles and the emergency vehicle 1280 may also be better equipped to interact with other traffic during a similar situation.

Figure 13:
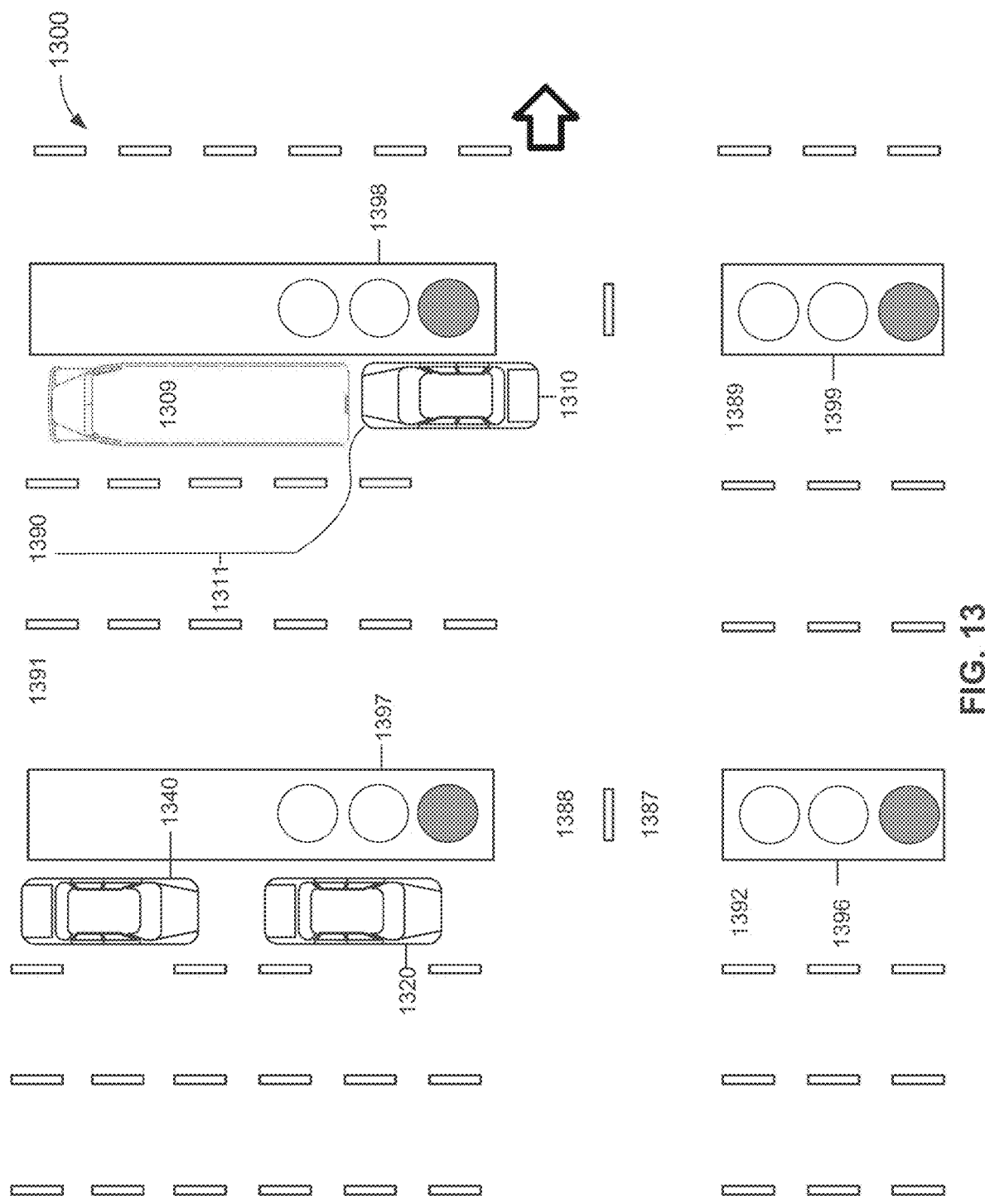
Figure 13:
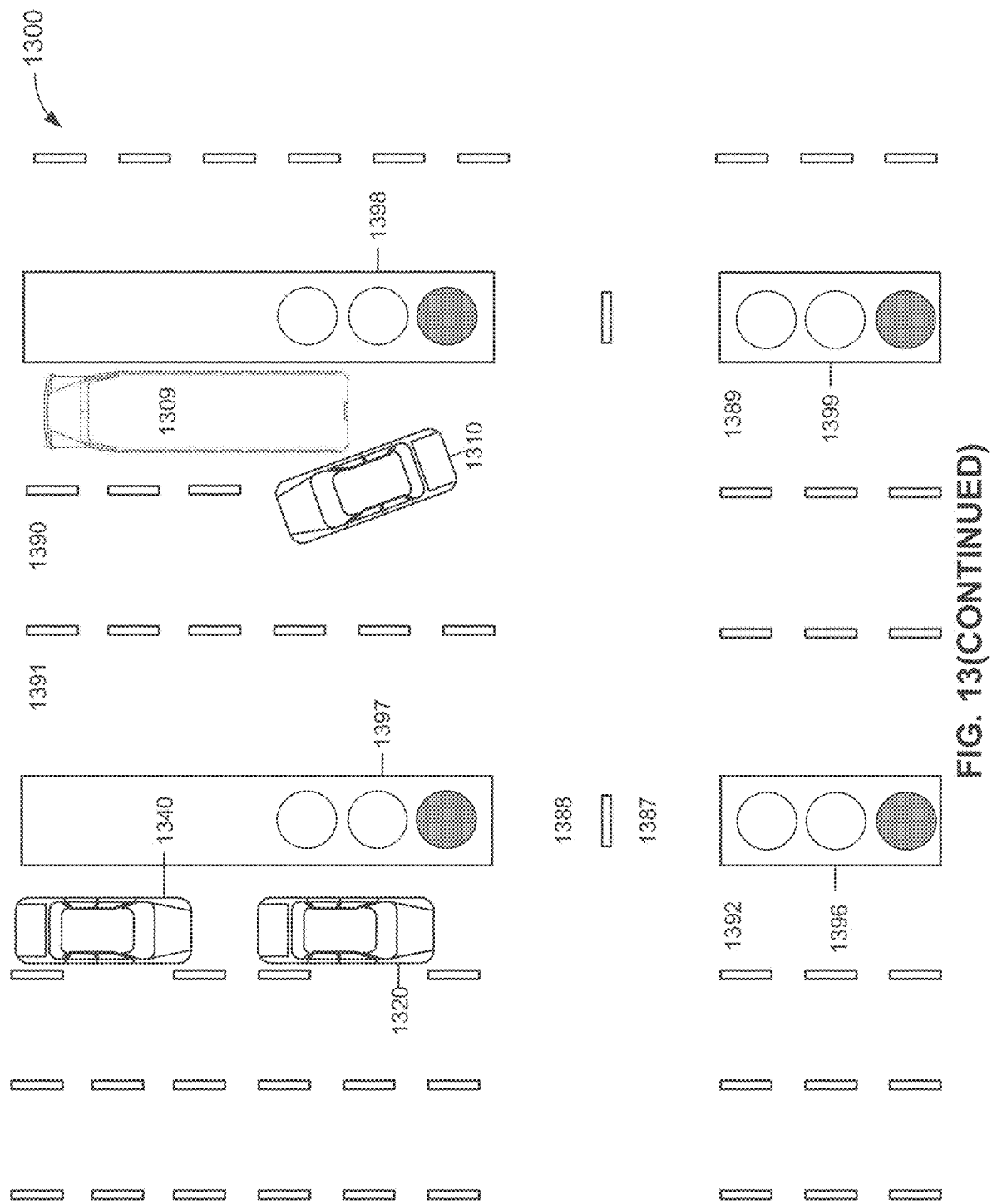

In the implementation 1300 of FIG. 13, a vehicle 1310 may determine whether or not to pass in front of a parked bus. The vehicle 1310, which may be implemented as vehicle 101, may be driving in a lane 1389 and partially or entirely past an intersection with traffic lights 1396-1399. The vehicle 1310 may be temporarily stopped behind a bus 1309. The vehicle 1310 may determine whether it is safe to pass in front of the bus 1309, for example, by changing into the lane 1390) based on whether the bus 1309 is a school bus, whether the bus 1309 has flashing lights, whether pedestrians are walking in front of the bus 1309, and/or a distance of a nearest vehicle behind the vehicle 1310 in the lane 1390 or the lane 1391. One or more processors of the computing system 122, such as the sensing engine 123, may gather image data from satellites or other vehicles to determine whether any pedestrians are walking in front of the bus 1309. The one or more processors may detect a type of the bus 1309 (e.g., whether it is a school bus) based on a color, shape, or design of the bus 1309. In some embodiments, the vehicle 1310 may determine that it is unsafe to pass in front of the bus 1309 if the bus 1309 is a school bus, and determine that it is safe to pass in front of the bus 1309 if the bus 1309 is not a school bus. In response to determining it would be safe to pass in front of the bus 1309, the one or more processors may determine a time at which to change into the lane 1390 and pass in front of the bus 1309.

The vehicle 1310 may determine a proper time to change lanes to the lane 1390 when a predicted following distance between the vehicle 1310 and any other vehicle in the lane 1390, is at least a minimum distance, and a predicted lateral distance between the vehicle 1310 and any other vehicle in the lane 1389, in the lane 1391, or any adjacent lane is at least a threshold distance. Thus, the vehicle 1310 may determine a proper time to change lanes to the lane 1390 when such action would not be predicted to cause other vehicles to swerve or change their respective predicted trajectories. For example, a change in a predicted trajectory may comprise a decrease in a velocity of the respective vehicle. The vehicle 1310 may determine a proper time to change lanes such that the action of changing lanes would not be predicted to cause other vehicles, such as other vehicles in the lane 1390 behind the vehicle 1310, to swerve or change their respective predicted trajectories. For example, a change in a predicted trajectory may comprise a decrease in a velocity of the respective vehicle. Once the vehicle 1310 determines to change into the lane 1390, the vehicle 1310 may select a trajectory 1311 to change into the lane 1390. The trajectory 1311 may be selected based on trajectories and/or positions of other vehicles.

At a time or directly after the vehicle 1310 determines to change into the lane 1390, one or more processors, such as the determining engine 125, of the vehicle 1310 may determine whether actual trajectories of any other vehicles approach to within the minimum distance or to the threshold distance of the vehicle 1310, whether any other vehicles are forced to swerve or to slow down in response to the vehicle 1310 changing into the lane 1390, or whether the vehicle 1310 itself is caused to swerve or slow down. The determining engine 125 may further determine if an actual trajectory of the vehicle 1310 deviates from the selected trajectory 1311. Results of the lane change maneuver by the vehicle 1310 may be stored, for example, in a model in the updating engine 126. Predicted trajectories of other vehicles and any interactions between the vehicle 1310 and nearby vehicles such as vehicles on the lane 1390, vehicles adjacent to the lane 1390, and/or with the bus 1309, may be stored in the model. The stored information may include whether a trajectory, for example, a velocity, of another vehicle was actually affected by the lane change maneuver of the vehicle 1310, and by how much the trajectory was affected. As an example, the determining engine 125 may determine that vehicles originally driving in adjacent lanes to the vehicle 1310, such as in the lane 1390, may slow down as a result of seeing a stopped vehicle, such as the bus 1309, regardless of whether a vehicle such as the vehicle 1310 makes a lane change into the lane 1390. Such information may also be updated in the model. As the information may be sent to other vehicles in the fleet or network, the other vehicles may also be better equipped to interact with other traffic during a similar situation.

Figure 14:
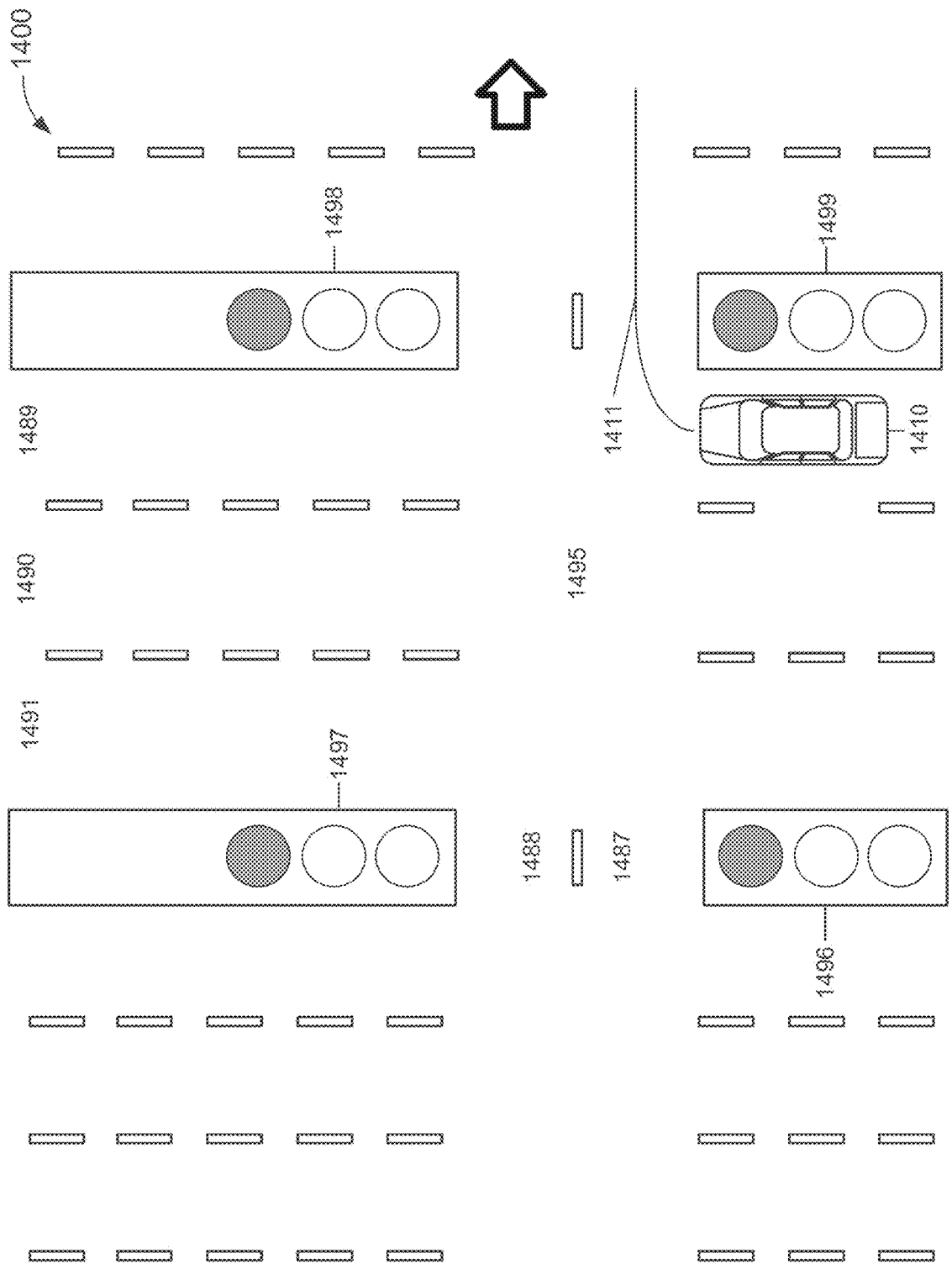
Figure 14:
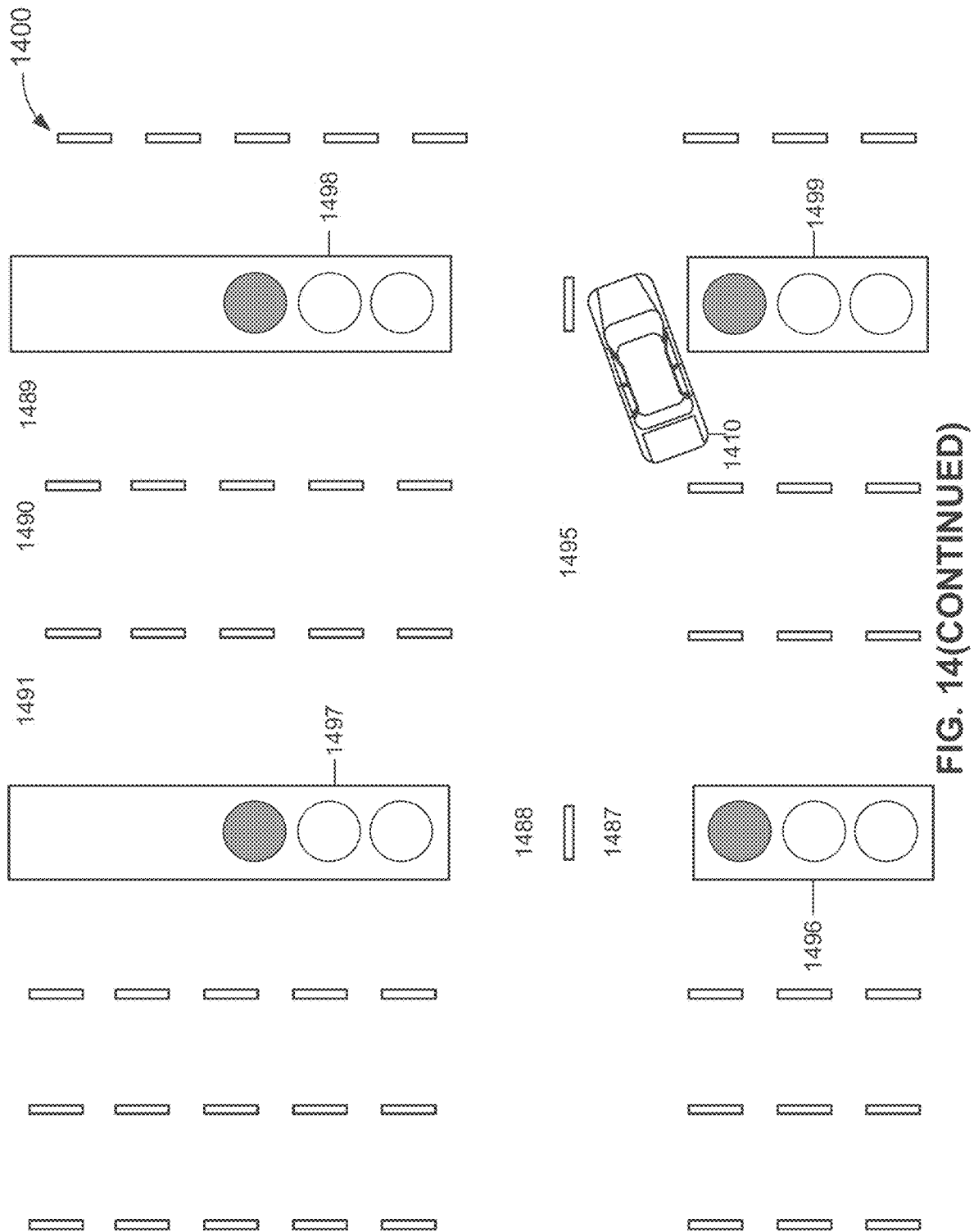

In the implementation 1400 of FIG. 14, a vehicle 1410 may determine whether to make a right turn at an intersection 1495 into a lane 1487, at a red light, as indicated by traffic lights 1496-1499. The vehicle 1410, which may be implemented as vehicle 101, may be driving in a lane 1489, next to lanes 1490 and 1491. Lane 1488 may be opposite to the lane 1487.

The vehicle 1410 may determine whether or not to turn right into the lane 1487 based on a density of traffic in the lanes 1487 and 1488, a distance from the vehicle 1410 to a nearest vehicle in the lane 1487 or the lane 1488, a number of vehicles stopped behind the vehicle 1410, and/or whether a traffic sign outlawing a right turn on red is detected. In some examples, if the distance from the vehicle 1410 to a nearest vehicle in the lane 1487 or the lane 1488 exceeds a threshold, the vehicle 1410 may determine it is safe to turn right and initiate a right turn into the lane 1487. In some examples, if a number of vehicles stopped behind the vehicle 1410 exceeds a second threshold and if the distance from the vehicle 1410 to a nearest vehicle in the lane 1487 or the lane 1488 exceeds a threshold, the vehicle 1410 may determine it is safe to turn right and initiate a right turn into the lane 1487, according to a trajectory 1411.

The vehicle 1410 may determine a proper time to change lanes to the lane 1487 when a predicted following distance between the vehicle 1410 and any other vehicle in the lane 1487, is at least a minimum distance, and a predicted lateral distance between the vehicle 1410 and any other vehicle in the lane 1488 is at least a threshold distance. Thus, the vehicle 1410 may determine a proper time to change lanes to the lane 1487 when such action would not be predicted to cause other vehicles to swerve or change their respective predicted trajectories. For example, a change in a predicted trajectory may comprise a decrease in a velocity of the respective vehicle. The vehicle 1410 may determine a proper time to change lanes such that the action of changing lanes would not be predicted to cause other vehicles, such as other vehicles in the lane 1487 behind the vehicle 1410, in the lane 1489 behind the vehicle 1410, to swerve or change their respective predicted trajectories. Thus, the vehicle 1410 may balance a potential delay time for vehicles in the lane 1489 as a result of the vehicle 1410 waiting to turn, with a potential delay time for vehicles in the lane 1487 as a result of the vehicle 1410 making the right turn. For example, a change in a predicted trajectory may comprise a decrease in a velocity of the respective vehicle. Once the vehicle 1410 determines to change into the lane 1487, the vehicle 1410 may select a trajectory 1411 to change into the lane 1487. The trajectory 1411 may be selected based on trajectories and/or positions of other vehicles.

At a time or directly after the vehicle 1410 determines to change into the lane 1487, one or more processors, such as the determining engine 125, of the vehicle 1410 may determine whether actual trajectories of any other vehicles approach to within the minimum distance or to the threshold distance of the vehicle 1410, whether any other vehicles are forced to swerve or to slow down in response to the vehicle 1410 changing into the lane 1487, or whether the vehicle 1410 itself is caused to swerve or slow down. The determining engine 125 may further determine if an actual trajectory of the vehicle 1410 deviates from the selected trajectory 1411. Results of the right turn maneuver by the vehicle 1410 may be stored, for example, in a model in the updating engine 126. Predicted trajectories of other vehicles and any interactions between the vehicle 1410 and nearby vehicles such as vehicles on the lane 1487, the lane 1489, and the lane 1488, may be stored in the model. The stored information may include whether a trajectory, for example, a velocity, of another vehicle was actually affected by the right turn maneuver of the vehicle 1410, and by how much the trajectory was affected. As an example, the determining engine 125 may determine that vehicles originally driving the lanes 1489, 1490, and 1491 may slow down as a result of approaching the intersection 1495, regardless of whether a vehicle such as the vehicle 1410 is making a right turn at the intersection 1495. Such information may also be updated in the model. As the information may be sent to other vehicles in the fleet or network, the other vehicles may also be better equipped to interact with other traffic during a similar situation.

Figure 15:
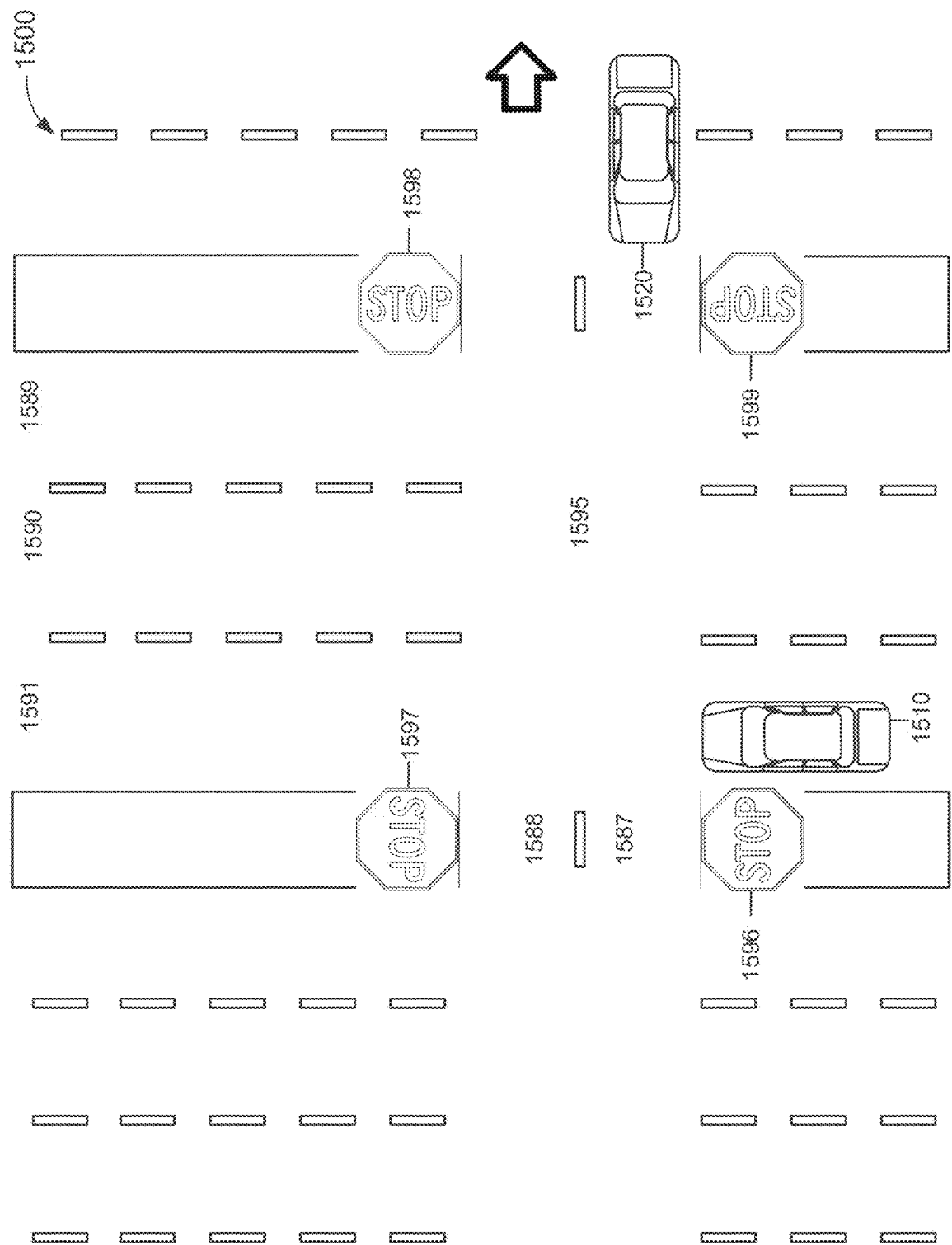
Figure 15:
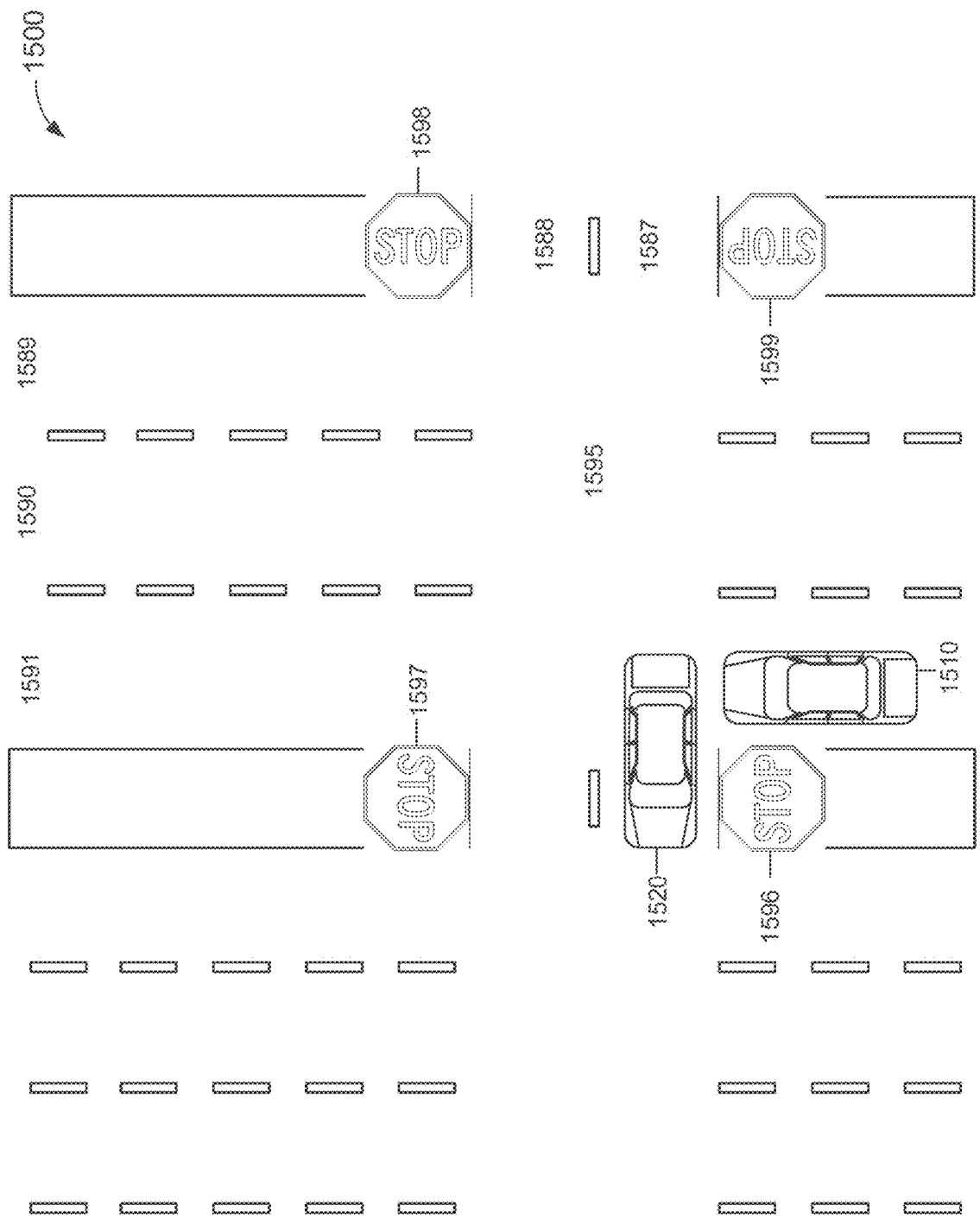

In the implementation 1500 of FIG. 15, a vehicle 1510 may determine whether it has a right of way at an intersection 1595, in front of a stop sign 1596. Other stop signs 1597, 1598, and 1599 at the intersection 1595 may direct traffic in the other three directions. The vehicle 1510, which may be implemented as vehicle 101, may be driving in a lane 1591, next to lanes 1590 and 1589. A second vehicle 1520 may be traveling in lane 1587, which may be opposed by lane 1588.

The vehicle 1510 may have arrived at the stop sign 1596 before the second vehicle 1520 arrives at the stop sign 1599. The vehicle 1510 may determine that it has a right-of-way over the second vehicle 1520. However, if the vehicle 1510 determines that the second vehicle 1520 fails to obey right-of-way regulations, and the second vehicle 1520 passes the stop sign 1599 while disregarding the right-of-way of the vehicle 1510, the vehicle 1510 may take measures to avoid a collision with the second vehicle 1520. In some examples, the vehicle 1510 may either not proceed past the intersection 1595 until the second vehicle 1520 traverses or passes through the intersection 1595, speed up past the intersection 1595 to avoid a collision with the second vehicle 1520, or back up if safe to do so to avoid a collision with the second vehicle 1520. In some examples, the vehicle 1510 may determine a course of action, in response to the second vehicle violating the right-of-way regulation, most likely to avoid a collision with the second vehicle 1520, without increasing a risk of a collision with other vehicles.

The vehicle 1510 may determine a proper time to proceed past the stop sign 1596 by predicting trajectories of other vehicles such as the second vehicle 1520. An actual movement of the second vehicle 1520 may be constantly monitored to determine whether the actual movement deviates form the predicted trajectory of the second vehicle 1520.

The vehicle 1510 may adjust its planned course of action based on the actual movement of the second vehicle 1520 or the deviation from the predicted trajectory of the second vehicle.

At a time or directly after the vehicle 1510 determines to proceed past the stop sign 1596, one or more processors, such as the determining engine 125, of the vehicle 1510 may determine whether actual trajectories of any other vehicles approach to within the minimum distance or to the threshold distance of the vehicle 1510, or whether any other vehicles are forced to swerve or to slow down in response to the vehicle 1510 proceeding past the stop sign 1596. The determining engine 125 may further determine if an actual trajectory of the vehicle 1510 deviates from a planned movement or trajectory of the vehicle 1510. Results of the maneuver by the vehicle 1510 may be stored, for example, in a model in the updating engine 126. Predicted trajectories of other vehicles and any interactions between the vehicle 1510 and nearby vehicles such as the second vehicle 1520, may be stored in the model. The stored information may include whether a trajectory, for example, a velocity, of another vehicle was actually affected by the maneuver of the vehicle 1510, and by how much the trajectory was affected. As an example, the determining engine 125 may determine that vehicles do not tend to strictly follow the right-of-way rules, and may select trajectories in the future that slow down at stop signs in case another vehicle does not follow the right-of-way rules. Such information may also be updated in the model. As the information may be sent to other vehicles in the fleet or network, the other vehicles may also be better equipped to interact with other traffic during a similar situation.

In some embodiments, the second vehicle 1520 may establish a right-of-way by communicating with the vehicle 1510, even though the second vehicle 1520 may have arrived at the stop sign 1599 after the vehicle 1510 arrived at the stop sign 1596. In some examples, the second vehicle 1520 may exchange a priority status with the vehicle 1510. In some examples, the second vehicle 1520 may obtain a priority status to obtain a right-of-way at a stop sign or an intersection from the vehicle 1510. In some examples, the vehicle 1510 may grant the second vehicle 1520 a right-of-way in exchange for the second vehicle 1520 granting the vehicle 1510 a right-of-way in the future. In some examples, the vehicle 1510 may grant the second vehicle 1520 a right-of-way in exchange for credits that the vehicle 1510 may use in the future, for example, to obtain a right-of-way at an intersection or stop sign, or to pay a toll.

FIG. 16 illustrates a flowchart of a method according to some embodiments. In this and other flowcharts, the flowchart 1600 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 16. In step 1602, one or more processors may select a trajectory from potential trajectories along a route to be travelled by the vehicle. In step 1604, the one or more processors may predict one or more trajectories of other objects along the route, such as a trajectory of another object. In step 1606, the one or more processors may adjust the selected trajectory based on a predicted change, in response to adjusting the selected trajectory, to the predicted trajectory of the another object, such as a predicted trajectory of another object. In some examples, the predicted change to the predicted trajectory of the another object may be measured by what is predicted to happen in response to the selected trajectory interacting with the another object, or, how the selected trajectory may impact the predicted trajectory of the another object. Thus, in some examples, for the selected trajectory, the one or more processors may predict a hypothetical change to the trajectory of the another object caused by the selected trajectory, and adjust the selected trajectory in an effort to counteract or minimize the predicted hypothetical changes. In step 1606, the predicted change to the predicted trajectory of the another object may be stored in a model. In step 1608, the one or more processors may determine an actual change, in response to adjusting the selected trajectory, to a trajectory of the another object. In step 1610, the one or more processors may update the model based on the determined actual change to the trajectory of the another object. In step 1612, the one or more processors may select a future trajectory of the vehicle based on the updated model.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 17:
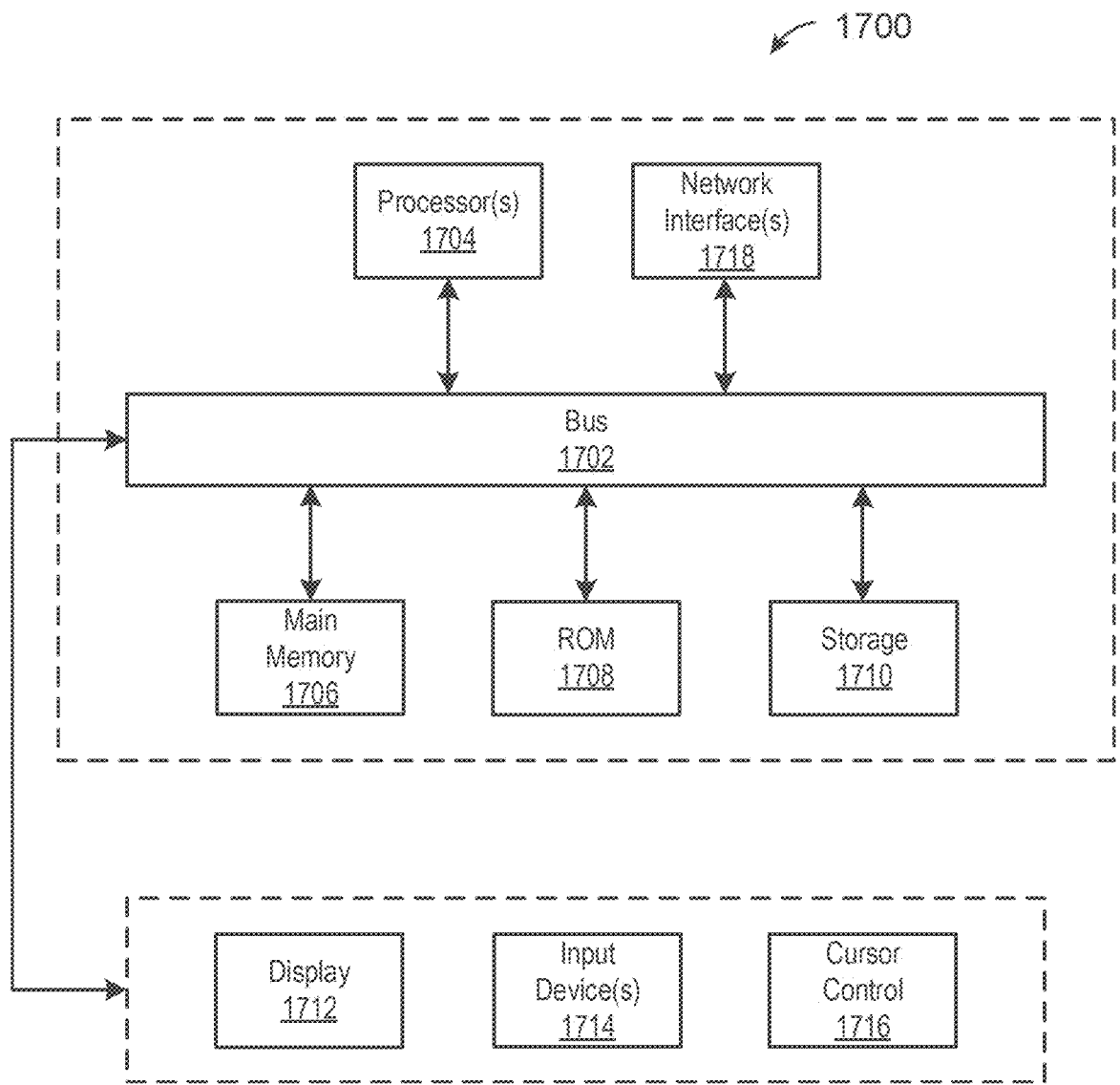
FIG. 17 is a diagram of an example computer system for implementing the features disclosed herein.

FIG. 17 is a block diagram that illustrates a computer system 1700 upon which any of the embodiments described herein may be implemented. The computer system 1700 includes a bus 1702 or other communication mechanism for communicating information, one or more hardware processors 1704 coupled with bus 1702 for processing information. Hardware processor(s) 1704 may be, for example, one or more general purpose microprocessors.

The computer system 1700 also includes a main memory 1706, such as a random access memory (RAM), cache and/or other dynamic storage devices, coupled to bus 1702 for storing information and instructions to be executed by processor 1704. Main memory 1706 also may be used for storing temporary variables or other intermediate information during execution of instructions to be executed by processor 1704. Such instructions, when stored in storage media accessible to processor 1704, render computer system 1700 into a special-purpose machine that is customized to perform the operations specified in the instructions.

The computer system 1700 further includes a read only memory (ROM) 1708 or other static storage device coupled to bus 1702 for storing static information and instructions for processor 1704. A storage device 1710, such as a magnetic disk, optical disk, or USB thumb drive (Flash drive), etc., is provided and coupled to bus 1702 for storing information and instructions.

The computer system 1700 may be coupled via bus 1702 to output device(s) 1712, such as a cathode ray tube (CRT) or LCD display (or touch screen), for displaying information to a computer user. Input device(s) 1714, including alpha-numeric and other keys, are coupled to bus 1702 for communicating information and command selections to processor 1704. Another type of user input device is cursor control 1716, such as a mouse, a trackball, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1700 may implement the techniques described herein using customized hard-wired logic, one or more ASICs or FPGAs, firmware and/or program logic which in combination with the computer system causes or programs computer system 1700 to be a special-purpose machine. According to one embodiment, the techniques herein are performed by computer system 1700 in response to processor(s) 1704 executing one or more sequences of one or more instructions contained in main memory 1706. Such instructions may be read into main memory 1706 from another storage medium, such as storage device 1710. Execution of the sequences of instructions contained in main memory 1706 causes processor(s) 1704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1710. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1702. Transmission media can also take the form of acoustic or light waves, such as those generated during radio-wave and infra-red data communications.

Various forms of media may be involved in carrying one or more sequences of one or more instructions to processor 1704 for execution. For example, the instructions may initially be carried on a magnetic disk or solid-state drive of a remote computer. The remote computer can load the instructions into its dynamic memory and send the instructions over a telephone line using a modem. A modem local to computer system 1700 can receive the data on the telephone line and use an infra-red transmitter to convert the data to an infra-red signal. An infra-red detector can receive the data carried in the infra-red signal and appropriate circuitry can place the data on bus 1702. Bus 1702 carries the data to main memory 1706, from which processor 1704 retrieves and executes the instructions. The instructions received by main memory 1706 may retrieves and executes the instructions. The instructions received by main memory 1706 may optionally be stored on storage device 1710 either before or after execution by processor 1704.

The computer system 1700 also includes a communication interface 1718 coupled to bus 1702. Communication interface 1718 provides a two-way data communication coupling to one or more network links that are connected to one or more local networks. For example, communication interface 1718 may be an integrated services digital network (ISDN) card, cable modem, satellite modem, or a modem to provide a data communication connection to a corresponding type of telephone line. As another example, communication interface 1718 may be a local area network (LAN) card to provide a data communication connection to a compatible LAN (or WAN component to communicated with a WAN). Wireless links may also be implemented. In any such implementation, communication interface 1718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1718, which carry the digital data to and from computer system 1700, are example forms of transmission media.

The computer system 1700 can send messages and receive data, including program code, through the network (s), network link and communication interface 1718. In the Internet example, a server might transmit a requested code for an application program through the Internet, the ISP, the local network and the communication interface 1718.

The received code may be executed by processor 1704 as it is received, and/or stored in storage device 1710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A system of an autonomous or semi-autonomous vehicle comprising:
   one or more sensors;
   one or more processors; and
   a memory storing instructions that, when executed by the one or more processors, causes the system to perform, without intervention from a human:
      selecting a trajectory from potential trajectories along a route to be travelled by the autonomous or semi-autonomous vehicle;
      predicting a trajectory of another object along the route;
      adjusting the selected trajectory based on a current traffic density, a current lighting condition, and a predicted change, in response to adjusting the selected trajectory, to the predicted trajectory of the another object, the predicted change to the predicted trajectory of the another object being stored in a machine learning model and being based on instances of historical data of previous changes;
      determining an actual change, in response to adjusting the selected trajectory, to the trajectory of the another object, based on a difference between the predicted trajectory of the another object and an actual trajectory of the another object in response to an interaction between the autonomous or semi-autonomous vehicle and the another object;
updating the machine learning model based on the determined actual change to the trajectory of the another object, the updating comprising:
determining weights, corresponding to the respective instances of the historical data, of the machine learning model, wherein the weights are based on degrees of similarity between:
previous lighting conditions corresponding to the historical data, and
the current lighting condition during which the actual change took place; and
adjusting the predicted change to the predicted trajectory of the another object according to a weighted average of the predicted change to the predicted trajectory of the another object and the actual change to the trajectory of the another object, the weighted average being based on adjusting the weights to reduce respective deviations between the predicted change to the predicted trajectory of the another object and the actual change to the predicted trajectory of the another object; and
selecting a future trajectory based on the updated machine learning model.

2. The system of claim 1, wherein the adjusting the selected trajectory comprises:
adjusting the selected trajectory to an updated trajectory having a lowest predicted travel time and in which the predicted change to the predicted trajectory of the another object is within a predetermined range.

3. The system of claim 2, wherein the updating the model comprises:
determining whether the actual change to the trajectory of the another object is within the predetermined range;
in response to determining that the actual change to the trajectory of the another object is within the predetermined range, determining a resulting change to the adjusted selected trajectory of the autonomous or semi-autonomous vehicle based on the actual change to the trajectory of the another object; and
in response to determining that the actual change to the trajectory of the another object is outside the predetermined range, adjusting the predicted change to the trajectory of the another object based on the actual change to the trajectory of the another object.

4. The system of claim 1, wherein the predicted change to the trajectory of the another object comprises a predicted change in a velocity or an acceleration of the another object.

5. The system of claim 1, wherein the adjusting the selected trajectory further comprises adjusting the selected trajectory based on a predicted change to a level of equilibrium of the autonomous or semi-autonomous vehicle and a trajectory of a second object predicted to contact the another object, in response to the predicted change to the trajectory of the another object.

6. The system of claim 1, wherein the trajectory comprises a starting pose, a velocity at different points along the route, an acceleration at different points along the route, an orientation at different points along the route, and a final pose of the autonomous or semi-autonomous vehicle.

7. The system of claim 1, wherein the adjusting the selected trajectory comprises adjusting the selected trajectory while maintaining a minimum distance, at a given time, between the adjusted selected trajectory and the trajectory of the another object.

8. The system of claim 1, wherein the trajectory comprises four knot points that define a cubic spline that specifies a steering angle of the autonomous or semi-autonomous vehicle.

9. The system of claim 1, wherein the selecting of the trajectory is based on a friction of a tire of the autonomous or semi-autonomous vehicle on a road surface.

10. The system of claim 1, wherein the adjusting of the trajectory of the autonomous or semi-autonomous vehicle comprises straddling of the obstacle such that the autonomous or semi-autonomous vehicle passes over the obstacle and the obstacle is temporarily under an underbody of the autonomous or semi-autonomous vehicle.

11. The system of claim 1, wherein the adjusting the selected trajectory comprises permitting a second vehicle to merge onto a same lane occupied by the autonomous or semi-autonomous vehicle.

12. The system of claim 1, wherein the weights are based on respective degrees of similarity between a previous road type or previous road quality and a current road type or a current road quality.

13. A method implemented by a computing system including one or more processors and storage media storing machine-readable instructions, wherein the method is performed using the one or more processors of an autonomous or semi-autonomous vehicle, the method being performed without invention from a human and comprising:
selecting a trajectory from potential trajectories along a route to be travelled by the autonomous or semi-autonomous vehicle;
predicting a trajectory of another object along the route;
adjusting the selected trajectory based on a current traffic density, a current lighting condition, and a predicted change, in response to adjusting the selected trajectory, to the predicted trajectory of the another object, the predicted change to the predicted trajectory of the another object being stored in a machine learning model and being based on instances of historical data of previous changes;
determining an actual change, in response to adjusting the selected trajectory, to the trajectory of the another object;
updating the machine learning model based on the determined actual change to the trajectory of the another object, the updating comprising:
determining weights, corresponding to the respective instances of the historical data, of the machine learning model, wherein the weights are based on degrees of similarity between:
previous lighting conditions corresponding to the historical data, and
the current lighting condition during which the actual change took place; and
adjusting the predicted change to the predicted trajectory of the another object according to a weighted average of the predicted change to the predicted trajectory of the another object and the actual change to the trajectory of the another object, the weighted average being based on adjusting the weights to reduce respective deviations between the predicted change to the predicted trajectory of the another object and the actual change to the predicted trajectory of the another object; and
selecting a future trajectory based on the updated machine learning model.

14. The method of claim 13, wherein the adjusting the selected trajectory comprises:

adjusting the selected trajectory to an updated trajectory having a lowest predicted travel time and in which the predicted change to the predicted trajectory of the another object is within a predetermined range.

15. The method of claim 14, wherein the updating the model comprises:
  determining whether the actual change to the trajectory of the another object is within the predetermined range;
  in response to determining that the actual change to the trajectory of the another object is within the predetermined range, determining a resulting change to the adjusted selected trajectory of the autonomous or semi-autonomous vehicle based on the actual change to the trajectory of the another object; and
  in response to determining that the actual change to the trajectory of the another object is outside the predetermined range, adjusting the predicted change to the trajectory of the another object based on the actual change to the trajectory of the another object.

16. The method of claim 13, wherein the adjusting the selected trajectory further comprises adjusting the selected trajectory based on a predicted change to a level of equilibrium of the autonomous or semi-autonomous vehicle and a trajectory of a second object predicted to contact the another object, in response to the predicted change to the trajectory of the another object.

17. The method of claim 13, wherein the trajectory comprises a starting pose, a velocity at different points along the route, an acceleration at different points along the route, an orientation at different points along the route, and a final pose of the autonomous or semi-autonomous vehicle.

18. The method of claim 13, wherein the adjusting the selected trajectory comprises adjusting the selected trajectory while maintaining a minimum distance, at a given time, between the adjusted selected trajectory and the trajectory of the another object.

19. The method of claim 13, wherein the trajectory comprises four knot points that define a cubic spline that specifies a steering angle of the autonomous or semi-autonomous vehicle.

* * * * *